United States Patent
Streitenberger et al.

(10) Patent No.: US 6,675,251 B1
(45) Date of Patent: Jan. 6, 2004

(54) BRIDGE DEVICE FOR CONNECTING MULTIPLE DEVICES TO ONE SLOT

(75) Inventors: Robert Streitenberger, Hyogo (JP); Hiroyuki Kawai, Hyogo (JP); Yoshitsugu Inoue, Hyogo (JP); Junko Kobara, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/551,841

(22) Filed: Apr. 18, 2000

(30) Foreign Application Priority Data

Mar. 13, 2000 (JP) .................................... 2000-068945

(51) Int. Cl.[7] ............................................. G06F 13/36
(52) U.S. Cl. ................................................. 710/306
(58) Field of Search .............................. 710/305–315; 370/401, 402

(56) References Cited

U.S. PATENT DOCUMENTS

| | | | |
|---|---|---|---|
| 5,712,986 A | | 1/1998 | Vo |
| 5,799,161 A | * | 8/1998 | Merrick ....................... 710/305 |
| 5,857,086 A | | 1/1999 | Horan et al. |
| 5,859,988 A | * | 1/1999 | Ajanovic et al. ............. 710/306 |
| 5,935,233 A | * | 8/1999 | Jeddeloh ....................... 710/306 |
| 6,047,120 A | * | 4/2000 | Bell ................................. 703/27 |
| 6,167,476 A | * | 12/2000 | Olarig et al. .................. 710/315 |
| 6,175,888 B1 | * | 1/2001 | Guthrie et al. ................ 710/310 |
| 6,247,102 B1 | * | 6/2001 | Chin et al. .................... 711/150 |
| 6,275,885 B1 | * | 8/2001 | Chin et al. .................... 710/311 |
| 6,279,087 B1 | * | 8/2001 | Melo et al. .................... 711/146 |
| 6,282,589 B1 | * | 8/2001 | Porterfield et al. ............ 710/52 |
| 6,356,972 B1 | * | 3/2002 | Chin et al. .................... 710/310 |
| 6,377,581 B1 | * | 4/2002 | Anand et al. ................. 370/402 |
| 2001/0037423 A1 | * | 11/2001 | Conway et al. .............. 710/129 |

FOREIGN PATENT DOCUMENTS

| | | |
|---|---|---|
| JP | 9-218849 | 8/1997 |
| JP | 11-73386 | 3/1999 |

* cited by examiner

Primary Examiner—Paul R. Myers
(74) Attorney, Agent, or Firm—McDermott, Will & Emery

(57) ABSTRACT

A bridge includes a first port connected to a Primary bus, and second ports respectively connected to second buses. The first port includes a PCI master, a PCI slave and an AGP master. Each of the second ports includes a PCI master, a PCI target and an AGP Target. The bridge further includes a plurality of first-in-first-out memories forming asynchronous data paths between the first port and the second ports and arbitrators for arbitrating a contention between the transactions on the data paths formed by the first-in-first-out memories based on the protocols related to the transactions.

20 Claims, 42 Drawing Sheets

BRIDGE DEVICE FOR CONNECTING MULTIPLE DEVICES TO ONE SLOT

BACKGROUND OF THE INVENTION

1. Field of the Invention

The present invention relates to implementation of point-to-point port protocols such as AGP (Accelerated Graphics Port) in a computer, and more particularly, to hardware improvements which may contribute to improvements in systems based on these protocols and to increasing applicable fields thereof.

2. Description of the Background Art

The Accelerated Graphics port standard is proposed by Intel Corporation and is defined as a point-point port protocol, i.e., only one single AGP device is allowed to be connected to the AGP slot on the motherboard of a PC (Personal Computer). The device according to this AGP standard (AGP device) is used to execute 3D/2D (three dimensional/two dimensional) graphics processings or the like, and AGP devices have been recently in great demand in the field of personal computers.

Since the AGP standard is however defined as a point-to-point port protocol, the following problem has arisen. Referring to FIG. 43, for example, if a conventional motherboard 600 used in a personal computer has only one AGP slot 610, only one add-in board (AIB) 602 including an AGP device 612 can be mounted in this AGP slot 610 as a matter of course. As a result, an additional AGP device of the same type as AGP device 612 cannot be readily provided.

If a motherboard 620 has an AGP slot 630 and a PCI slot 632 as shown in FIG. 44, add-in board 602 can be mounted to AGP slot 630 and another add-in board 624 having a PCI device 642 or the like can be mounted to PCI slot 632.

However, there are two major applications that require to connect multiple devices to the AGP port. First, graphics board vendor would like to connect two or more of their rendering controller (RC) to the single AGP slot, either to increase fill rate or to enable multiple display support. The conventional configuration shown in FIG. 43 or FIG. 44 cannot answer the need.

Secondly, in the example shown in FIG. 44, two slots, AGP slot 630 and PCI slot 632, are provided at motherboard 620, and both slots must be used. Since a great many peripheral devices are provided as add-in boards today, the number of necessary slots must be as small as possible. It is therefore preferable to enable both capabilities implemented by AGP devices and by PCI devices to the motherboard using for example only a single slot.

An example would be Video Editing Boards that, in addition to video editing capabilities (via PCI devices) also offer 3D/2D capabilities as a single board solution. Such capabilities correspond to the functions of a so-called bridge, but there exists no such bridge that provides combinations in such a wide range as described above.

Furthermore, if a circuit to offer a special function such as a core for geometrical operation is provided on a bridge, the bridge can provide combinations of capabilities in a wider range, but again there has been no such bridge.

SUMMARY OF THE INVENTION

It is therefore an object of the present invention to provide a bridge device which can provide various functional devices including AGP device using a single slot.

Another object of the present invention is to provide a bridge device which can provide various functional devices including AGP devices and a special core circuit using a single slot.

A bridge device according to a first invention includes first port connected to a first bus, and a plurality of second ports respectively connected to a plurality of second buses, the first port includes a master module and a slave module according to a first protocol and a master module according to a second protocol, and the second protocol is a point to point port protocol, each of the second ports includes a master module and a slave module according to the first protocol and a slave module according to the second protocol. The bridge device further includes a plurality of first-in-first-out memories forming asynchronous data paths between the first port and the plurality of second ports and an arbitrator for arbitrating between transactions in a contention generated in the data paths formed by the first-in-first-out memories based on the protocols related to the transactions.

Since the data paths are formed between the first port and the plurality of second ports, and a contention between transactions can be resolved based on the protocol used, a plurality of devices can be connected using a single slot of a motherboard. As a result, while preventing the number of slots used in the motherboard from increasing, a plurality of devices of the same kind can be connected to expand the processing capability or a plurality of devices of different kinds can be connected to provide various kinds of capabilities.

Preferably, each of the modules adds to a transaction request an attribute representing a protocol and a data rate related to the transaction, and each of the first-in-first-out memories includes storage for storing a transaction and attribute storage memory for storing an attribute corresponding to each transaction. The bridge device further includes programmable transformer for executing protocol or data rate transformation performed based on an attribute stored by the attribute storage for each of the data path.

This bridge device executes protocol or data rate transformation for transactions, and thus various combinations of devices and hosts can be achieved.

More preferably, the first protocol is a PCI protocol, and the second protocol is an AGP protocol, the plurality of first-in-first-out memories include a first first-in-first-out memory forming a data path to each of the plurality of second ports from the first port.

The AGP device is essentially adapted to communicate with the host on a one-to-one basis only and cannot be functionally expanded in an easy manner, but since the AGP devices can be connected to the plurality of secondary ports, the function and the processing capabilities can be easily expanded.

Further preferably, the first first-in-first-out memory includes a plurality of memory banks each having an input coupled to the first port and an output coupled to each of the plurality of second ports and a plurality of queues provided corresponding to the plurality of second ports, and each of the plurality of queues holds information to specify a memory bank storing data directed to a corresponding one of the second ports.

The first first-in-first-out memory must correctly direct data to the plurality of secondary ports. Data to any of the secondary ports is stored in a common memory bank, and data directed to each of the secondary ports is managed by the queue. The circuit scale can be reduced as compared to providing sets of memory banks for respective destinations.

According to a further aspect of the present invention, the first first-in-first-out memory further includes a receiving circuit which receives data broadcast from the first port to the plurality of second ports, storing duplicates in a number corresponding to that of the plurality of second ports in the memory banks, and supplying information to specify a corresponding bank storing the data to be broadcast to each of the plurality of queues for storage.

Since the data is duplicated and stored in the plurality of memory banks, and information to specify the memory banks is input in the queues for the plurality of secondary ports, the same data can be transmitted to any of the secondary ports. More specifically, data can be readily broadcast using the first-in-first-out memory.

Preferably, the bridge device according to a seventh invention further includes an SBA unit for applying an SBA request issued as a sideband signal from the plurality of second ports to the first port, the second first-in-first-out memory includes a plurality of memory banks each having an input connected to the plurality of second ports and an output connected to the first port for storing transaction data output from the plurality of second ports, an AGP queue for maintaining information to specify a memory bank storing data corresponding to an AGP request issued from the plurality of second ports within the queue and a PCI queue for maintaining information to specify a memory bank storing PCI transaction data issued from the second ports within the queue, and the first port includes a circuit for taking data from a memory bank specified by information read out from a head entry of the AGP queue or PCI queue depending upon the kind of data to be read out.

If a plurality of kinds of requests are present, the order of data is managed separately by corresponding queue (the AGP queue and the PCI queue), so that data can be read out in a correct order for each of the kinds.

More preferably, the first port further includes a module for direct memory access, and the SBA unit includes an arbitrating circuit for arbitrating between an SBA request from the plurality of second ports and an SBA request from the module for direct memory access for application to the first port.

Since SBA requests from three sources are arbitrated and applied to the first port, direct memory access and transactions between the resources connected to the plurality of second ports and the first memory can be smoothly processed.

More preferably, the bridge device further includes an operation core to execute a prescribed operation processing. The plurality of first-in-first-out memories form asynchronous data paths between the operation core and the first port and the plurality of second ports in addition to the asynchronous data paths between the first port and the plurality of second ports.

Since the operation core is incorporated in the bridge device, a larger number of combinations of functions can be readily implemented. In addition, if an operation core for a particular purpose is incorporated in the bridge device, the system can be expanded less costly as compared to the use of a plurality of add-in boards.

In accordance with another aspect of the present invention, a bridge device includes: a first port connected to a first bus; a plurality of second ports connected to a plurality of second buses; a plurality of first-in-first-out memories for forming asynchronous data paths between the first port and the plurality of second ports; and an arbitrating circuit for arbitrating contentions caused on the data paths formed by the plurality of first-in-first-out memories. The arbitrating circuit arbitrates the contentions based on protocols associated with respective transactions. The first port has a module that gives a command for initiating a data transaction to a first device connected to the first bus, or receives a command for initiating a data transaction from the first device. Each of the plurality of second ports has a module that gives a command for initiating a data transaction to a second device connected to corresponding one of the second ports, or receives a command for initiating a data transaction from the second device.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

In the following description, the name of an "A-to-P (Primary)" FIFO to transfer data from port A to the Primary side will be referred to as "A2P" for the purpose of simplicity. Also, an FIFO to "P to A" and an FIFO to "P to B" are collectively referred to as "P2X". Note that other FIFO will be abbreviated in the same manner.
[Architecture]

Figure 1:
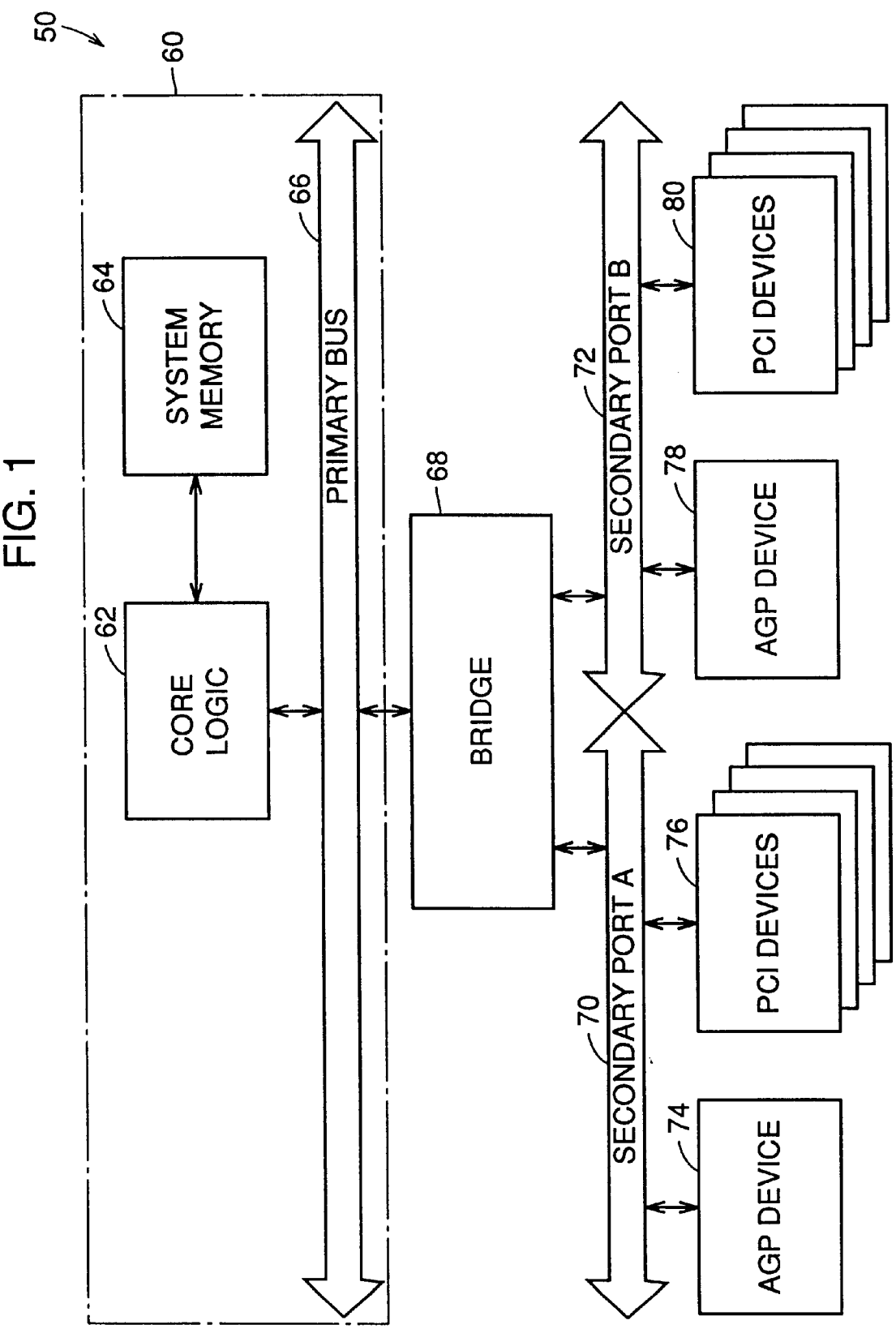
FIG. 1 is a block diagram of a system including bridge 68 according to a first embodiment of the present invention.

Referring to FIG. 1, a bridge 68 according to a first embodiment of the present invention is used to connect a host 60 and two secondary buses 70 and 72 provided within a personal computer system 50. In the following description, secondary buses 70 and 72 will be referred to as "secondary bus A 70" and "secondary bus B 72", respectively. In the description of this embodiment, two secondary buses are used, but general configuration will be the same as the following bridge 68 using three or more buses, except for the arbitration between data.

Referring to FIG. 1, host 60 includes a primary bus 66 to which the bridge 68 will be connected, a core logic 62 connected to primary bus 66, and a system memory 64 connected to core logic 62 through a chip set which is not shown. If a graphics processing is executed using an AGP device, target data is held in system memory 64, and the data is provided to an appropriate device such as an AGP device through primary bus 66 and bridge 68. The data processed by the AGP device is provided to system memory 64 again through bridge 68 and primary bus 66.

Bridge 68 has two kinds of input/outputs. One is for input/output to/from primary bus 66, and will be referred to as "the Primary side". The other is for input/output with secondary bus A 70 and secondary bus B 72, and will be referred to as "the Secondary side".

Bridge 68 is connected to secondary bus A 70 and secondary bus B 72, respectively, through two ports which are not shown. Secondary bus A 70 is connected with an AGP device 74 or a PCI device 76. Secondary bus B 72 is connected with an AGP device 78 or a PCI device 80. It may be possible to connect AGP devices 74 and 78, and PCI devices 76 and 80, to secondary bus A 70 and secondary bus B 72 as far as they can operate normally under some electrical constraints. Note that the AGP device and PCI device can be thus connected to a common bus as in this example because bridge 68 serves to execute protocol transformation between AG' protocol and PCI protocol and transmission rate transformation as will be described.

Figure 2:
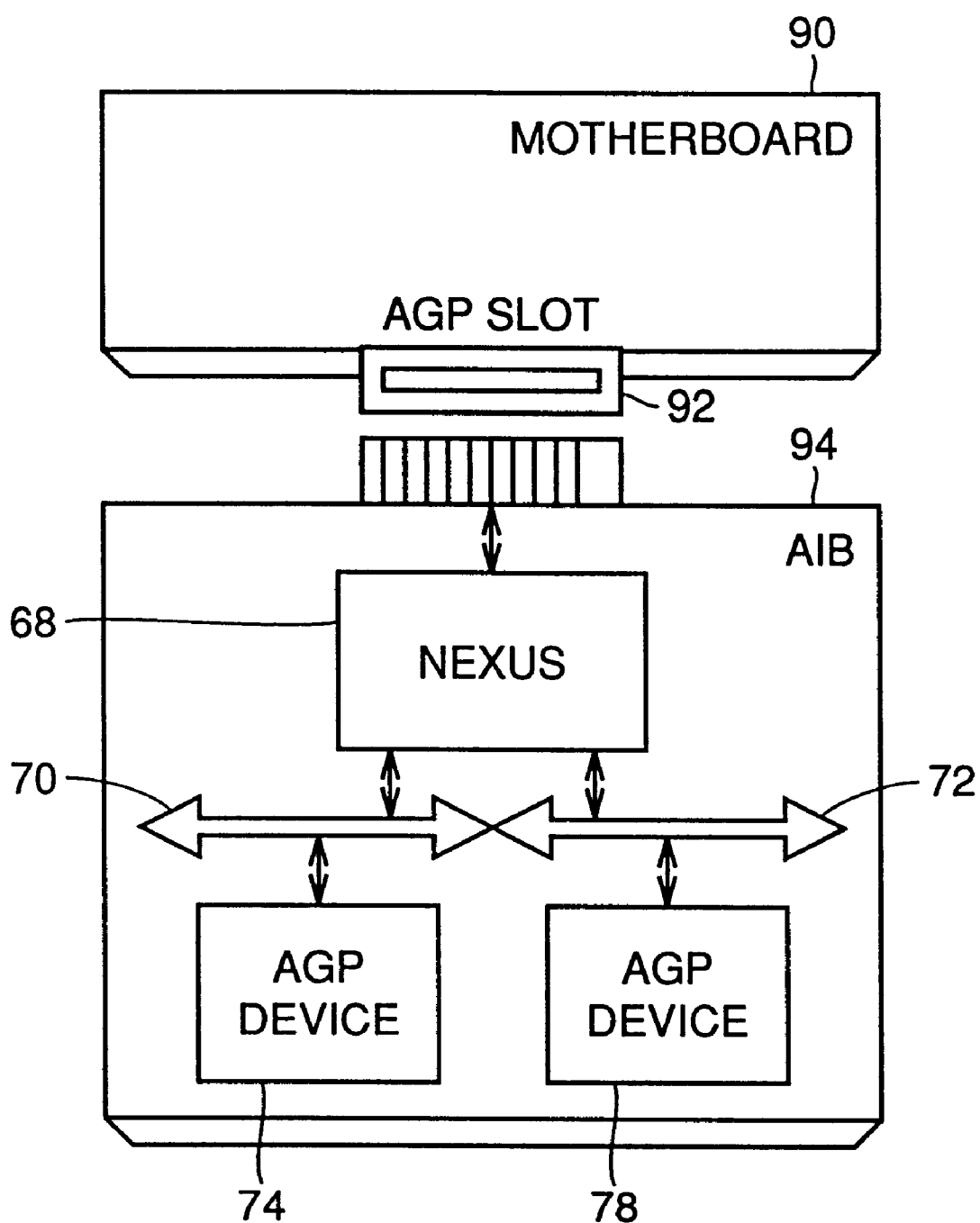
FIG. 2 is diagram showing a general configuration of an add-in board including bridge 68 according to the present invention.

Using bridge 68, the two AGP devices, AGP device 74 and AGP device 78 can be connected to a motherboard 90 which has only one AGP slot 92 as shown in FIG. 2.

Figure 3:
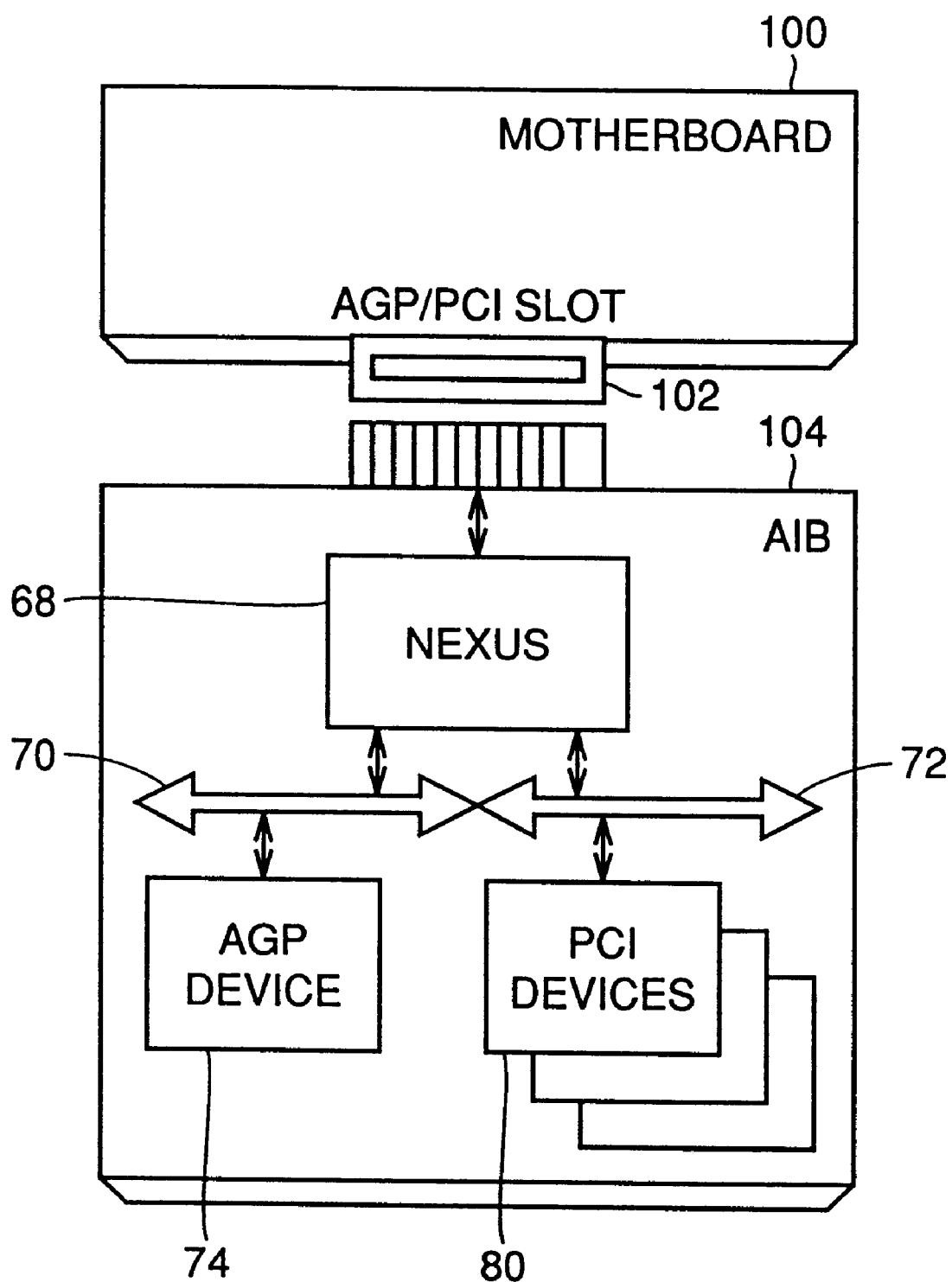
FIG. 3 is a diagram showing a general configuration of another add-in board including bridge 68 according to the present invention.

As shown in FIG. 3, AGP device 74 can be connected to a motherboard 100 through bridge 68 and secondary bus A 70 and a PCI device 80 through bridge 68 and secondary bus B 72. In this configuration, for example, a video editing capabilities of PCI device 80 and a graphics drawing capabilities of AGP device 74 can be both provided using the single motherboard 100.

Bridge 68 acts as an AGP Master on the Primary side and as an AGP Target on the Secondary side. This functionality is defined in the open AGP Specification. Furthermore, bridge 68 contains full-blown PCI Master and Target capabilities on all ports.

The key point to build an AGP-to-AGP bridge is the ability to decouple the AGP/PCI modules and allow the transformation of protocol modes and data transfer rates across the Primary/Secondary side of the bridge device. This is made possible by the flexible FIFOs, as will be described later, that were wedged between the AGP/PCI modules. The FIFOs act as a buffer that not only synchronizes between two clock domains, thus making the bridge completely asynchronous, but also acts as a transformer between protocol domains and data transfer rates. The sideband request queues also support protocol translation. The data stream within the bridge is controlled by several arbiters, which can be programmed to carry out miscellaneous arbitration algorithm.

Figure 4:
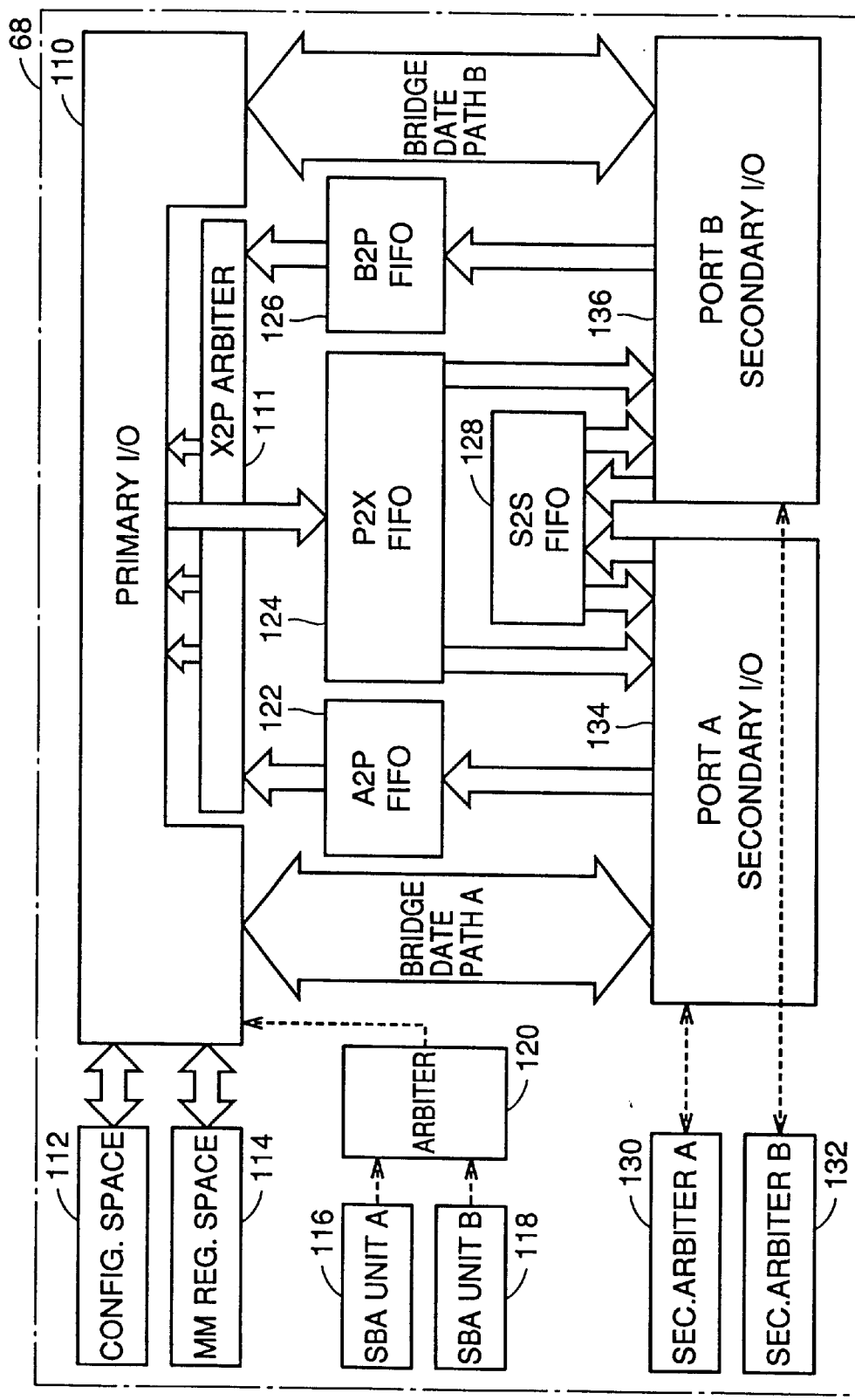
FIG. 4 is a block diagram of bridge 68 according to the first embodiment.

Referring to FIG. 4, bridge 68 includes a primary I/O 110 connected to primary bus 66, a configuration space 112 connected to primary I/O 110 to store configuration information of peripherals connected to host 60 through bridge 68, a memory map register space 114 connected to primary I/O 110 to store memory maps related to memory regions allocated to the peripherals, a port A 134 connected to secondary bus A 70, a port B 136 connected to secondary bus B 72, an A2P FIFO 122, a B2P FIFO 126, a P2X FIFO 124 and an S2S FIFO 128 to form data stream between these ports 134 and 136, an X2P arbiter 111 to arbitrate between data applied from A2P FIFO 122 and B2P FIFO 126 to primary I/O 110, secondary arbiters A 130 and B 132, SBA units A 116 and B 118 for requests (SBA) transmitted from a device (agent) connected to ports A 134 and B 136 to the host side as a sideband signal, and an arbiter 120 to arbitrate between requests from SBA unit A 116 and SBA unit B 118 and provide arbitrated requests to host 60 through primary I/O 110.

Figure 5:
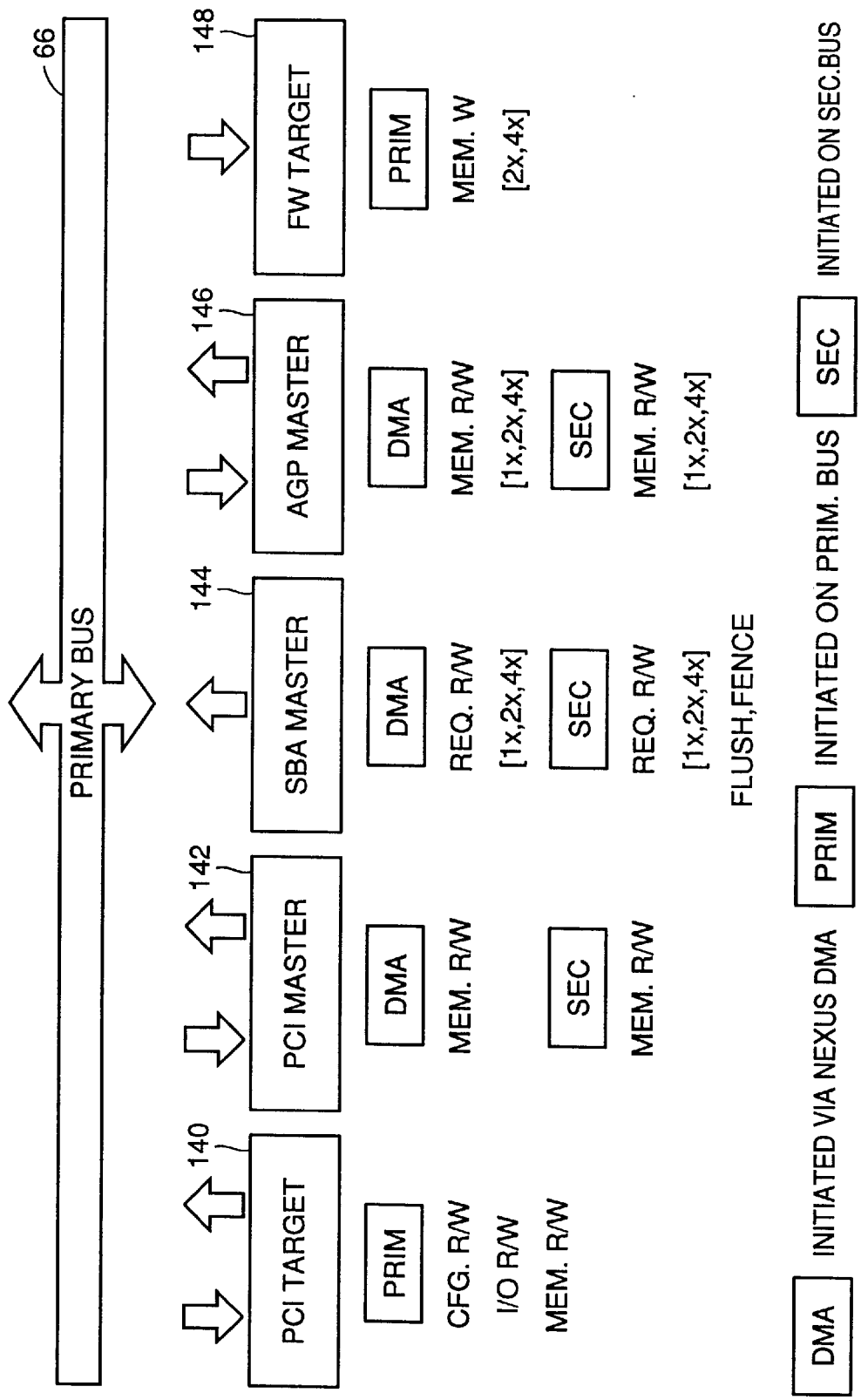
FIG. 5 is a diagram showing modules present on the Primary side in bridge 68 according to the first embodiment.

Referring to FIG. 5, bridge 68 connected to host 60 through primary bus 66 may operate as a PCI Target 140, a PCI Master 142, a SBA Master 144, an AGP Master 146 and an FW(Fast Write) Target 148 to host 60. Note that herein "Master" refers to one of the two devices for data transaction which initiates a data transaction, and "Target" refers to the other which does not initiate a data transaction.

FIG. 5 shows the content of processing executed in each transaction, and the location of the device (initiator) to initiate the data transaction at the time. Note that 1×, 2× and 4× in SBA Master 144 and AGP Master 146 in FIG. 5 represent three kinds of data transfer rates in AGP protocols.

The characters 2× and 4× in FW Target 148 represent a write called "Fast Write". Note that the PCI write is substantially a Fast Write with only a different rate. More specifically, the PCI substantially refers to a Fast Write at 1×.

Figure 6:
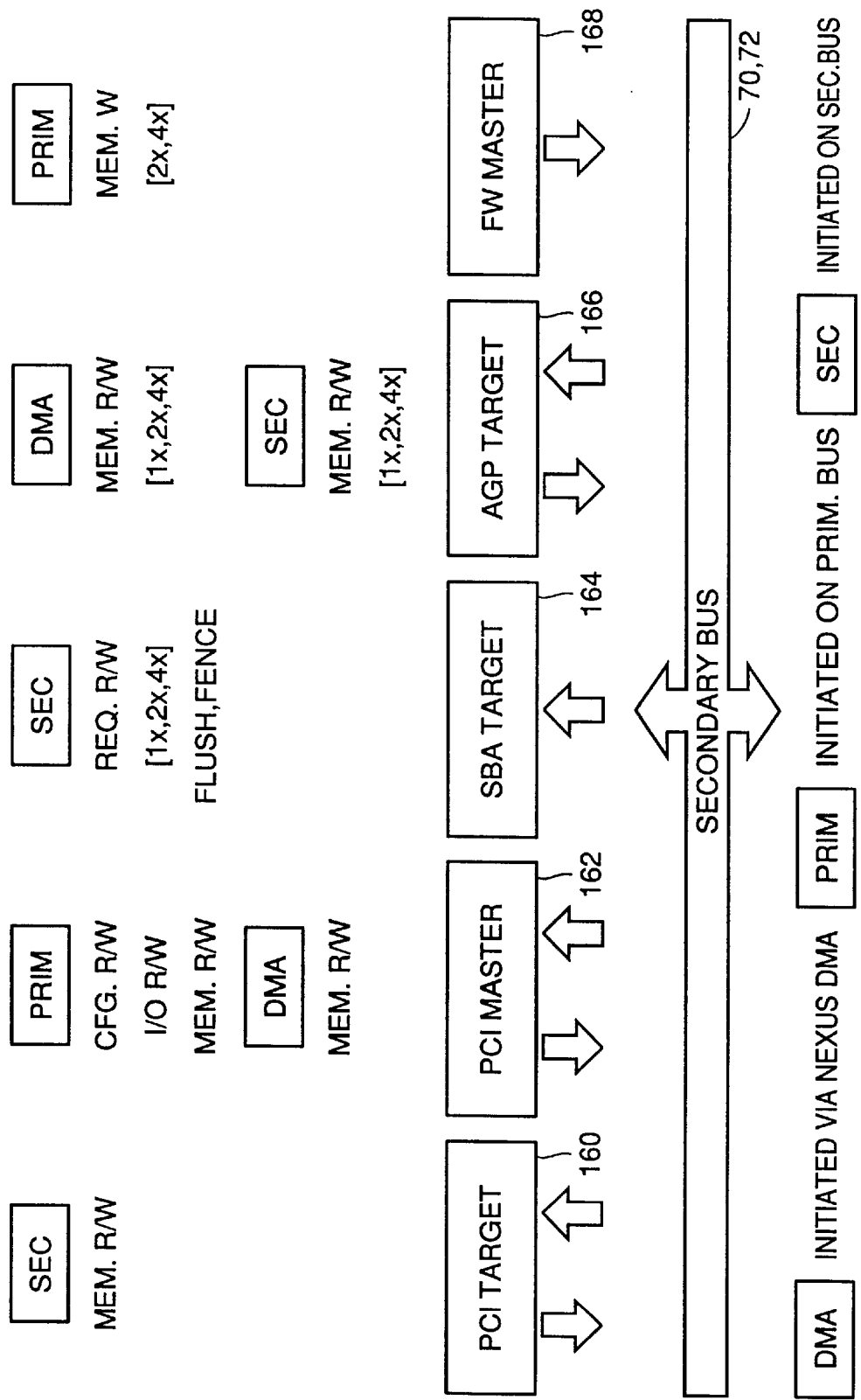
FIG. 6 is a diagram showing modules present on the Secondary side in bridge 68 according to the first embodiment.

Referring to FIG. 6, on the Secondary side, bridge 68 operates as a PCI Target 160, a PCI Master 162, an SBA Target 164 and an AGP Target 166 and an FW Master 168. Also in FIG. 6, the initiator of each transaction and the content of the processing are shown.

[Protocol/Data Rate Transformation]

There are three major data stream directions, downstream, upstream, and sidestream. Possible protocol modes for downstream transactions on the Primary side are shown in table 1.

TABLE 1

| | |
|---|---|
| PCI Write | Host CPU is posting data to the A2P Bridge |
| PCI Read | A2A bridge reads/fetches data from the System Memory |
| Fast Write 2x | Host CPU is posting data to the A2P bridge |
| Fast Write 4x | Host CPU is posting data to the A2P Bridge |
| AGP Read 1x | A2A bridge reads/fetches data from the System Memory |
| AGP Read 2x | A2A bridge reads/fetches data from the System Memory |
| AGP Read 4x | A2A bridge reads/fetches data from the System Memory |

Basically, there are two major mechanism (Posting and AGP Read), with three data rates (1×, 2×, 4×) for each protocol. Note that the PCI write is substantially a Fast Write 1×. PCI Reads can only be done in 1× data rate since there is no such thing as a 'Fast Read'.

Possible protocol modes for down stream transactions on the Secondary side are shown in Table 2.

TABLE 2

| | |
|---|---|
| PCI Write | A2A bridge is posting data to the PCI/AGP Device |
| PCI Read | Secondary PCI/AGP Device reads/fetches data from the A2A bridge |
| Fast Write 2x | A2A bridge is posting data to the Secondary AGP Device |

TABLE 2-continued

| | |
|---|---|
| Fast Write 4x | A2A bridge is posting data to Secondary AGP Device |
| AGP Read 1x | Secondary AGP Device reads/fetches data from A2A bridge |
| AGP Read 2x | Secondary AGP Device reads/fetches data from A2A bridge |
| AGP Read 4x | Secondary AGP Device reads/fetches data from A2A bridge |

Again, there are two major mechanism (Posting and AGP Read), with three data rates (1×, 2×, 4×) for each protocol. A PCI device only supports PCI Writes and Reads, and does not support Fast Write or AGP Write/Reads.

Possible protocol modes for upstream transactions on the Primary side are shown in Table 3.

TABLE 3

| | |
|---|---|
| PCI Read | Host CPU is reading data from the A2P Bridge |
| PCI Write | A2A bridge writes data to the System Memory |
| AGP Write 1x | A2A bridge writes data to the System Memory |
| AGP Write 2x | A2A bridge writes data to the System Memory |
| AGP Write 4x | A2A bridge writes data to the System Memory |

There is no such thing as a Fast Read, so the number of combinations for upstream transactions is smaller than for the down stream case. Possible protocol modes for upstream transactions on the Secondary side are shown in Table 4.

TABLE 4

| | |
|---|---|
| PCI Read | A2A bridge is reading data from the secondary PCI/AGP Device |
| PCI Write | Secondary PCI/AGP Device writes data to the A2A bridge |
| AGP Write 1x | Secondary AGP Device writes data to the A2A bridge |
| AGP Write 2x | Secondary AGP Device writes data to the A2A bridge |
| AGP Write 4x | Secondary AGP Device writes data to the A2A bridge |

Again, there is no such thing as a Fast Read, but only PCI Reads (1×) and AGP Reads.

So the real flexibility in the bridge of this embodiment is the capability to combine all these protocol modes and speed rates and allow all possible transformations across the buses.

[Transformation Method]

The bridge of the present embodiment implements several registers to program the transformation method. Almost all transactions can be transformed as shown in the following. The only exceptions are AGP Reads that are induced by the secondary AGP agents. Since those agents issue request via the sideband signals (SBA), they expect the returning read data to be in exactly the same protocol format, i.e., in AGP Reads.

Moreover, the data rates cannot be changed for the AGP transactions that are induced by a secondary AGP agent, since they cannot switch the data rate capability on the fly. Thus, the protocol formats of the Secondary SBA Requests and the protocol formats of the Return Data on a Secondary Port will be as shown in Table 5.

TABLE 5

| Secondary SBA Request | Return Data on secondary Port |
|---|---|
| AGP Read 1x | AGP Read 1x |
| AGP Read 2x | AGP Read 2x |
| AGP Read 4x | AGP Read 4x |

[Host-induced Transactions (Downstream)]

A register 'Host_Down_Sec_Mode' (not shown) in primary I/O 110 can be programmed to select the output mode on the Secondary side of bridge 68 for host induced cycles. The input mode can be either PCI Writes or Fast Writes. When the data is received by the primary PCI/FW Module of bridge 68, the data is dispatched to P2X FIFO 124. For every block dispatched, a protocol tag is attached that specified the output mode of the data block. The tags and their respective meanings are shown in Table 6.

TABLE 6

| 000b | PCI Write (Posting) |
|---|---|
| 001b | Fast Write 2x |
| 010b | Fast Write 4x |
| 011b | Reserved |
| 100b | AGP Read 1x |
| 101b | AGP Read 2x |
| 110b | AGP Read 4x |
| 111b | Reserved |

If the protocol tag is 'AGP Read', it is the task of the device driver to ensure that the receiving AGP agent is in a state to properly handle the return data (i.e., it already has issued the corresponding SBA request or is programmed in way to accept AGP Read data without SBA request being issued.). This might be useful if high throughput is required, but the secondary AGP device did not implement Fast Write.

[Host-induced Transactions (Upstream)]

As mentioned before, there is no such thing as a 'Fast Read', so PCI Reads are the only input protocol that is induced by host 60 (i.e., induced on the Primary side). Since the 1 × data rate on the Primary side represents the bottleneck it noes not make sense to implement a transformation option for upstream host-induced cycles. Thus, PCI Reads on the Primary side are propagated 'as is', i.e., as PCI Reads on the Secondary side.

[User-induced Transactions (Upstream)]

A register 'User_Up_Prim_Mode' (not shown) in primary I/O 110 can be programmed to select the output mode on the Primary side of bridge 68 for cycles induced by a user. The input mode can be either PCI Writes or AGP Writes. When the data is received by the secondary PCI/AGP Module of bridge 68, the data is dispatched to A2P FIFO 122 or B2P FIFO 126. For every block dispatched, a protocol tag is attached that specifies the output mode of the data block. The tags and their respective meanings are shown in Table 7.

TABLE 7

| 00b | PCI Write |
|---|---|
| 01b | AGP Write 1x |
| 10b | AGP Write 2x |
| 11b | AGP Write 4x |

Since in this case bridge 68 is issuing the SBA requests on the Primary side, there is no software interference required. So as an example, PCI writes (1×) can be promoted to AGP 4×Writes. This might be useful if both secondary ports sustain their respective port so the primary port would become a bottleneck if it would transfer at the same data rate. If bridge 68 is plugged into a PCI slot, it might be required to demote high data rate AGP writes to PCI Writes.

[User-induced Transactions (Downstream)]

A register 'User_Down_Prim_Mode' (not shown) in primary I/O 110 can be programmed to select the request/fetch mode on the Primary side of bridge 68 for user induced cycles. The request/fetch mode on the Secondary side can be either PCI Reads or AGP Reads. In contrast to upstream cycles, where the data is provided together with the request, the actual requests are propagated/transformed. The contents in the register and their respective meanings are shown in Table 8.

TABLE 8

| 00b | PCI Write |
|---|---|
| 01b | AGP Write 1x |
| 10b | AGP Write 2x |
| 11b | AGP Write 4x |

If PCI Read requests are received, they are handled as delayed transactions as defined by the PCI specification, i.e., retried until the return data arrives. PCI Read requests can either be propagated 'as is' via the bridge data path or can be transformed into AGP Read requests by enqueueing them into the secondary SBA queue which will be described later. Contrary to that, AGP Read requests, received via the sideband signals can be either propagated 'as is' by enqueueing them into the secondary SBA Queue or they can be transformed into PCI reads by triggering the bridge data path, where the SBA requests are not enqueued.

[FIFO Architecture]

Figure 7:
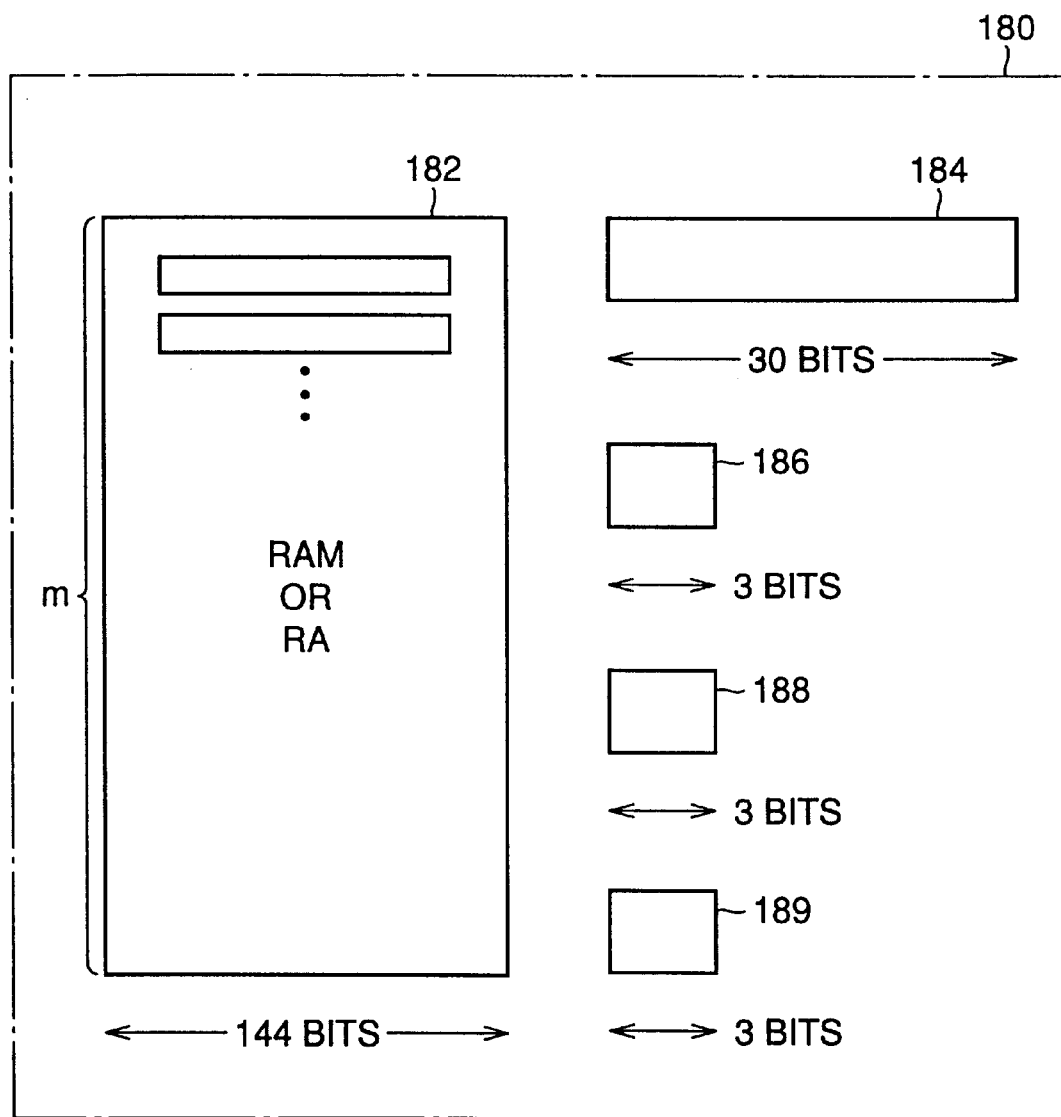
FIG. 7 is a diagram showing a general configuration of an FIFO used in bridge 68 according to the first embodiment.

Referring to FIG. 7, each of FIFOs 180, upstream, downstream and sidestream, includes n memory banks 182 each consisting of a random access memory (RAM) or a register array (RA), 30 bit-register 184 for storing an address for PCI Write or Fast Write Cycles, 3 bit-register 186 for storing the number of valid lines, and 3 bit-register 188 for storing a mode indicator and a 3-bit register 189 for storing a data rate indicator. Each bank 182 is 144 bits wide and m words depth. The information stored in registers 184, 186 and 188 forms a set of attributes that facilitate protocol and data rate transformation.

Figure 8:
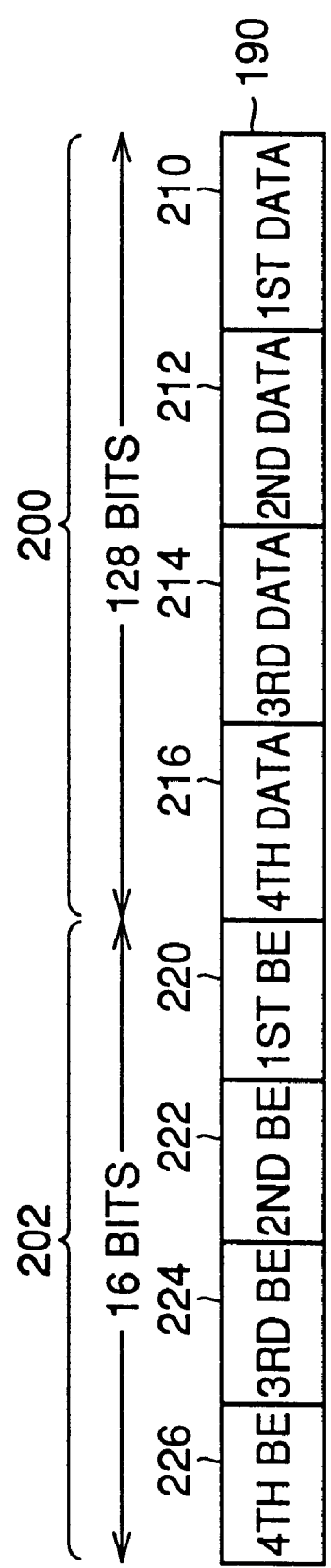
FIG. 8 is a diagram showing the construction of each word in a RAM included in an FIFO.

Referring to FIG. 8, each word in the memory bank 182 is broken down into four 32 bit-Dwords of data (4×32 bits=128 bits) 210, 212, 214 and 216 and four sets of Byte Enables (BE) (4×4 bits=16 bits) 220, 222, 224 and 226. This is the maximum amount of data per cycle that is to given by the AGP 4×mode. All other modes only require a subset of those 144 bits and the BEs are used to indicate valid/invalid data within the same line (144 bits).

Figure 9:
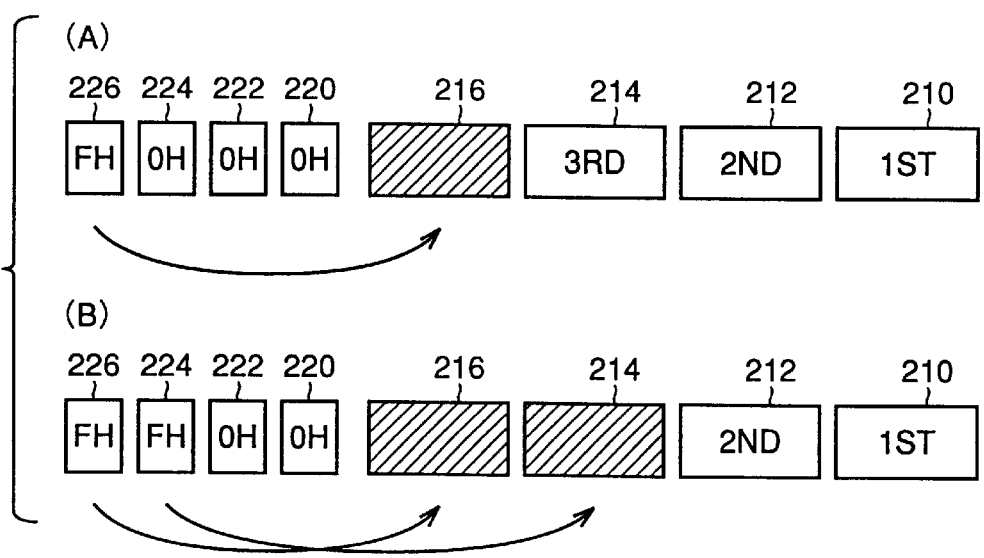
FIG. 9 is a diagram showing the relation between Byte Enable in each word included in an FIFO and each data word.

Referring to FIG. 9, each of BEs 220, 222, 224 and 226 indicates its respective Dword 210, 212, 214 or 216 is used or not. For instance, referring to FIG. 9(A), BEs 220, 222, and 224 store '0h' to indicate that their respective Dwords 210, 212 and 214 contain valid data, while BE 226 contains 'Fh' to indicate that its corresponding Dword 216 is invalid. Likewise, referring to FIG. 9(B), BEs 220 and 222 contains '0h' to indicate that their respective Dwords 210, and 212 contain valid data while BEs 224 and 226 contain 'Fh' to indicate that their corresponding Dwords 214 and 216 is invalid.

Independent of the data rate, the entire RAM line is used, i.e., four Dwords per line are stored. For example, if ten Dwords are stored in memory bank 182, two lines are fully used and the BEs for these lines are all '0', and the third line is only half-used (i.e., the upper two BEs are 'Fh' as shown in FIG. 9(B)). To simplify implementation, always a complete line is output independent of the protocol. For instance, if a PCI Write with three Dwords is received on one side as shown in FIG. 9(A), the output is always 4 Dwords 210, 212, 214 and 216, whether it is a PCI Write or an AGP Write. The remaining Dword 216 is 'masked' out by forcing the corresponding BE 226 to 'Fh', which has been done during the write access.

['P2X' FIFO]

Herein, the FIFOs forming data stream from the primary (P) side to A or B (referred to as "X") on the Secondary side are referred to as 'P2X' FIFO, e.g., P2X FIFO 124 as shown in FIG. 4. P2X FIFO 124 has to bridge the Primary side (Write Port) with the Secondary side (Read Port). Thus, the write port is in the 'P_CLK' (Primary-side clock) clock domain and the read port is in the 'S_CLK' (Secondary side clock) clock domain. It means that P2X FIFO 124 has to provide asynchronous handshaking capabilities as shown in FIG. 10.

Figure 10:
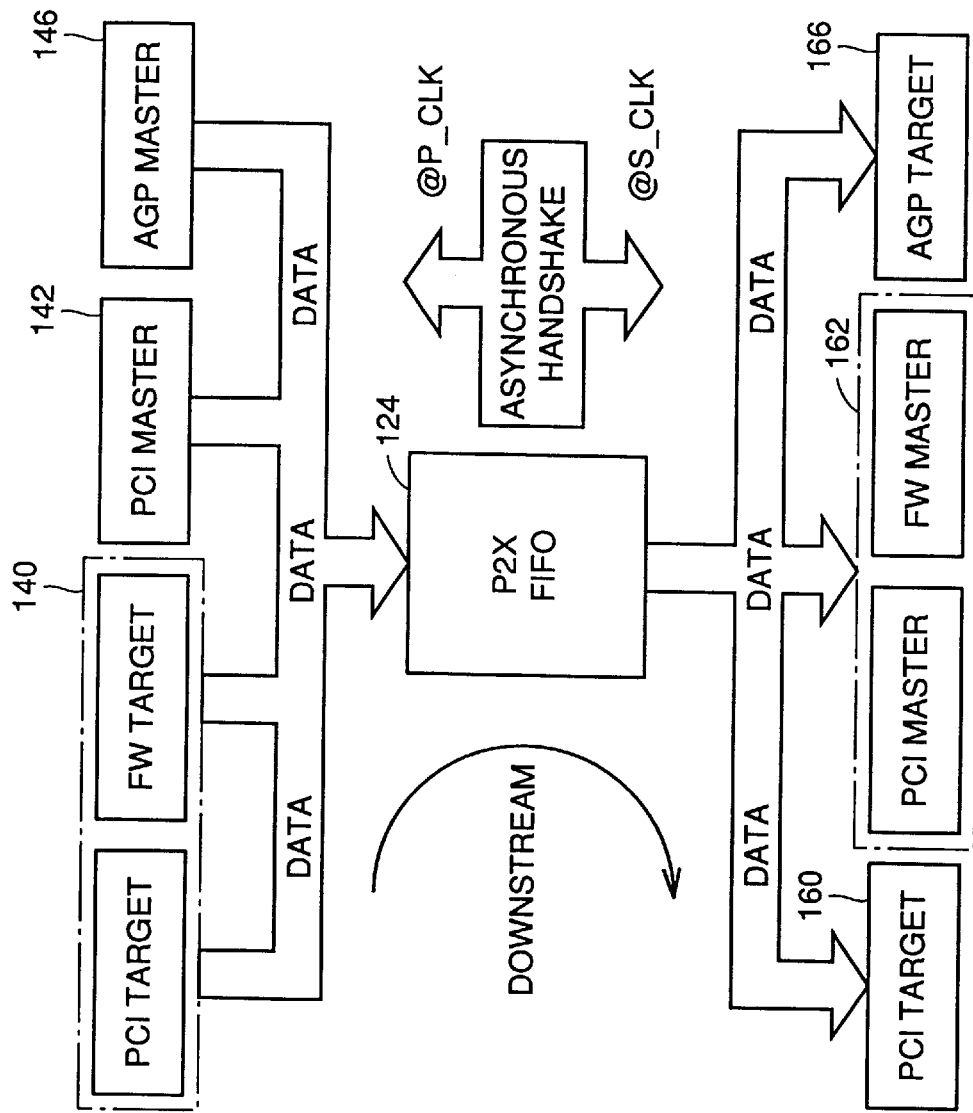
FIG. 10 is a diagram showing data streams related to P2X FIFO.

Referring to FIG. 10, primary I/O 110 contains three modules that access the write port of P2X FIFO 124, including PCI Target 140 including Fast Write (FW) Target, PCI Master 142 and AGP Master 146. Port A 134 and port B 136, i.e., the read ports, contain three modules that access the read port of P2X FIFO 124, including PCI Target 160, PCI Master 162 including FW Master, and AGP target 166.

Figure 12:
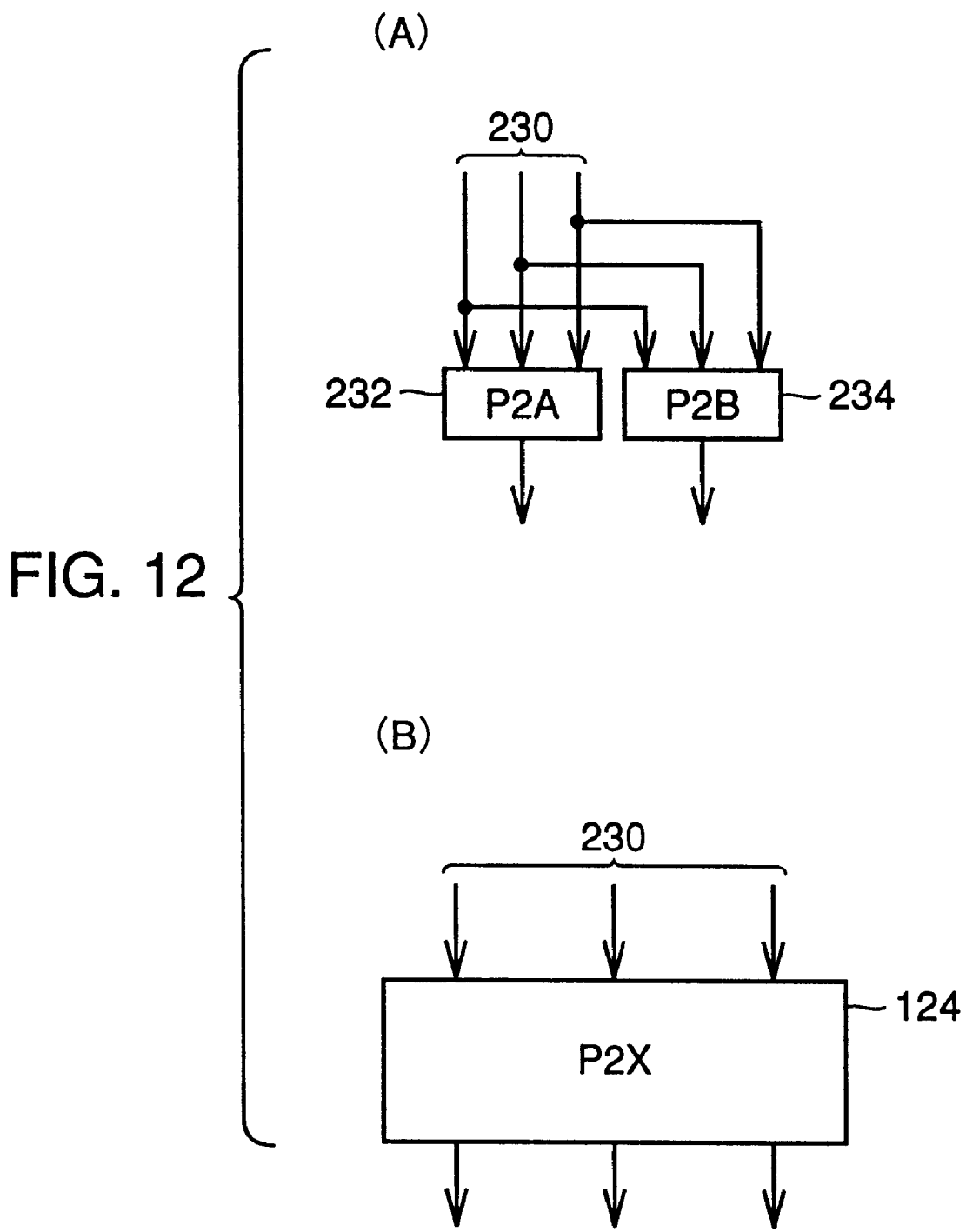
FIG. 12 is a diagram showing a conventional configuration related to P2X FIFO and a configuration according to an embodiment of the present invention.

Referring to FIG. 12(A), since there are two dedicated secondary ports in bridge 68, two posting buffer 232 and 234 ('P2A' and 'P2B') would be required. However, since there is only a single primary port, only one of the posting buffers would be accessed at a time, while the other one is idle. P2X FIFO 124 combines all posting buffers, e.g., P2A buffer 232 and P2B buffer 234 as shown in FIG. 12(A), into a single huge posting buffer that can be shared by all modules that require downstream data transmission as shown in FIG. 12(B). This improves utilization and throughput of all data paths and significantly reduces gate count of the required circuitry.

Figure 11:
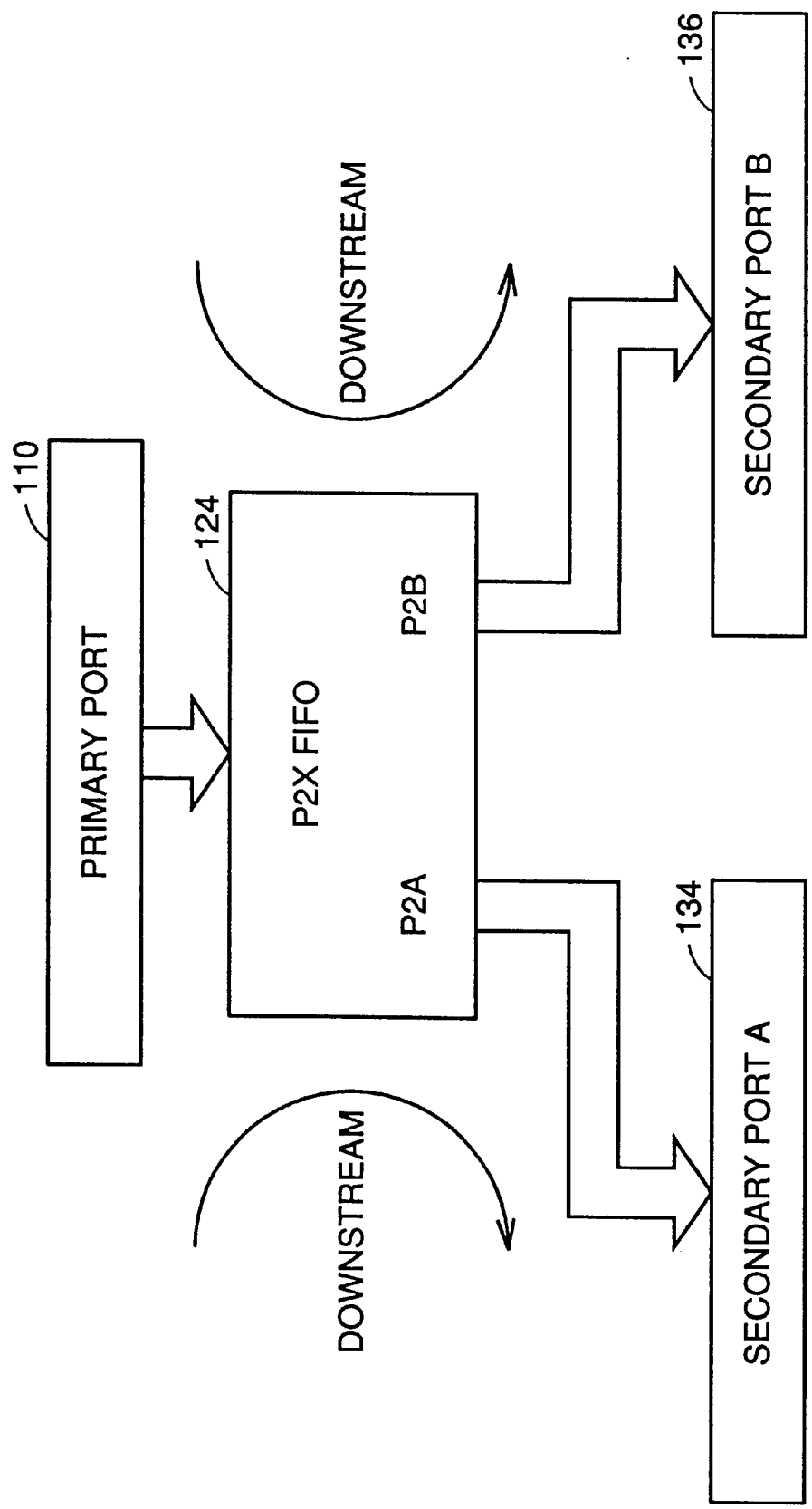
FIG. 11 is a diagram showing data streams to two secondary ports related to P2X FIFO.

In this context, as shown in FIG. 11, concurrency should be guaranteed. In other words, data should be output in the same order it is input with regard to the selected destination. Data destined to port A 134 are output from P2X FIFO 124 to port A 134 in the same order it is input to P2X FIFO 124 from primary I/O 110. Data destined to port B 136 are output from P2X FIFO 124 to port B 136 in the same order it is input to P2X FIFO 124 from primary I/O 110. For this purpose, each data path has a dedicated destination Queue that keeps track of the data and its destination, which will be described in the following.

Figure 13:
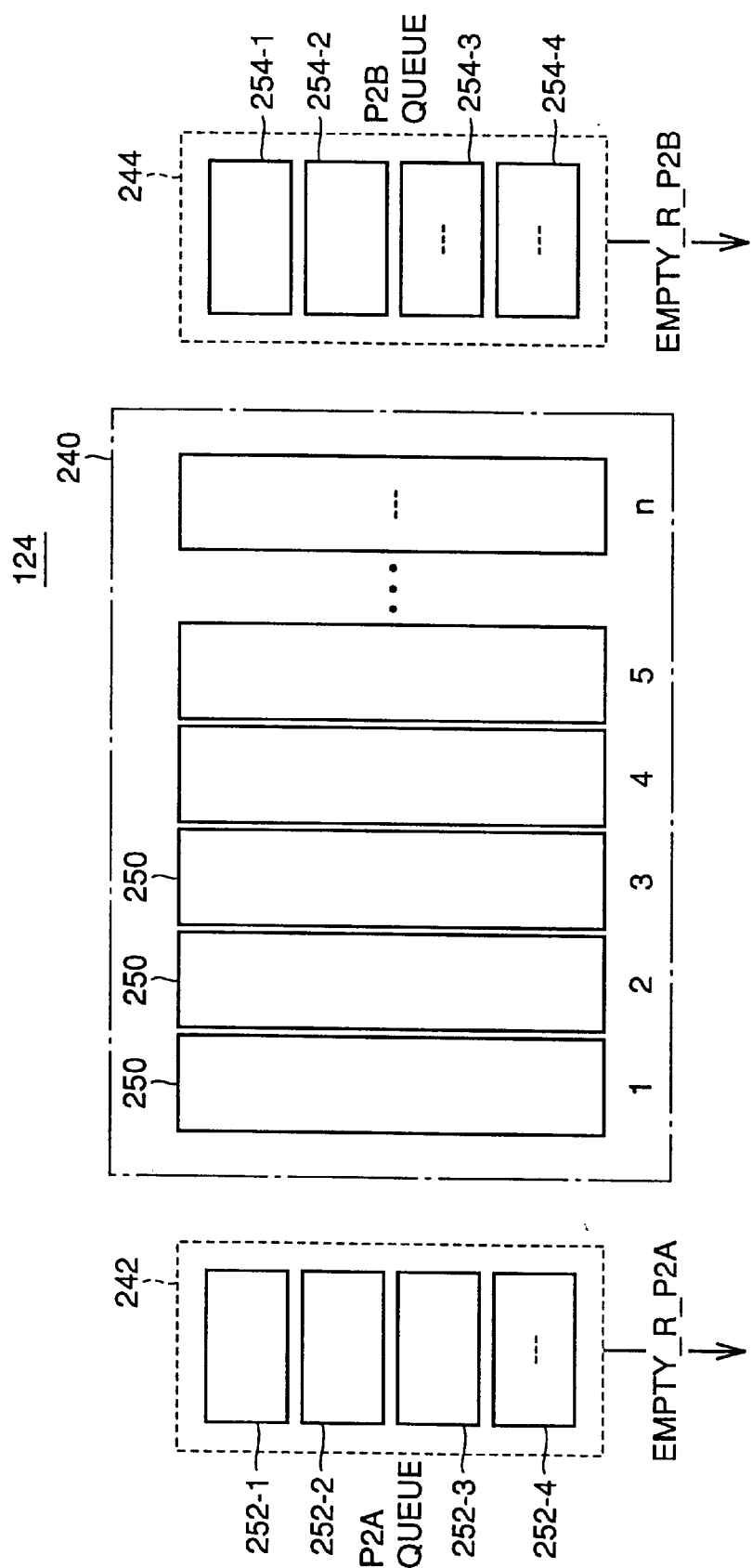
FIG. 13 is a diagram showing the configuration of P2X FIFO 124.

Referring to FIG. 13, P2X FIFO 124 contains an array 240 of memory banks 250-1, 250-2, . . . , 250-n, a P2A Queue 242 and a P2B Queue 244 for keeping track of data destined to port A 134 and port B 136, respectively. Queues 242 and 244 output signals Empty_R_P2A and Empty_R_P2B, respectively, to port A 134 and port B 136. When Empty_R_P2A is active, port A 134 stop reading data from P2A Queue 242 and when Empty_R_P2A becomes inactive, it begins reading data from P2A Queue 242. The same is rue for Empty_R_P2B and port B 136. The memory banks 250-1, 250-2, . . . , 250-n correspond to memory banks 182 as shown in FIG. 7.

Figure 14:
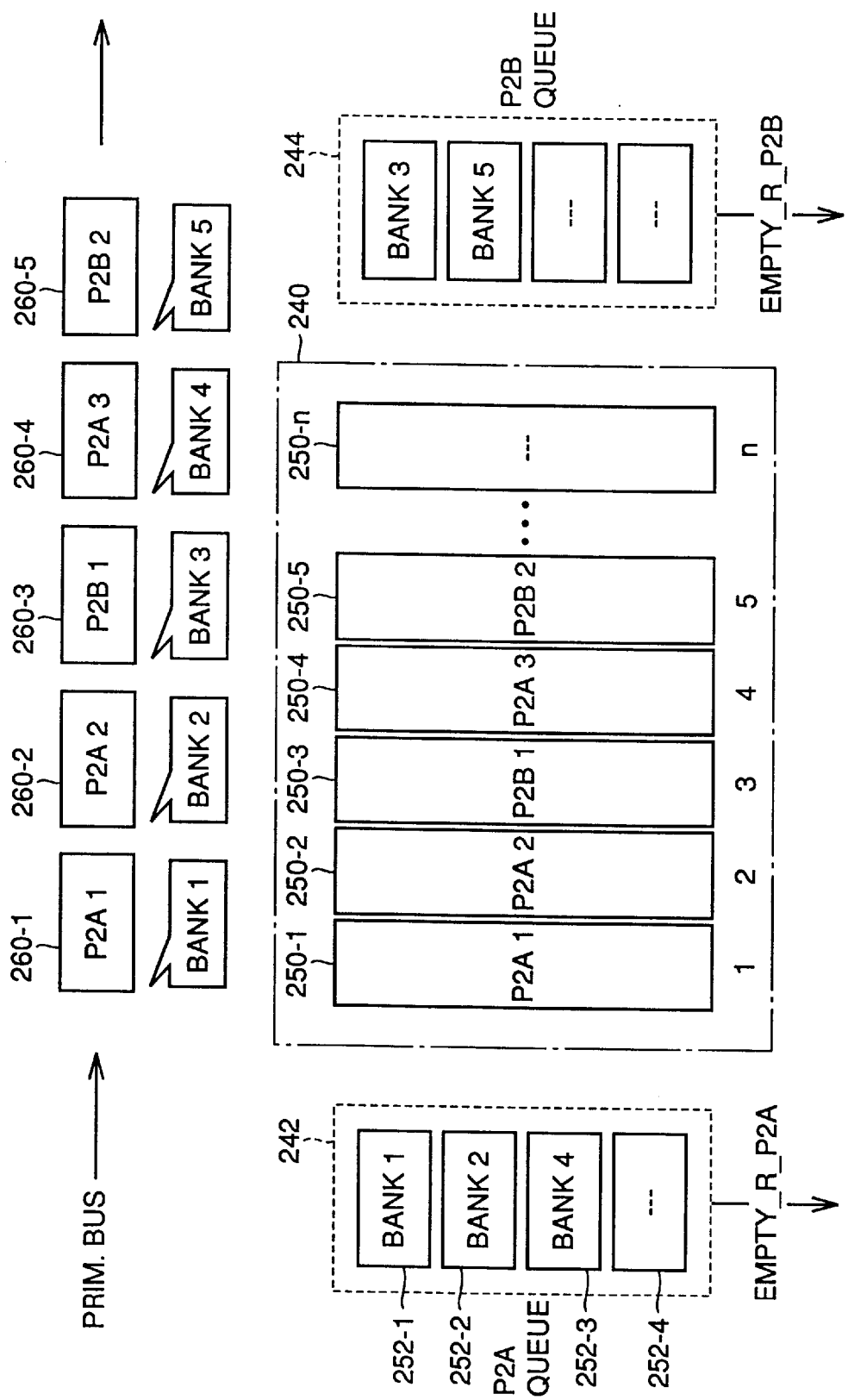
FIG. 14 is a diagram showing the operation of P2X FIFO 124.

Assume that data has been input in the order shown in the upper part of FIG. 14 (in the order of data 260-1, 260-2, . . . , 260-5, . . . ) from primary I/O 110 to P2X FIFO 124. Herein, each data block is labeled 'P2A' or 'P2B' representing the destination, and indicates the number in the order of the data block for each destination. For example, block 260-1 labeled 'P2A' is the first data to be output to port A 134, block 260-2 is the second data to be output to port A 134, block 260-3 labeled 'P2B' is the first data to be output to port B 136 and so on.

The data in these blocks are stored in a prescribed order into an available (empty) one of memory banks 250-1 to 250-n. Among these blocks, for those directed to port A 134, P2A Queue 242 inputs the memory bank numbers for the data to the entry 252-1 of the queue, and the entry of P2A Queue 242 is transferred sequentially from entry 252-1 to 252-2, and then to 252-3. Thus, the order of the blocks directed to port A 134 is held by P2A Queue 242. Meanwhile, the order of the blocks directed to port B 136 is similarly held by P2B Queue 244.

Figure 15:
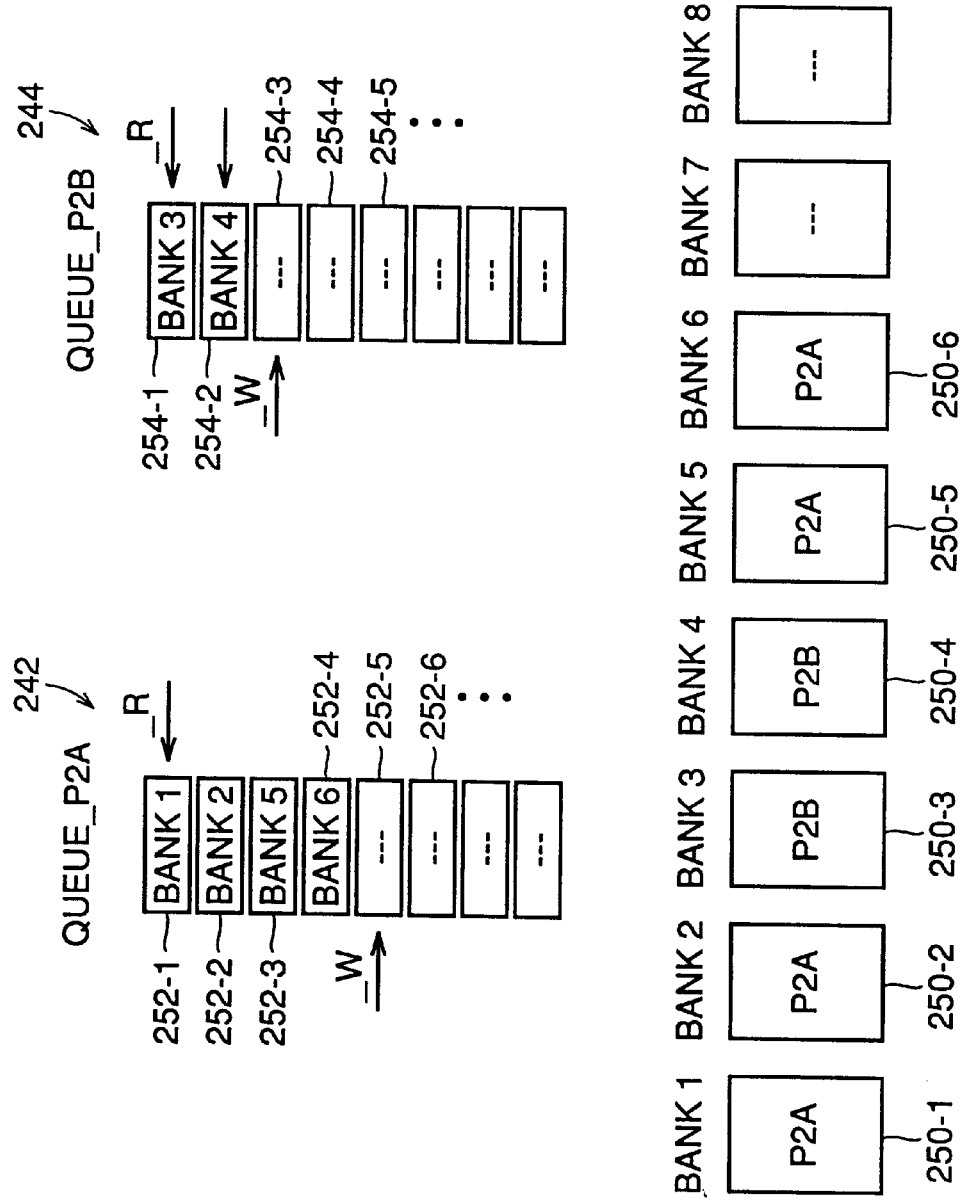
FIG. 15 is a diagram showing the operation of P2A Queue 242 and P2B Queue 244.

More specifically, as shown in FIG. 15, after each completed Write Access, a memory bank is dispatched, i.e., the corresponding Write Flag is set and an entry in the corresponding P2X Queue track unit is made. P2A Queue 242 has storage regions 252-1, 2, 3, 4, . . . , corresponding to a plurality of entries, a pointer Queue_P2A_W representing a writing position and a pointer Queue_P2A_R representing a reading position. Similarly, P2B Queue 244 has storage regions 254-1, 2, 3, . . . , and a pointer Queue_P2A_W and a pointer Queue_P2A_R. Each time a data block is written into memory banks 250-1, 2, 3, . . . , the number of the bank storing the data block is written to the position pointed to by the write pointer of the queue corresponding to the destination of the data block, and the write pointer is incremented. If the position pointed to by the read pointer is equal to the position pointed to by the write pointer, the queue is empty, and for example in the case of P2A Queue 242, a corresponding signal empty_R_P2a is activated. If the write pointer and the read pointer are different, Empty_R_P2A is inactivated. Port A 134 reads out the bank number from the position pointed to by the read pointer Queue_P2A_R when Empty_R_P2A is inactivated, reads data from the position represented by the bank number, and increments the read pointer. For data blocks directed to port B 136, a similar processing is executed by P2B Queue 244.

The internal signal 'Next_Bank_W' indicates the next available empty memory bank that can be written to. The internal signal 'Current_Bank_W' indicates the bank that is currently accessed and is used to mux out the attributes of the current bank. Any of memory banks 250-1 to 250-n can be skipped if it is full. In other words, the write sequence does not have to be strictly incremental (e.g., Bank 1-Bank 2-Bank 3 . . . ), but can be non-contiguous (e.g. Bank 1-Bank 4-Bank 6). For instance, suppose that there are eight memory banks (Bank_1 to Bank_8). As shown FIG. 16(A), if internal signal Next_Bank_W points out Bank_1, the bank to be pointed to by signal Next_Bank_W will be determined as follows. First, it is determined whether Bank_2 is occupied or empty. If it is empty, the next bank to be pointed to by Next_Bank_W is Bank_2. If Bank_2 is occupied, it is then determined wether Bank_3 is occupied or empty. If it is empty, the next bank to be pointed to by Next_Bank_W is Bank_3. If Bank_3 is occupied, Bank_4 will be checked. Thereafter, the banks up to Bank_8 are checked, and the value of Next_Bank_W is changed so that it points to an empty bank. If all the banks are occupied, the process returns to Bank_1 and waits until Bank_1 becomes empty.

Figure 16:
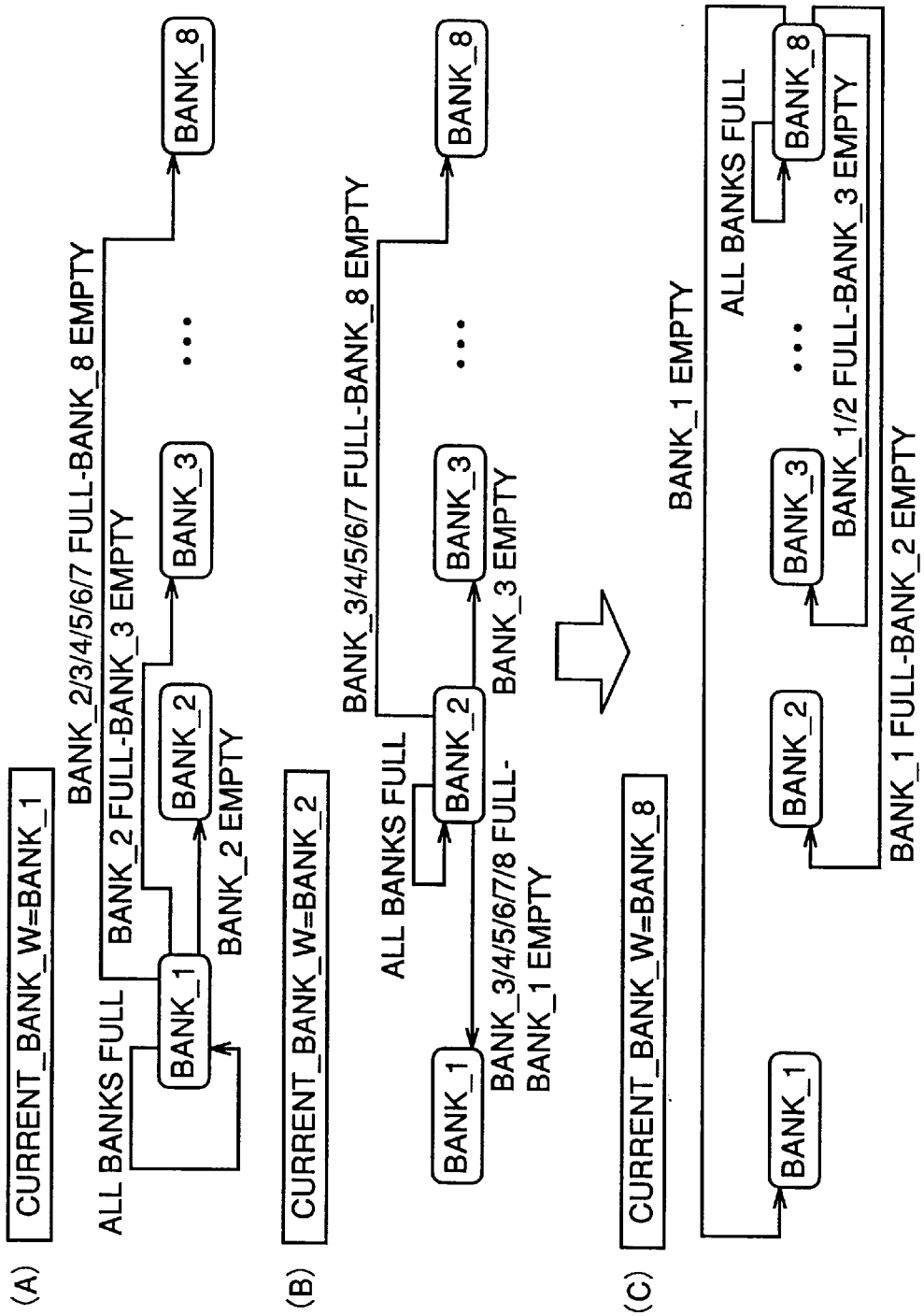
FIG. 16 is a diagram showing an algorithm to determine the next bank to store data in P2X FIFO 124.

Referring to FIG. 16(B), if Next_Bank_W points to Bank_2, Bank_3 is first to be checked, and then the banks are checked in the order of Bank_4, Bank_5, . . . up to Bank_8, and if no empty bank is found, the process returns to Bank_1, and if Bank_1 is checked if it is empty. Although the checking process starts from Bank_2, the value of Next_Bank_W is determined in the same manner as the case shown in FIG. 16(A).

FIG. 16(C) shows the order of checking when the bank pointed to by Next_Bank_W is Bank_8. Also in this case, the checking process starts from Bank_8, and otherwise the process is the same as in the case in FIGS. 16(A) and 16(B).

However, data of the same destination is not allowed to bypass older data with the same destination. Otherwise, data coherency would be corrupted. Dedicated P2A Queue 242 and P2B Queue 244 keeps track of write/read ordering.

Broadcasting to both secondary ports 134 and 136 is simply achieved by simultaneously write to two banks (by asserting two Enable Write signals with the same write data signals connected to all banks) and dispatch the two banks to both P2A Queue 242 and P2B Queue 244. The device driver has to enable the broadcast mode via an internal register (not shown) prior to the actual write access and turn it off afterwards if normal operation is desired. If the register is enabled, the internal logic that detects the next empty bank has to detect two empty banks instead of just a single one. It then signals the two banks to so that the Write Port State Machine can assert the corresponding write enable signals for the memory banks.

Figure 17:
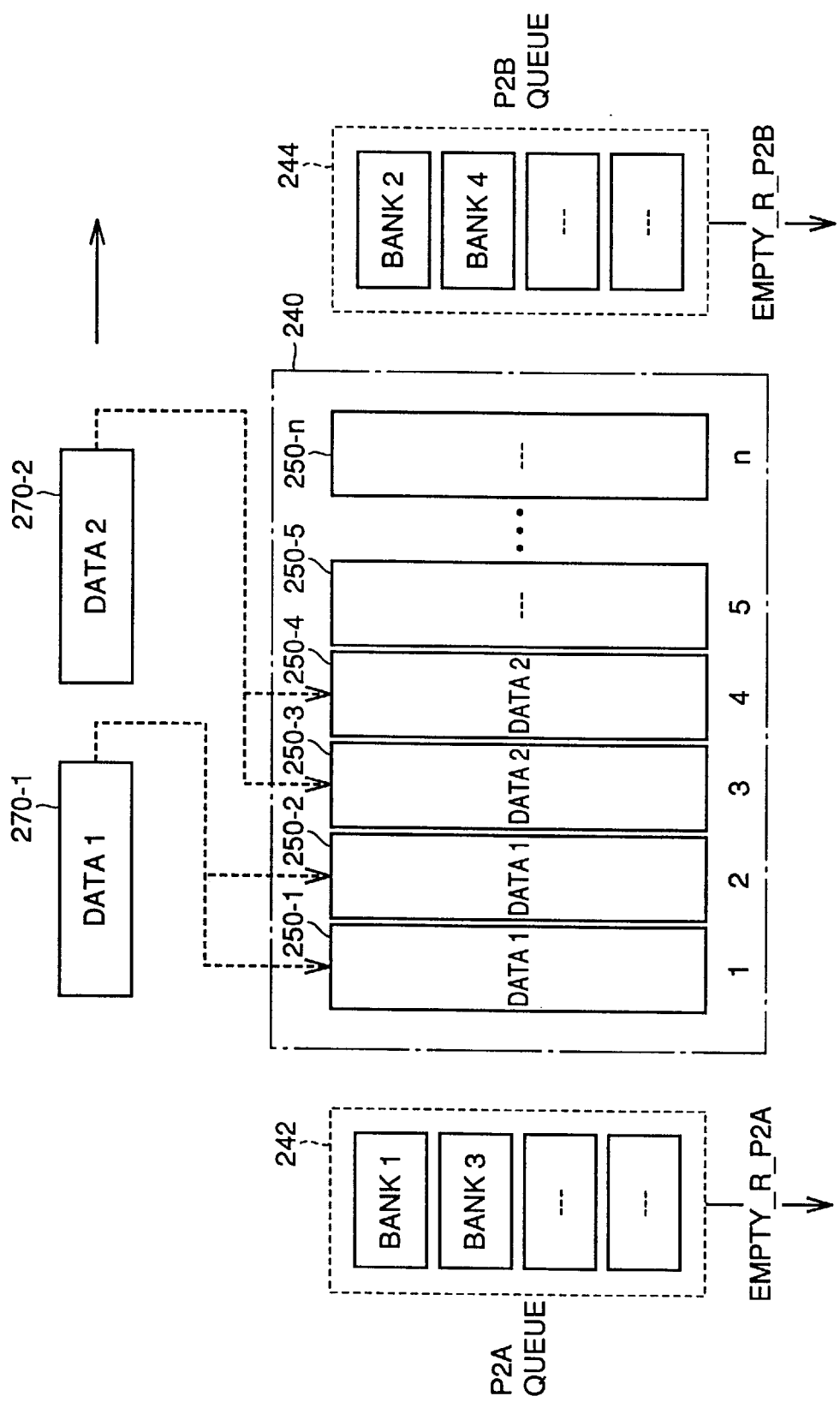
FIG. 17 is a diagram showing the operation of P2X FIFO 124 when it executes a broadcasting.

For instance, FIG. 17 shows two consegutive broadcasting to port A 134 and port B 136. In the first cycle, data block 270-1 is directed to both ports. By asserting Enable Write signals for banks 250-1 and 250-2 with the same write data signals, the data in block 270-1 is written into both memory banks 250-1 and 250-2. These memory banks 250-1 and 250-2 are then dispatched to P2A Queue 242 and P2B Queue 244. Thus, data in block 270-1 will be broadcasted to port A 134 and port B 136. The next block 270-2 will be also broadcasted to ports 134 and 136, with the data written in memory banks 250-3 and 250-4.

Figure 18:
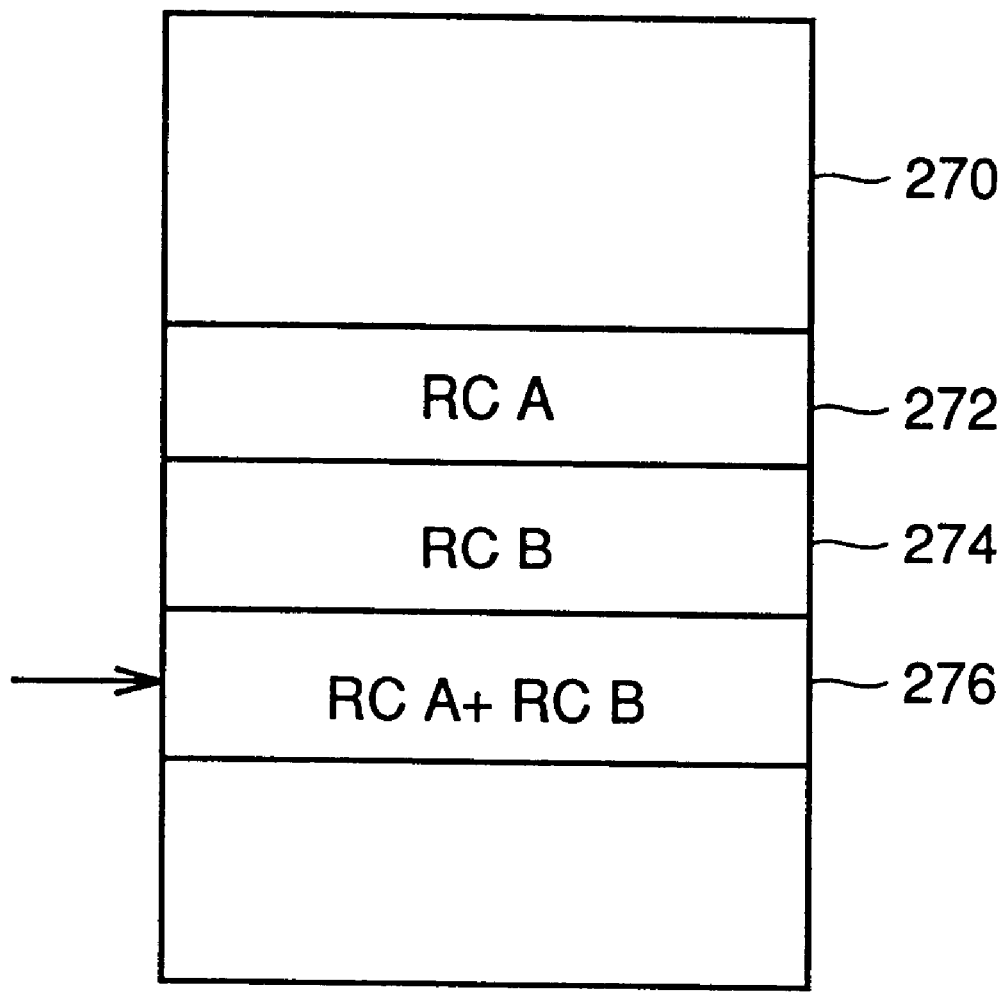
FIG. 18 is a memory map for broadcasting.

The broadcasting at this time is activated by specifying an address for broadcasting as a destination address. More specifically, as shown in FIG. 18, in a memory map 270, for example in addition to an RC A region 272 for a rendering controller connected to port A 134 and an RC B region 274 for a rendering controller connected to port B 136, an RC A+B region 276, a memory region to be specified to broadcast to both is provided. If the destination address of data is within RC A+B region 276, as described above, the device driver has to enable the broadcast mode via an internal register (not shown) prior to the actual write access.

['X2P' FIFO Architecture]

Figure 19:
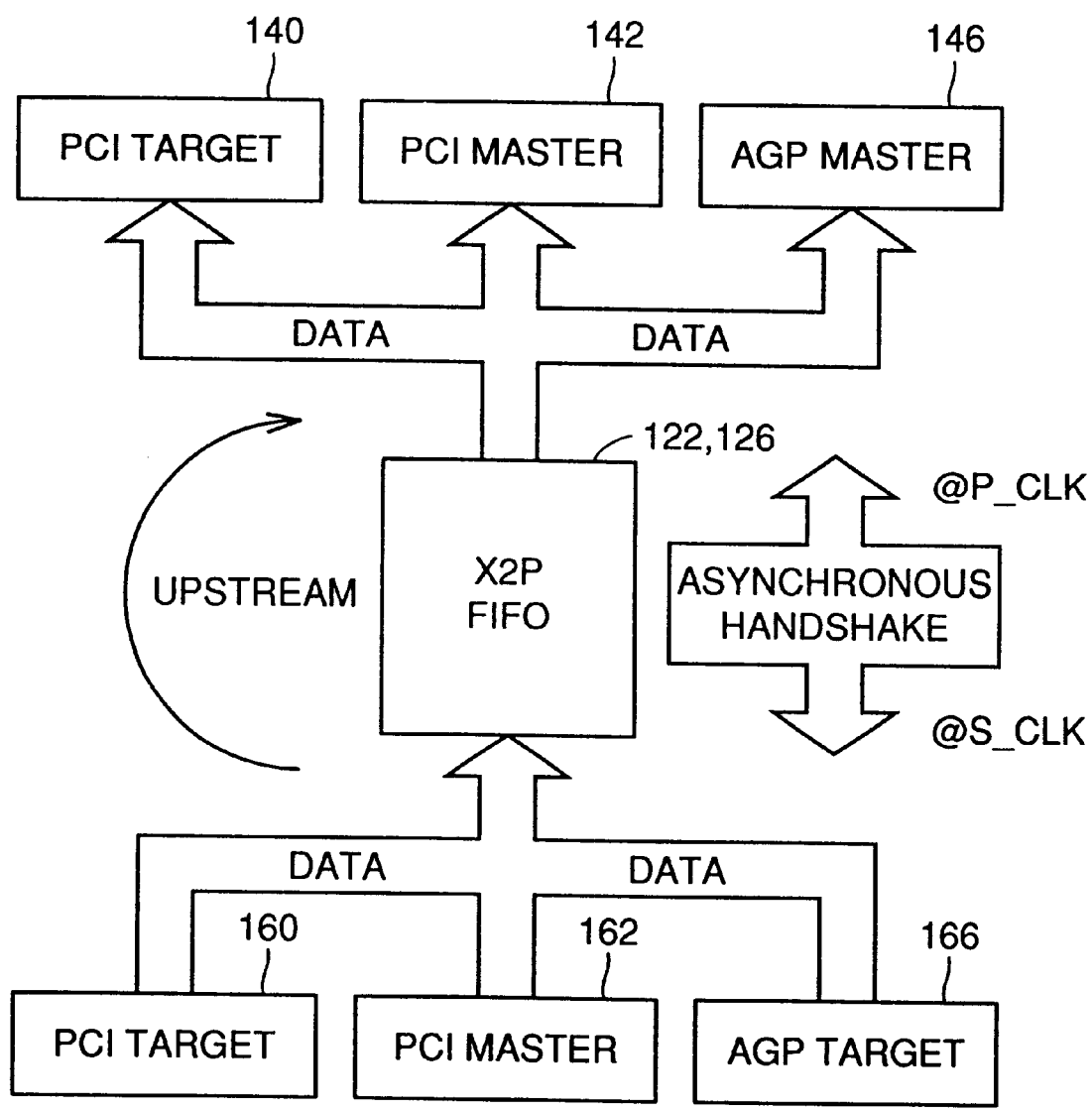
FIG. 19 is a diagram showing data streams related to A2P FIFO 122.

The 'X2P' FIFO (A2P FIFO 122 and B2P FIFO 126) has to bridge the Secondary side (Write Port) with the Primary side (Read Port). Thus, the write port is in the 'S_CLK' clock domain and the read port is in the 'P_CLK' clock domain. Therefore, the 'X2P' FIFO must provide asynchronous handshaking capabilities as shown in FIG. 19.

Primary I/O 110 contains three modules that access the read port of the 'X2P' FIFO, including PCI Target 140, PCI Master 142 and AGP Master 146. The secondary I/O contains three modules that access the write port of the 'X2P' FIFO, including PCI Target 160, PCI Master 162 and SBA Target 164.

Due to the fact that there are two entirely independent agents with write access (i.e., port A 134 and port B 136), the 'X2P' FIFO is cloned into two separate FIFOs, A2P FIFO 122 and B2P FIFO 126. They are 100% identical, but the write ports are connected to the respective secondary ports and the read ports are commonly connected to X2P arbiter 111. In the following, the 'X2P' FIFO architecture is described. The description applied to both the A2P FIFO 122 and P2X FIFO 124.

On the Secondary side, there are two write access 'agents' for each port. The first agent is the PCI Target 160 within bridge 68, which communicates with the PCI Master of the external AGP/PCI device connected to the Secondary side of bridge 68. The second agent is AGP Target 166 within bridge 68, which communicates with the AGP Master of the external AGP device connected to the Secondary side of bridge 68. As a result, the write port of A2P FIFO 122 and 124 features two sets of signals for each write access agent.

Each write access agent can select the output mode of the data it provides. The bridge 68 features two separate sets of registers (not shown) that can be programmed by the device driver during initialization. The specific bits of the registers and their respective meanings are shown in Table 9.

TABLE 9

| 00b | PCI Write |
| 01b | AGP Write 1x |
| 10b | AGP Write 2x |
| 11b | AGP Write 4x |

Since 'Fast Write' are only supported for downstream transactions, i.e., from an AGP Target to an AGP Master, 'Fast Writes' can not be selected as an output mode on the Primary side. Note that the output mode can not be changed dynamically, i.e., it can be selected only during the initialization.

For example, the secondary PCI Write transaction could be transformed into an AGP Write 2xtransaction on the Primary side or the AGP 2xtransaction on the Secondary side could be transformed into an AGP 4xtransaction on the Primary side.

There are several things to consider when selecting the primary output mode. If bridge 68 is in an PCI slot, PCI Writes are the only supported mode. Most of the current generation rendering controllers do not feature a PCI compliant interface (electrical and logical issues) and thus, bridge 68 facilitates this device to be connected to a PCI slot and still comply with the specifications and vice versa if bridge 68 is in an AGP slot. There are many PCI devices that cannot be connected to an AGP slot for electrical reasons, thus, the bridge 68 facilitates this device to be connected to an AGP slot. Also, some AGP devices may not be electrically compliant with the AGP slot (1.5 V or 3.3 V) and may not feature the highest possible data rate (i.e., 4xdata rate). Thus, since the AGP slot provides a much higher bandwidth (up to 8x) and with two decoupled secondary ports, the Primary side may become a bottleneck if it would be the same speed as two transmitting agents on the Secondary side. So with the AGP 4xtransfers selected on the Primary side, the Primary side should be able to keep up with the data input from the Secondary side in most of the cases.

A2P FIFO 122 and B2P FIFO 126 have the same structure as that shown in FIG. 7 and FIG. 8. Thus, each memory bank within A2P FIFO 122 and B2P FIFO 126 'owns' a set of attributes. The selected output mode is one of those attributes. During the write access, output is done from a memory bank in the mode as indicated by the attributes of the corresponding to the memory bank.

Figure 20:
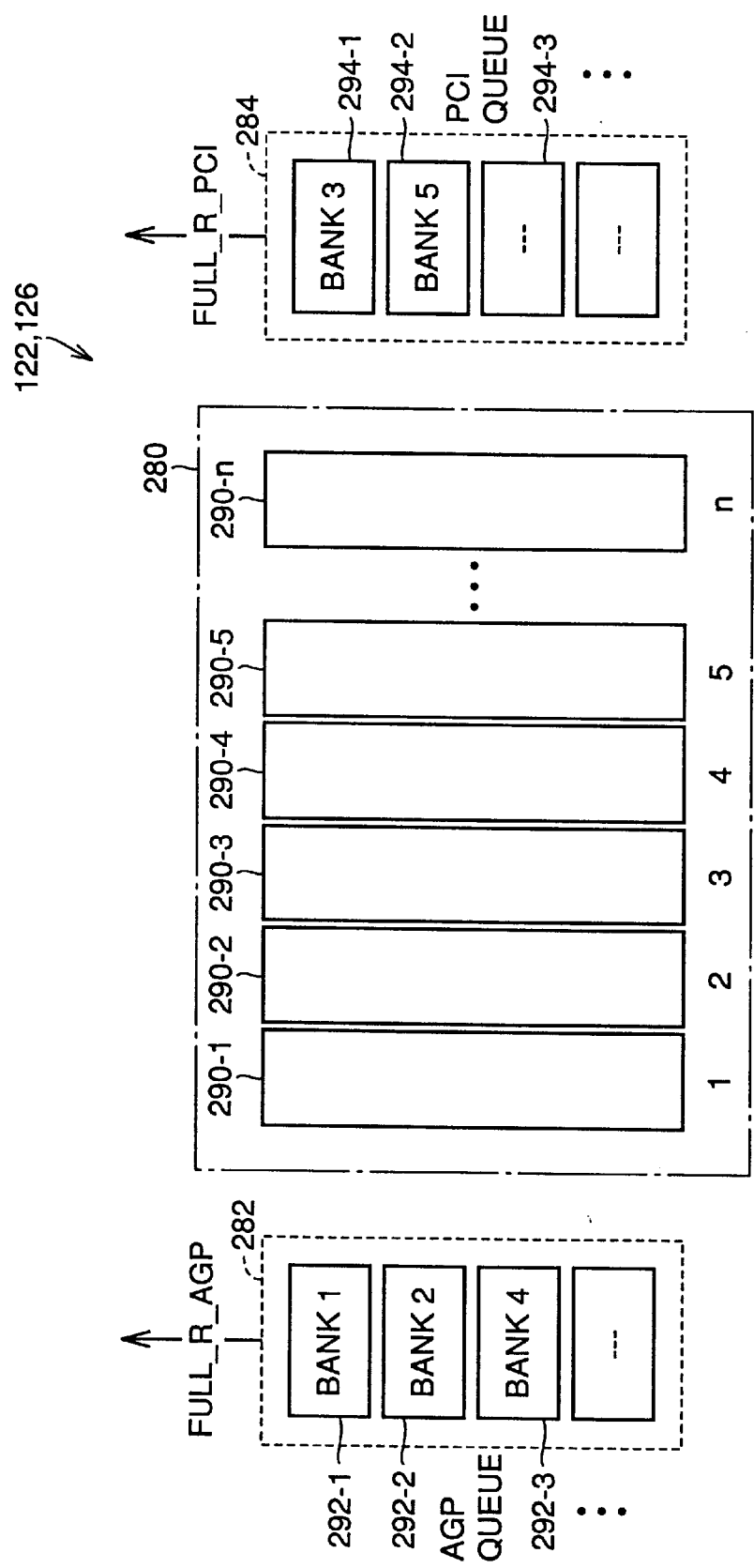
FIG. 20 is a diagram of a general configuration of X2P FIFO.

Referring to FIG. 20, A2P FIFO 122 and B2P FIFO 126 are each organized into the following structure. The FIFO (A2P FIFO 122 or B2P FIFO 126) includes an array 280 of memory banks 290-1 to 290-n, an AGP queue 282 and a PCI queue 284.

Data in an AGP output mode and in PCI output mode are all stored in array 280. When mixing AGP and PCI output modes in array 280, the following problems arises. Bridge 68 sustains ordering within the same protocol mode in the following manner. If AGP Writes are selected for output mode, the requests are enqueued into the primary SBA queue in the exactly same order as received. Due to AGP specifications, the data is collected (i.e. GNT# is issued by the core logic) in the same order as issued by the bridge 68. If PCI Writes are selected for output mode, primary REQ# is issued by primary PCI Master 142, which fetches the data from A2P FIFO 122 or B2P FIFO 126 ('X2P' FIFO). So it is actually the FIFO itself that determines the output order of PCI Writes.

However, AGP/PCI output modes are mixed, it is in the control of the primary bus arbiter to determine ordering of the write cycles. Since this arbiter is located in core logic 62 as shown in FIG. 1 external to the bridge 68, the ordering within the 'X2P' FIFO may not match the ordering of the output on the Primary side. Thus, the data output is not sequential. As a result, a queue control logic for two independent read queues has t be implemented within the 'X2P' FIFO, one for the AGP output mode and one for the PCI output mode. So during the write access, a 'tag' is enqueued to the respective queue indicating the bank the data is stored in.

Referring to FIG. 20, AGP queue 282 contains tags indicating bank 290-1, 290-2, . . . , 290-n in array 280 the data associated with the AGP request is stored in and PCI queue 284 contains tags indicating bank 290-1, 290-2, . . . , 290-n in array 280 the data associated with the PCI request is stored in. Thus, AGP requests and PCI request are kept in order respectively.

Figure 21:
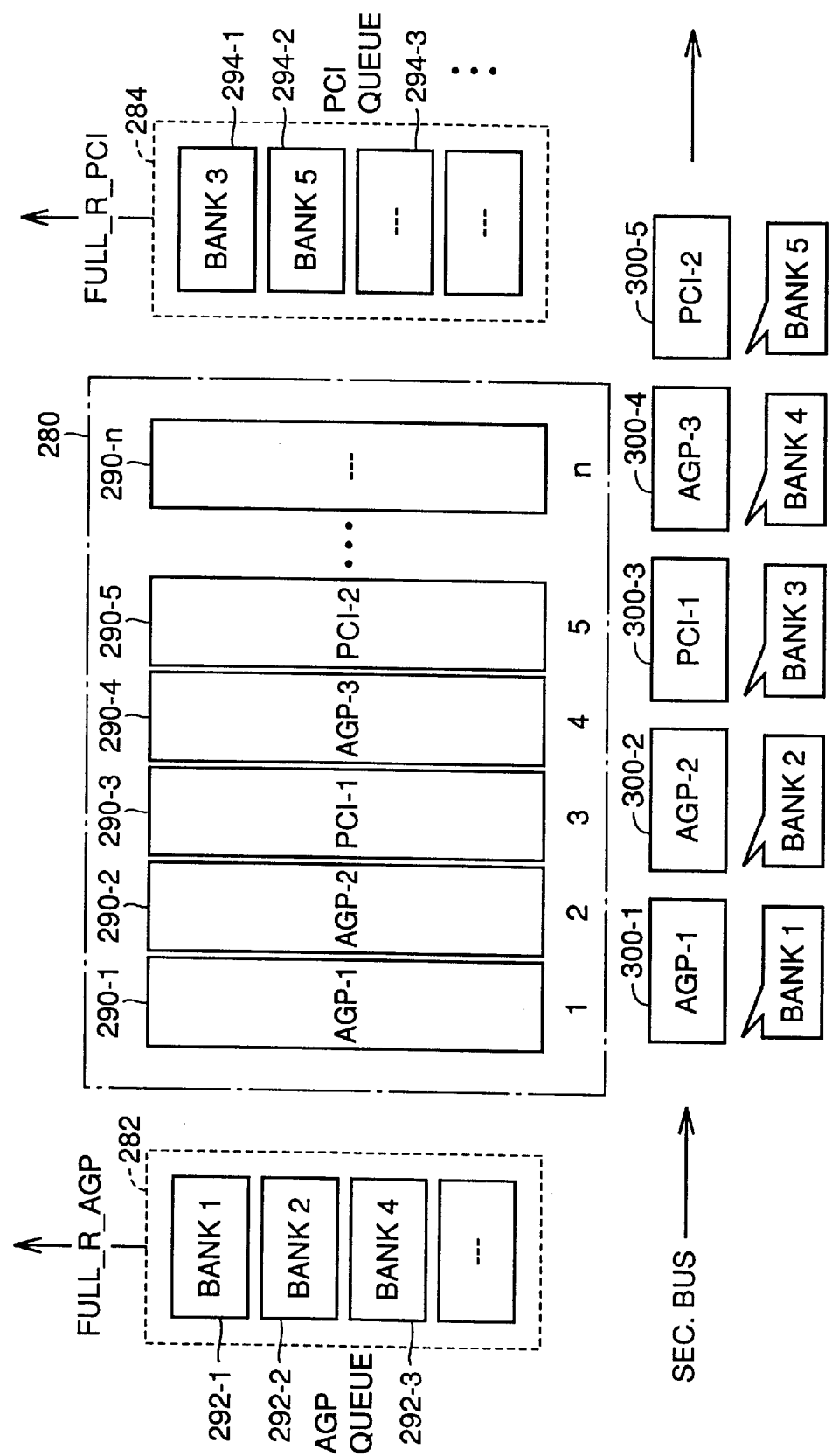
FIG. 21 is a diagram showing the operation of X2P FIFO.

For instance, referring to FIG. 21, suppose data 300-1, 300-2, 300-3, 300-4, 300-5, . . . are input to 'X2P' FIFO (A2P FIFO 122 and B2P FIFO 126). These blocks contain AGP_1, AGP$_{2,}$ $_{PCI}$_1, AGP_3, and PCI_2 requests, respectively. These requests will be stored in banks 290-1, 290-2, 290-3, 290-4, and 290-5, respectively. Because AGP queue 282 enqueues tags for AGP requests, it stores 'Bank_1', 'Bank_2', and 'Bank_4' tags. Likewise, PCI queue 284 enqueues tags for PCI request, it stores 'Bank_3' and 'Bank_5' tags. When AGP queue 282 is not empty, it outputs Full_R_AGP to indicate that it contains a valid AGP request. Likewise, when PCI queue 284 is not empty, it output Full_R_PCI to indicate that it contains a valid PCI request.

['S2S' FIFO Architecture]

The 'S2S' FIFO (S2S FIFO 128) has to bridge the two secondary ports, i.e., port A 134 and port B 136. There are two fundamental implementation, the first being a completely synchronous FIFO and the second one a completely asynchronous FIFO. If the application targeted utilizes two identical devices on both ports, e.g., two AGP rendering controllers, there is no need to maintain two separate clock domains since they both can run on the same clock. Thus, the write port is in the 'S_CLK' clock domain and the read port is in the same 'S_CLK' clock domain. The implementation is less complex and less latency is introduced due to the missing asynchronous handshake penalty. However if different clock speeds are required, e.g. an older 33 MHz only PCI device is plugged into one port side, the two secondary ports have to be asynchronous. Thus, the write port is in the 'S_A_CLK' clock domain.

Figure 22:
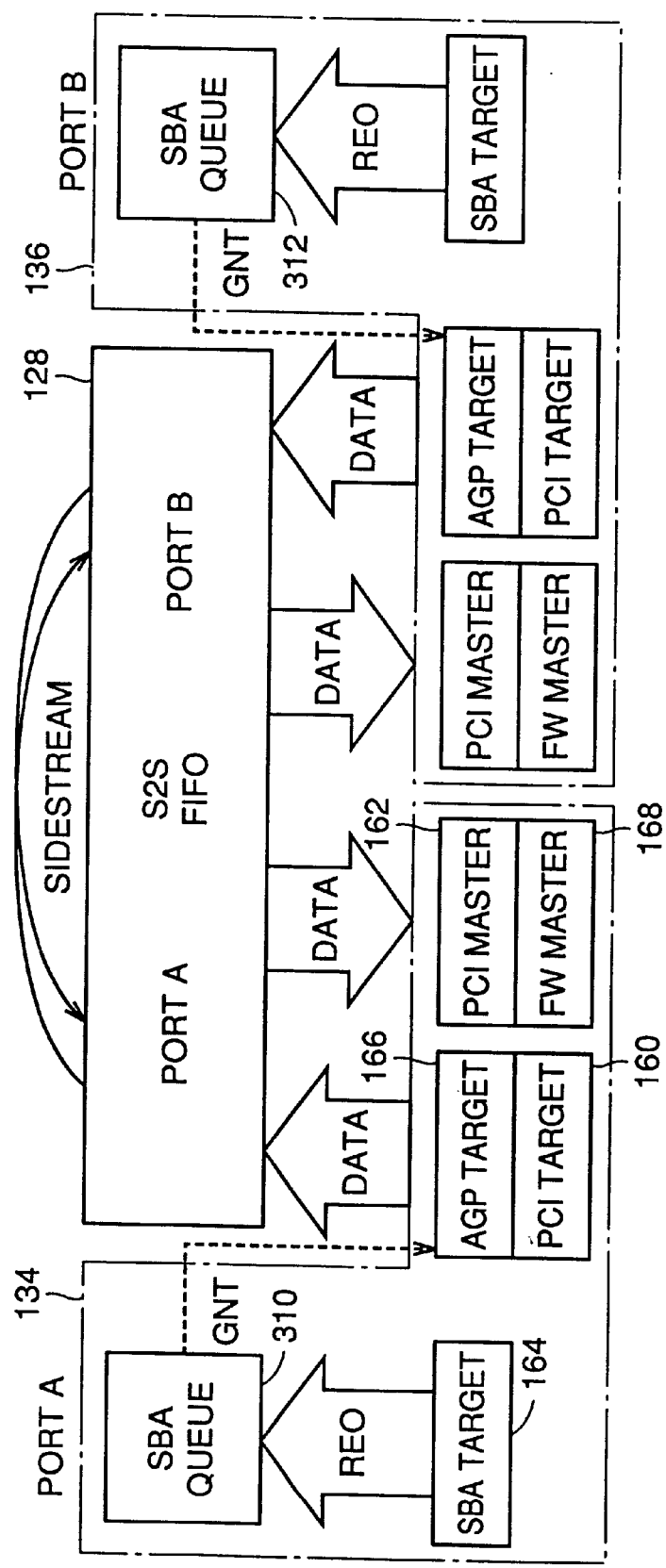
FIG. 22 is a diagram showing data streams related to S2S FIFO 128.

Referring to FIG. 22, each secondary Port contains two modules that access the write port of S2S FIFO 128., including PCI Target 160 (PCI Write) and AGP Target 166. Each secondary Port contains two modules that access the read port of the 'S2S' FIFO, including PCI/FS Master 12 and 168 (PCI Write or Fast Write) and AGP Target 166.

Since the external devices can not handle a read and write access at the same time, there is no need for a simultaneously bi-directional FIFO. A sequentially bi-directional FIFO will be sufficient. That is to say, both directions for data transfer are supported and both secondary ports can be either write or read agents, but S2S FIFO 128 only features a single write and read port state machine.

As shown in FIG. 22, port A 134 further includes SBA Target 164 and entry queue 310 for enqueueing SBA request from SBA Target 164. Likewise, port B 136 further includes SBA Target and SBA Queue 312. Since the direction of the transaction between the agents connected to port A 134 and port B 136 is under control of the host, arbitration is not necessary for S2S FIFO 128.

[X2P Arbiter 111]

Figure 26:
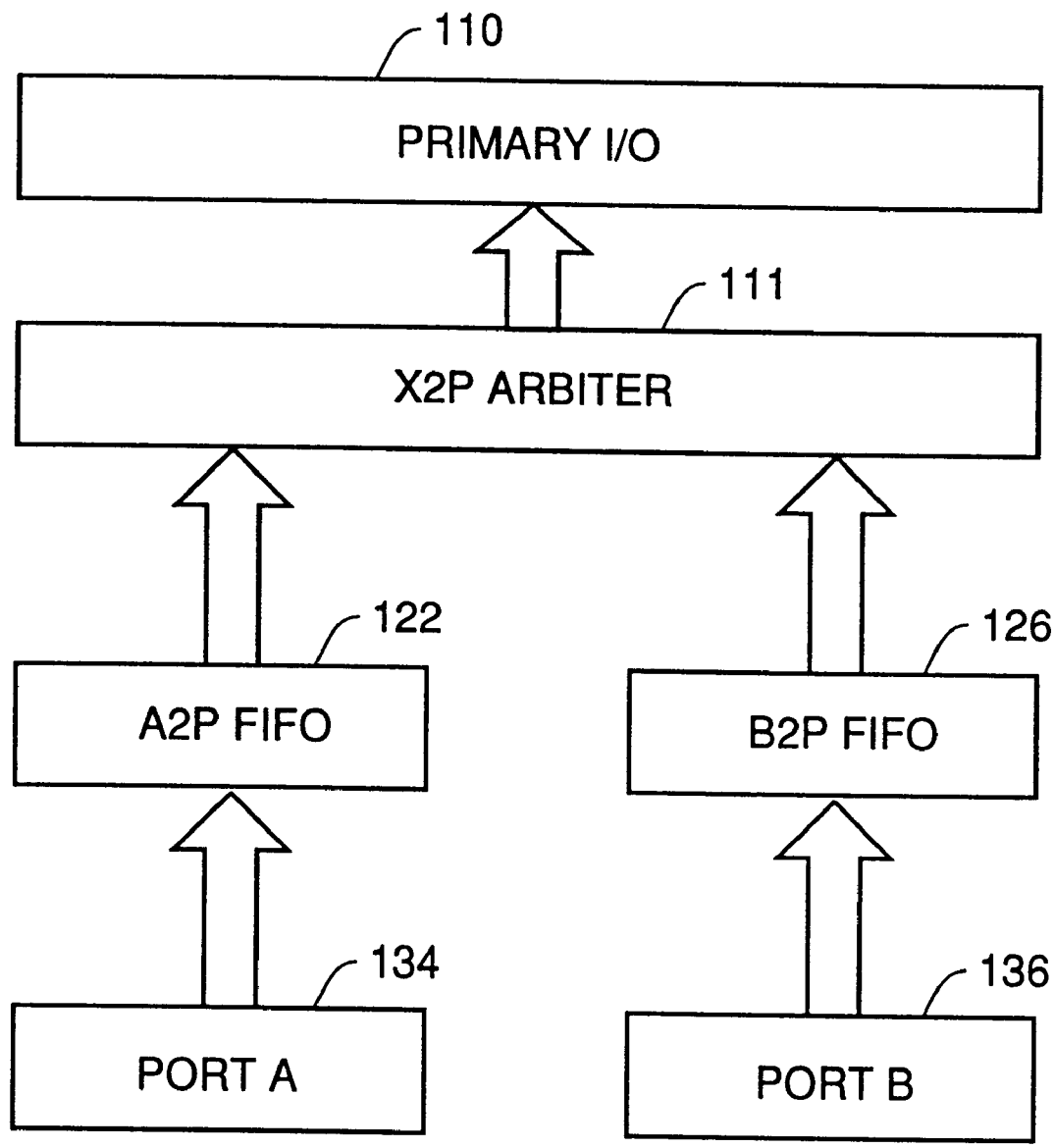
FIG. 26 is a diagram showing data streams related to X2P arbiter 111.

As shown in FIG. 26, since there is only a single primary port (primary I/O 110), but two independent secondary ports (port A 134 and port B 136), an X2P arbiter 111 has to be implemented that selects/assigns requests from/to any of the two 'X2P' FIFOs. As far as AGP Write requests are concerned, the SBA arbiter 120 is carrying out that task, the 'X2P' Arbiter only delivers the corresponding write data.

Figure 23:
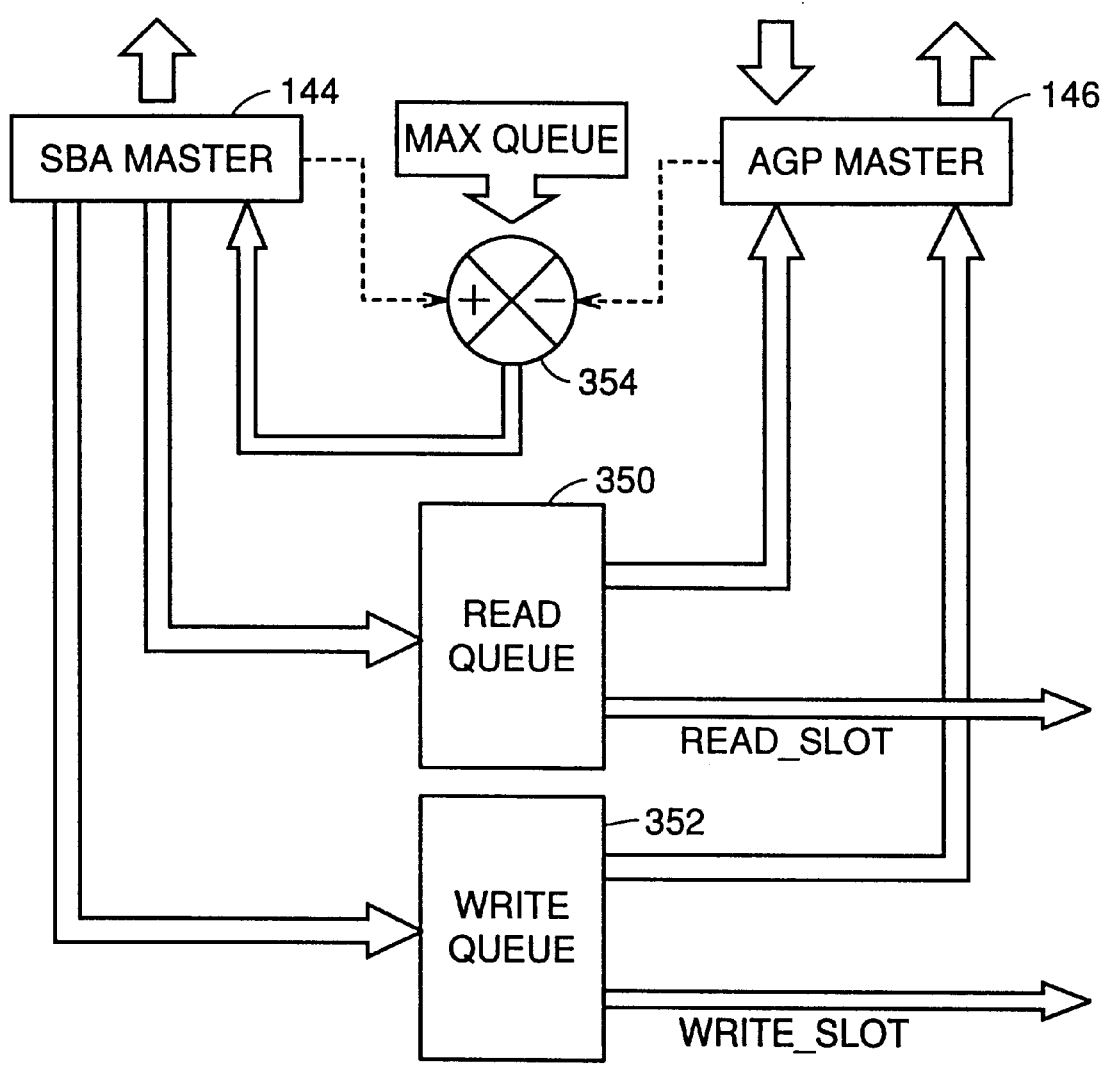
FIG. 23 is a diagram of a general configuration of a Primary SBA unit.

Referring to FIG. 23, a primary SBA unit located in primary I/O 110 includes two separate queues 350 and 352 for storing and propagating low priority Read requests and low priority Write requests received from SBA Master 144, and a queue counter 354. Each time SBA Master 144 enqueues a request, it increments queue counter 354. Each time AGP Master 146 processes a request, AGP Master 146 decrements queue counter 354. Thus, queue counter 354 keeps track of the number of requests in queues 350 and 352. The count in queue counter 354 has an upper limit Max_Queue.

Figure 24:
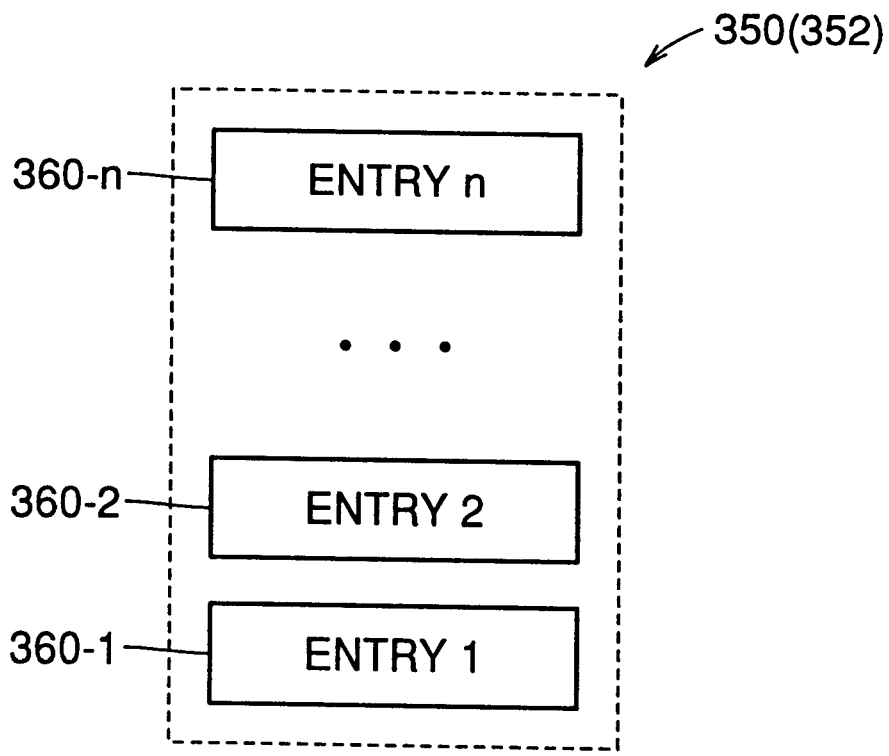
FIG. 24 is a diagram of the construction of a Read/Write Queue within a Primary SBA unit.
Figure 25:
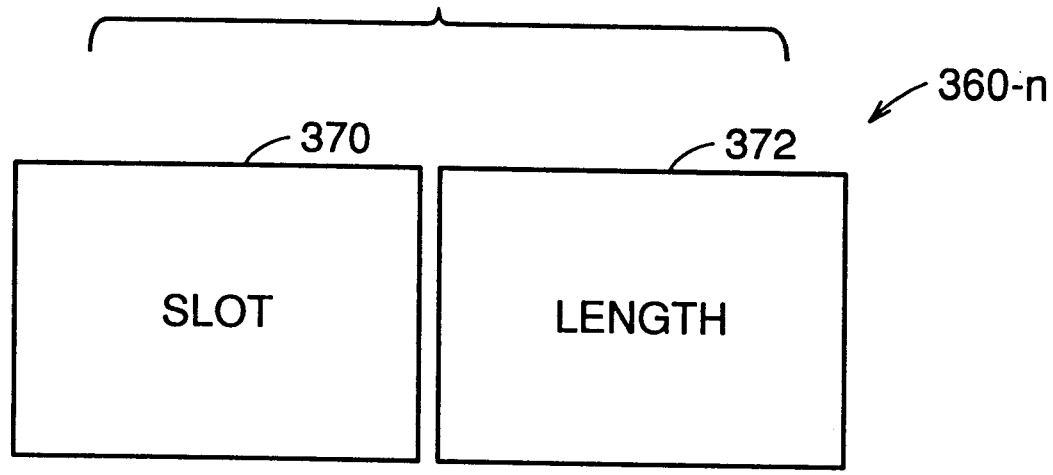
FIG. 25 is a diagram showing the construction of each entry in a Primary SBA unit.

Referring to FIG. 24, read queue 350, for example, includes n entries 360-1 to 360-n. Referring to FIG. 25, each entry 360, entry 360-n for example, includes slot 370 and a length 372 of the data to be read or written. The slot 372 represents a source of the Request, i.e., slot A (port A 134), slot B (port B 136), and slot D (DMA). The read queue 350 delivers the slot number (Read_slot) to X2P arbiter 111, and delivers the length to AGP Master 146. Likewise, write queue 352 delivers length to AGP Master 146 and delivers Write_slot to X2P arbiter 111

Figure 27:
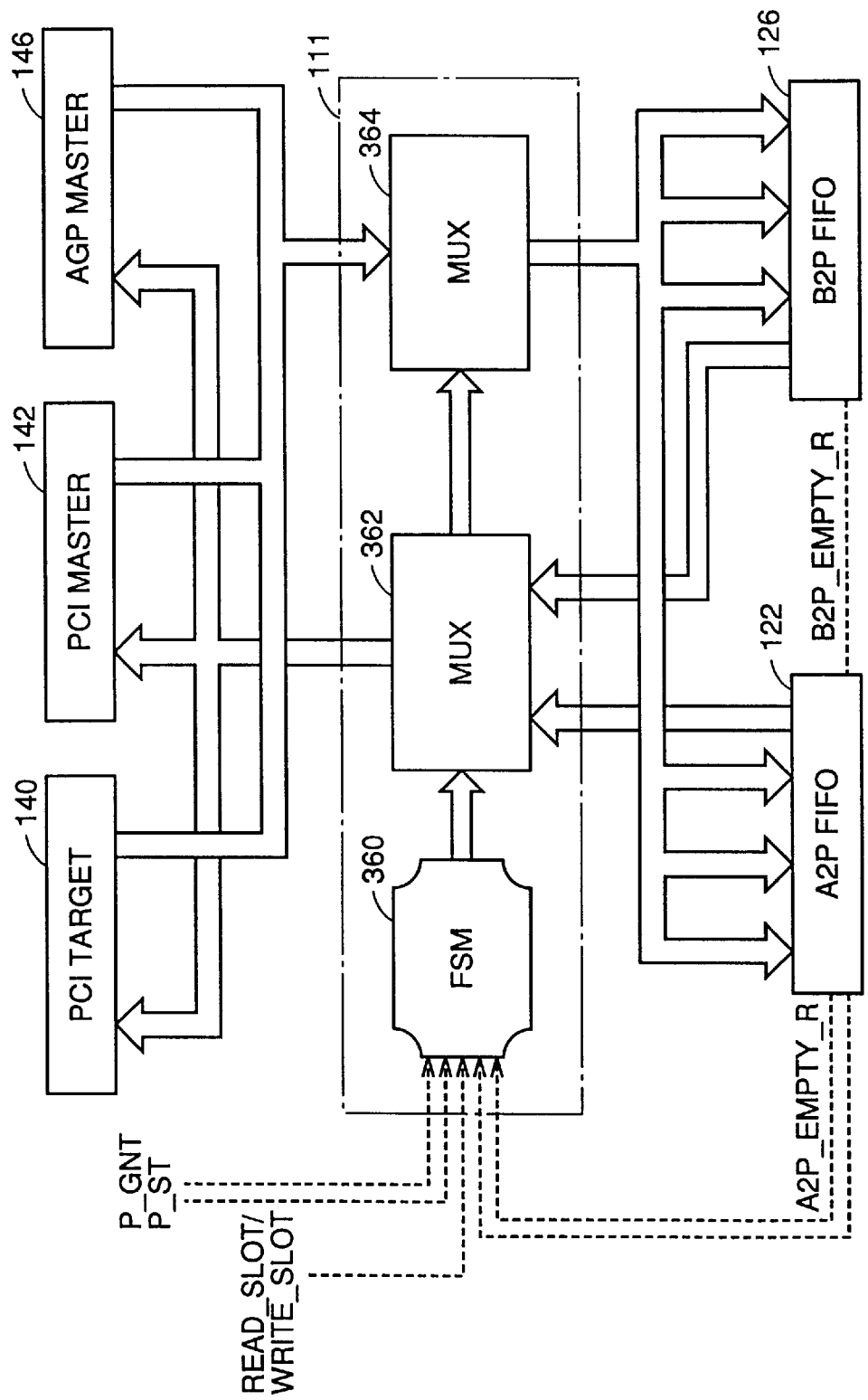
FIG. 27 is a diagram of a general configuration of X2P arbiter 111.

Referring to FIG. 27, if the X2P arbiter 111 senses the permission to provide AGP Write data from the core logic 62, i.e., P_GNT indicating grant of the primary bus 66 is asserted and the P_ST lines which represent the kind of request, i.e., PCI or AGP, Read or Write, indicate a low priority write, it selects the source data dependent on the 'SBA_SLOT' information (Read_slot or Write_slot) from the primary SBA queue. If it indicates slot A, i.e., the A2P FIFO 122, the 'A2P' channel is switched through and the 'B2P channel' is blocked by MUX 362 and MUX 364 under control of FSM 360. If it indicates slot B, then the switching is vice versa.

As far as PCI write requests are concerned, the primary PCI Master 142 is issuing requests to the core logic 62 via its REQ# line. Thus, it does not feature any queuing logic. The 'X2P' arbiter then simply 'ANDs' the 'Empty' flags from both FIFOs to the PCI Master. In order to grant fair access to the PCI Master, a simply fair arbitration scheme is implemented, where the ownership is toggled between the two FIFOs if routed through. If desired, a priority based arbitration scheme can be applied as well.

['X2S' Arbiter]

Figure 28:
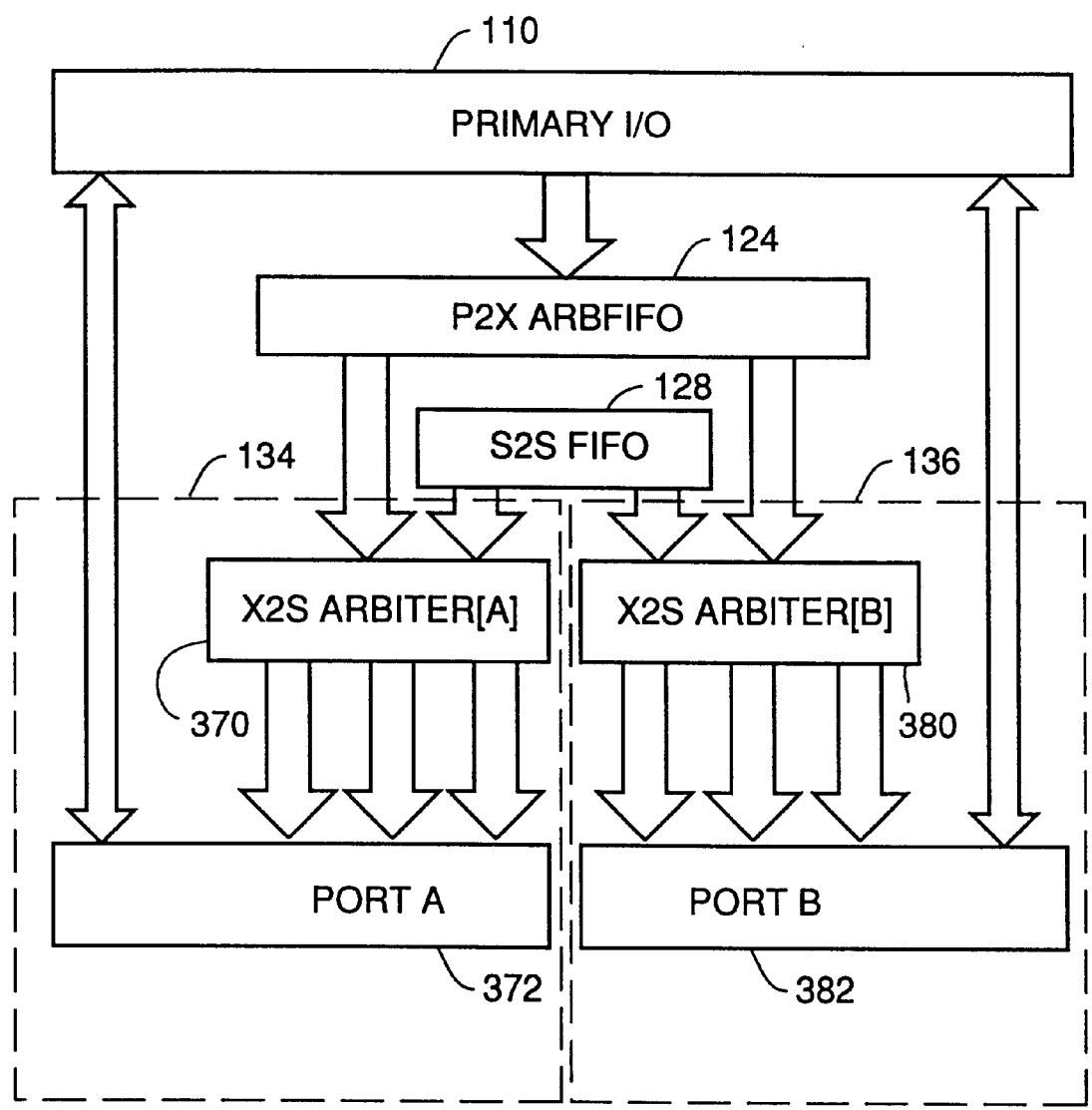
FIG. 28 is a diagram of data streams from the Primary side to the Secondary side according to the first embodiment.

Referring to FIG. 28, each secondary port 134 or 136 has two sources for downstream. The first one is the P2X FIFO 124, i.e., downstream data. The second one is the S2S FIFO 128, i.e., sidestream data. Thus, the port A 134 includes X2S arbiter 370 to arbitrate the inputs and Port A 372 which receive data from X2S arbiter 370. Likewise, port B 136 includes X2S arbiter 380 and Port B 382.

The secondary port 134 or 136 indicates each finished burst via 'Rotate' signal. Every time this signal is sensed high,by the X2S arbiter 370 or 380, it reevaluates ownership of its corresponding port. Two algorithm can be selected in evaluating the ownership. The first is a fair one, where the ownership toggles on one-by-one basis. If two write access requests are sensed, the ownership toggles from the current owner to the other one. If no other request is sensed, the current one can keep the ownership, i.e., 'parked on last'. The second algorithm is a 'fast lane' algorithm. Since the 'P2X' FIFO might contain OS-induced data with realtime requirements such as cursor updates, it might be preferable to give the 'P2X' data path almost unconstrained access to the secondary port. However, ownership only changes if the 'Rotate' signal is sensed high i.e., 'S2S' data path is allowed to complete its current burst.

[Secondary SBA Units]

Figure 29:
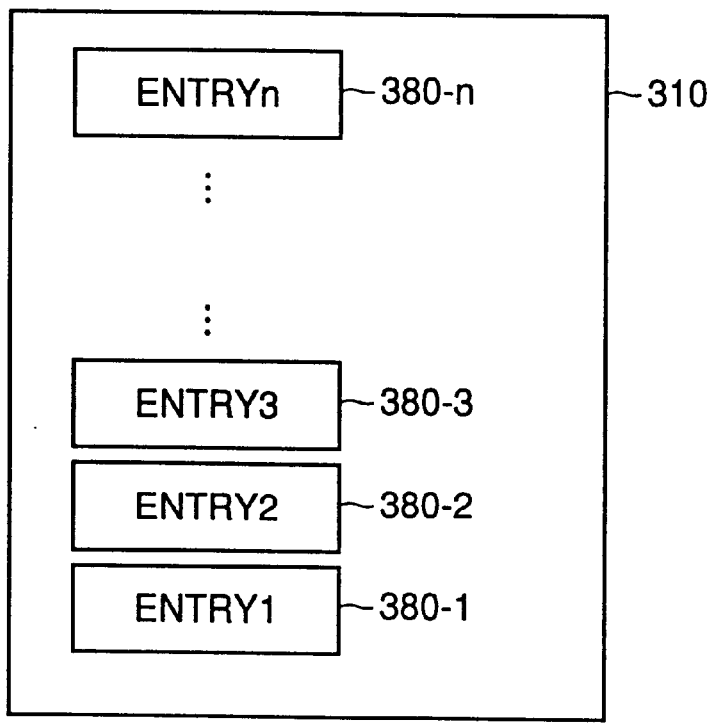
FIG. 29 is a diagram of the configuration of an entry queue 310 within Secondary SBA unit.

As shown in FIG. 22, each secondary port A 134 and 136 features a separate and decoupled SBA Unit each including, for example, entry queue 310 and SBA Target 164. Referring to FIG. 29, entry queue 310 includes n entries 380-1 to 380-n, i.e., entry queue 310 depth is n entries.

The SBA Target 164 decodes the sideband signals according to the AGP specifications. The SBA queue handling is unique to the present embodiment and will be described in the following.

All requests are propagated 'in order', i.e., in true FIFO fashion. This simplifies design without performance impact. The requests are enqueued by the secondary port. Therefore, the write port of the entry queue is in the S_CLK clock domain. The requests are fetched by the SBA arbiter 120 on the Primary side. Therefore, the read port of the entry queue is in the P_CLK clock domain. Thus, an asynchronous REQ/ACK handshake pair for each entry is required.

Figure 30:
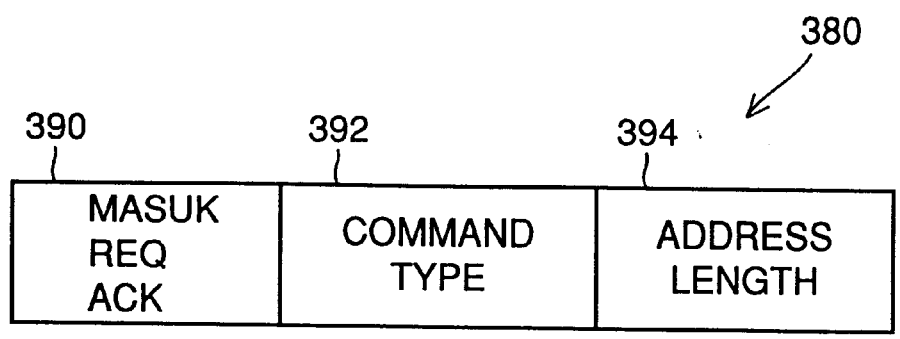
FIG. 30 is a diagram of the construction of each entry in entry queue 310.

Referring to FIG. 30, each entry 380 includes the information acquired from the SBA port, including control information 390, command type 392, and address length 394. In addition, every entry 380 owns a 'Type' attribute which is defined as follows:

TABLE 10

| | |
|---|---|
| 00b | Propagate |
| 01b | Mask, Block & Propagate |
| 10b | Mask & Invalidate |
| 11b | Reserved |

All read request including 'Flush' are propagated 'as is'. For Write request, the corresponding write data has to be claimed before the request can be propagated to the Primary side. Otherwise the AGP specification might be violated. If the request is issued on the Primary side, before the write data is completely in the 'X2P' FIFO, the bridge 68 might not be capable of providing the data for the corresponding GNT# signal. In order to avoid this, the request entry is tagged with a '01b' type which masks the request to the Primary side, i.e., it is invisible and can not be fetched by the read port of the SBA unit A 116 or SBA unit B 118. It is also blocking all requests 'behind' it in order to sustain the ordering. As a result, a read request enqueued after a write request will be invisible to the primary SBA unit until the write request is completely processed.

Figure 31:
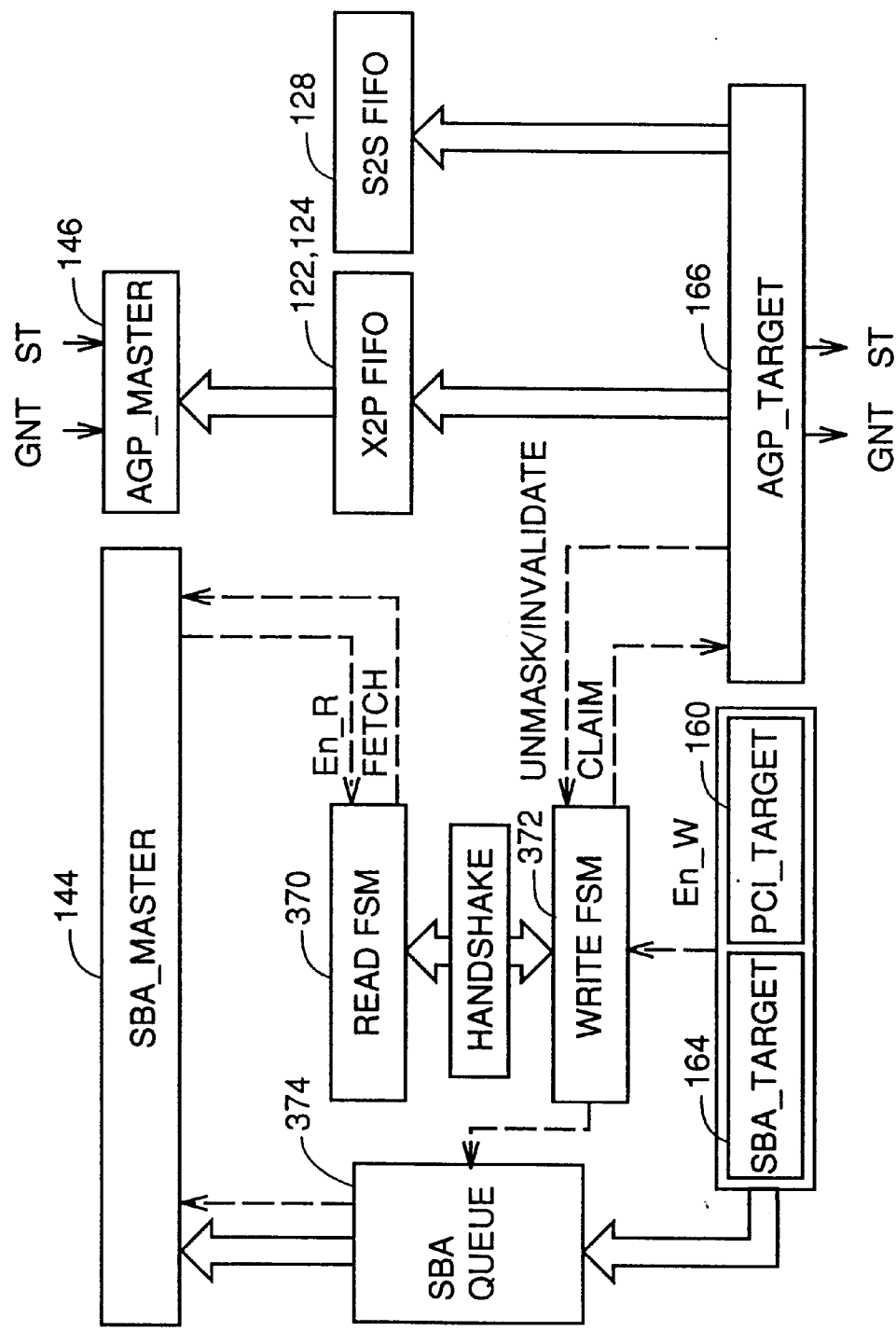
FIG. 31 is a diagram showing masking/invalidation of a full signal by a SBA queue and a data stream associated therewith.

Referring to FIG. 31, for this to happen, the SBA unit A 116 or SBA unit B 118 issues a request to the AGP Target 166 of the same port, indicating that it contains a pending AGP Write request. The AGP Target 166 issues GNT#/ST signals and fetches the write data according to the specification and forwards the data to the A2P FIFO 122 or P2X FIFO 124. Once the data is dispatched completely, i.e., the entire burst (as defined by the request size), the AGP Target 166 indicates to the SBA unit that the SBA unit can release the masked entry. As a result, the SBA entry in entry queue 310 is propagated to the Primary side (AGP Master 146) and the next entry is made visible.

A special case is sidestream transactions, where the destination of an AGP Write is not the system memory, i.e., the Primary side, but the opposite port on the Secondary side. In that case, the entry is also masked by the SBA unit and a request is made to the AGP Target 166 of the same port. Data is fetched in the same fashion, but in this case the data is stored in the S2S FIFO 128. Once the data is dispatched completely, the SBA unit does not release the entry, but invalidate it since it is not issued on the other port.

Finally, not only the SBA Target 164 is allowed to enqueue request to the entry queue 310, but also the PCI Target 160 of the same port is allowed in order to allow PCI to AGP protocol transformation. Thus, the SBA unit features two separate write ports. The PCI Target 160 provides the same information as the SBA Target 164, i.e., length, command and address.

[SBA Arbiter 120]

Figure 32:
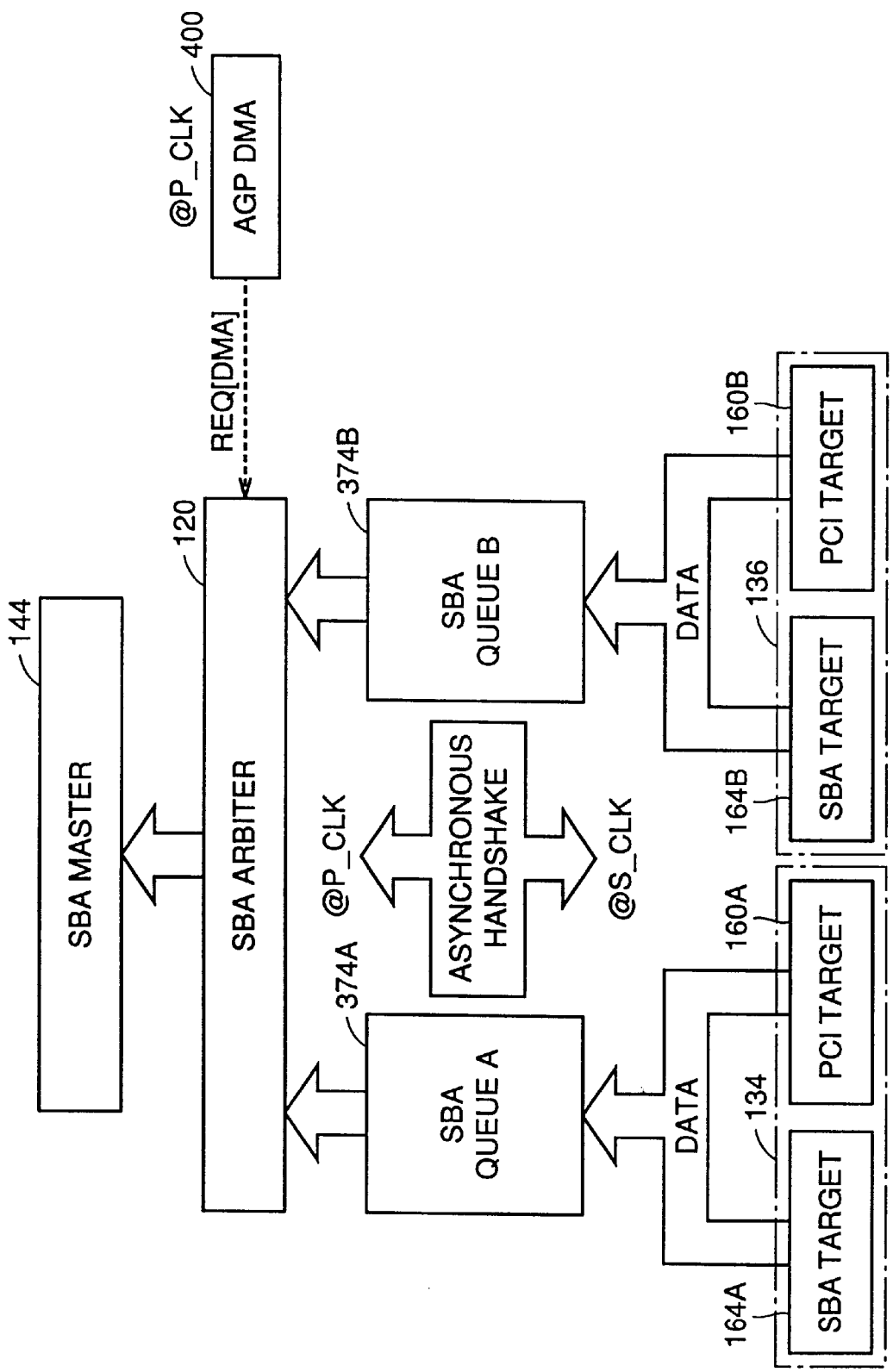
FIG. 32 is a diagram showing propagation of SBA requests.

The primary SBA arbiter 120 has to manage three request slots. The first, Slot A, is driven by the port A 134. The second, Slot B, is driven by port B 136. The third, Slot D, is driven by the primary DMA engine 400, as shown in FIG. 32. All the sources are completely decoupled and can issue SBA request independently from each other. A priority base arbitration scheme is implemented that allows to assign a weight to each request source. A higher weight allowed the currently active agent to explore potential locality by issuing repeatedly Type 1 requests, i.e., Type 3 and Type 2 are not required if the same agent is making multiple request. This increases throughput on the SBA port.

Figure 33:
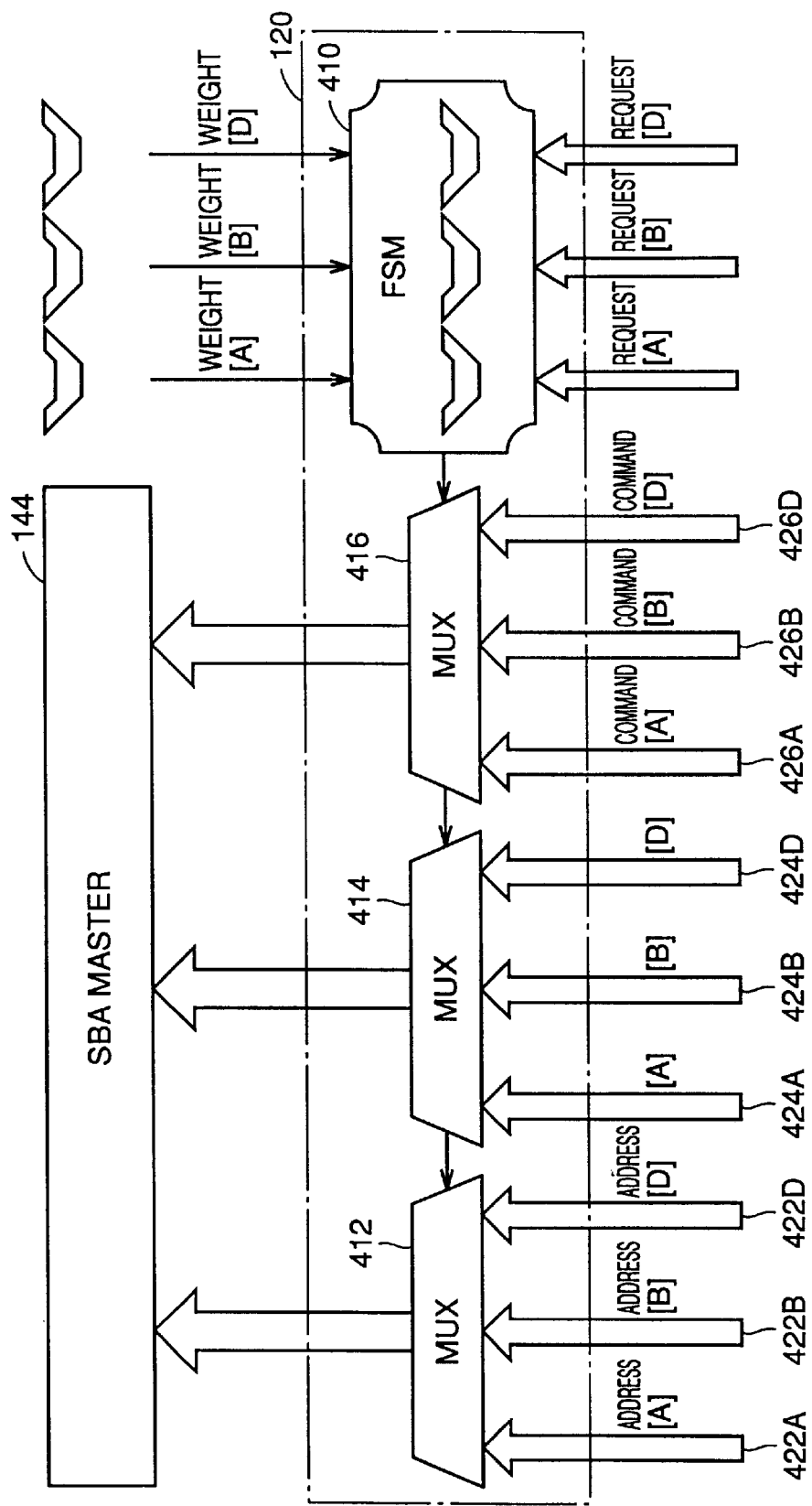
FIG. 33 is a schematic diagram of an arbiter 120.

Referring to FIG. 33, arbiter 120 includes three MUXs 412, 414 and 416 and a FSM 410 for controlling MUXs 412, 414 and 416 based on weights for slots A, B, and D and in response to requests from the slots A, B and D. MUX 412 selects one of the address inputs from slots A, B, and D (422A, 422B and 422D) and applies the selected one to SBA Master 144. MUX 414 selects one of the lengths from slots A, B, and D (424A, 424B and 424D) and applies the selected one to SBA Master 144. MUX 416 selects one of the Commands from slots A, B, and D (426A, 426B and 426D) and applies the selected one to SBA Master 144.

Figure 34:
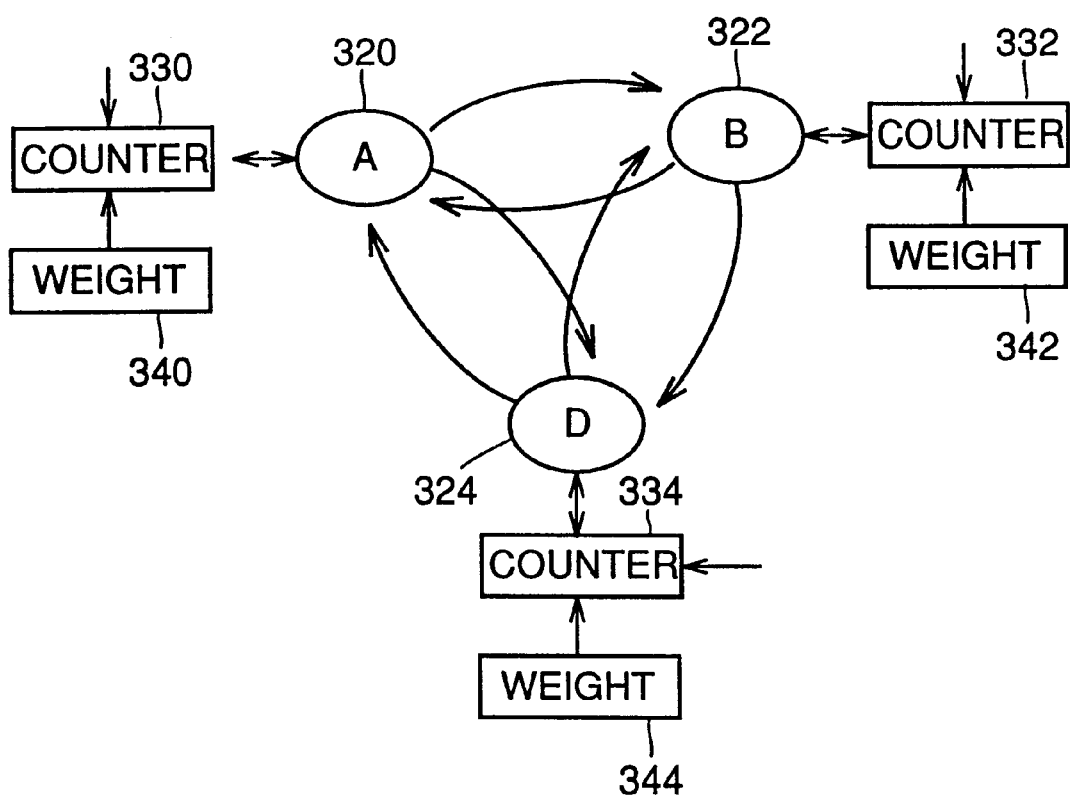
FIG. 34 is a state transition chart showing the method of arbitration by arbiter 120.

Referring to FIG. 34, the weight is defined as the number of requests the source is allowed to enqueue before it has to yield the access to other sources in case of other pending request. The weight may range from 1 to 15, in this embodiment. In FIG. 34, statuses 320, 322, 324 represent Slot A, Slot B, and Slot D owning priority, respectively. Each slot has a dedicated priority counter 330, 332, or 334 that is incremented for every enqueued request. Also each slot has a register 340, 342, or 344 for storing the weight. If the counter 330, 332, or 334 equals the weight 340, 342, or 344, the arbiter 120 checks for pending requests from the other two slots. If no request is pending, the current priority counter 330, 332, or 334 is locked and not incremented, even if a new request is enqueued. This forces the arbiter 120 to check the other two sources constantly and yield the permission as soon as any other request is issued. When the ownership changes, the previous priority counter 330, 332 or 334 is reset and the new (now current) priority counter 330, 332, or 334 is activated, i.e., incremented if requests are enqueued by the new (current) slot owner.

If the priority counter 330, 332, or 334 equals the weight 340, 342, or 344, and both the other slots have pending requests, the arbiter 120 of the present embodiment grants ownership according to a clockwise, full-circle allocation, i.e., Port A 320→Port B 322→Port D 324→Port A 320.

If a completely fair arbitration scheme is desired, the weights for all three slots should be set to '1'. If the weight is set to '0', in this embodiment, the respective slot gains exclusive access to the primary SBA port, i.e., the priority counter 330, 332, or 334 is disabled and all other slots are ignored until the weight is changed to a non-'0' value. This feature is useful for debugging and analysis purposes.

Figure 35:
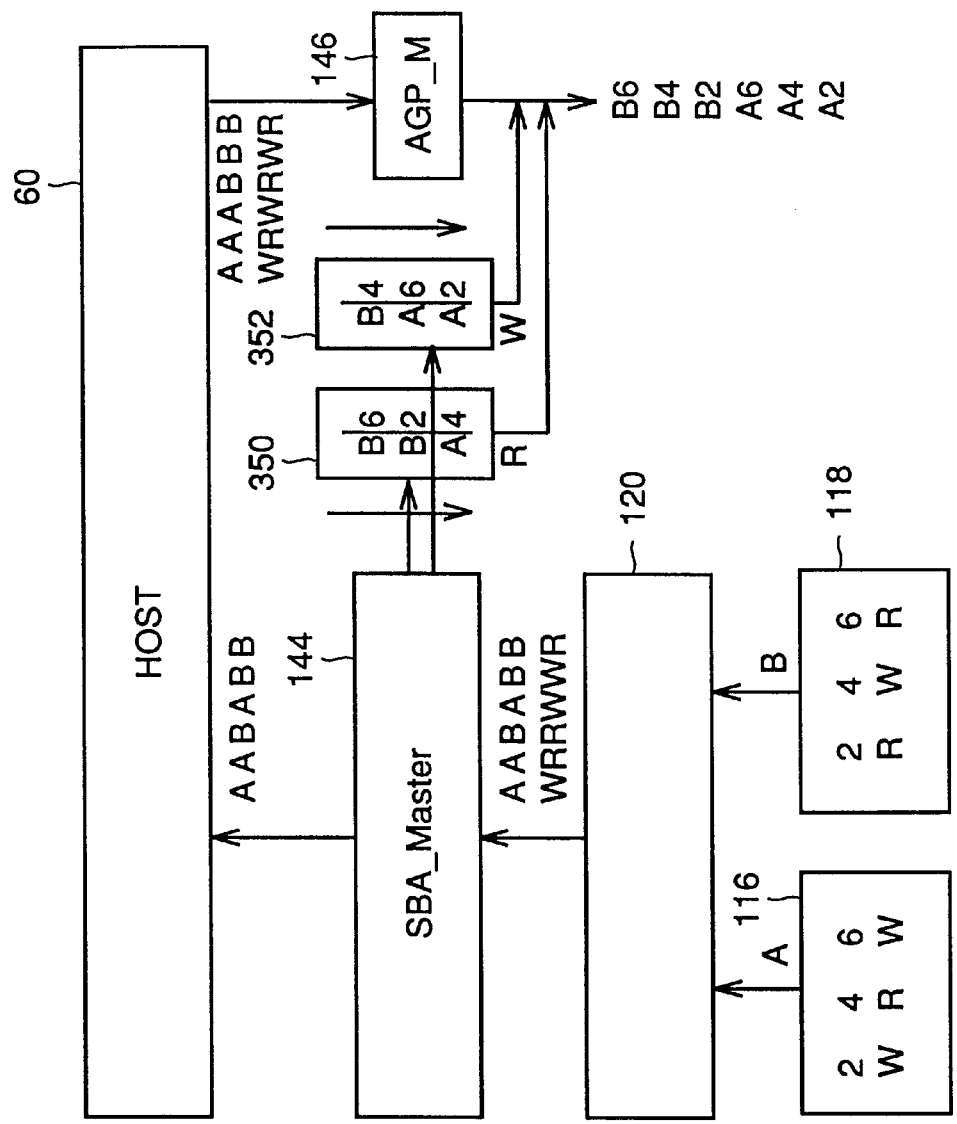
FIG. 35 is a diagram for use in illustration of how an SBA unit processes SBA requests.

Referring to FIG. 35, the SBA unit A 116, SBA unit B 118, arbiter 120, SBA Master 144 operate as follows. Suppose that three requests W (Write), R (Read) and W with respective length 2, 4, 6 are issued by SBA unit A 116 in sequence. Likewise, suppose that three requests R (length 2), W (length 4), and R (length 6) are issued by SBA unit B 118 in sequence. These requests are arbitrated by arbiter 120 and output from arbiter 120 in the order of W (A), R (A), R (B), W (A), W (B), and R (B). Their respective lengths are 2, 4, 2, 6, 4, and 6. These requests are input to SBA Master 144 which passes the requests to host 60 and enqueues their respective port and length information into read queue 350 and write queue 352. In this case, read queue 350 retains three entries. The first entry stores port A and length 4. The second entry stores port B and length 2. The third entry stores port B and length 6. The write queue 352 also retains three entries. The first entry stores port A and length 2. The second entry stores port A and length 6. The third entry stores port B and length 4.

Host 60 will process the requests and outputs response. The order of the response may be different from that of the input. Thus, host 60 may output response in the order of W (A), R (A), W(A), R (B), W (B), and R (B). The AGP Master 146 receives the response from host 60 and if it is a W response, it retrieves an entry at the head of write queue 352. If it is a R response, AGP Master 146 retrieves an entry at the head of read queue 350. Thus, in this case AGP Master 146 output data corresponding to W(A, 2), R(A, 4), W(A, 6), R(B, 2), W(B, 4), and R(B, 6) in this sequence. In this fashion, the orders of the R and W sequences as input to SBA Master 144 is respectively maintained at the output of AGP Master 146.

By bridge 68 according to this embodiment, two or more AGP and PCI devices in total can be connected to a single AGP slot of the motherboard for point-point protocols. Data can be transferred based on an appropriate protocol between host 60 and each of the devices. At this time, protocol transformation and data rate transformation can be achieved between the devices. Furthermore, data can be transferred between devices connected to bridge 68 using S2S FIFO 128. In addition, by increasing the number of connected devices, services to be offered can be provided with scalability.

Therefore, the slot of the motherboard can be effectively used to connect a plurality of devices to host 60, so that functions provided by these devices can be improved. Similarly, various combinations of services are enabled using the single slot.

Second Embodiment

Bridge 68 according to the first embodiment described above executes data allocation, protocol and data rate transformation, and necessary arbitration for these purposes, and processing to data itself is achieved by devices outside bridge 68. However, a processing core for executing data processings (such as geometric operation and video processing) may be provided within the bridge. Thus, the bridge can provide a larger number of functions to the host. The following bridge according to a second embodiment will be described as an example which incorporates such a processing core.

Figure 36:
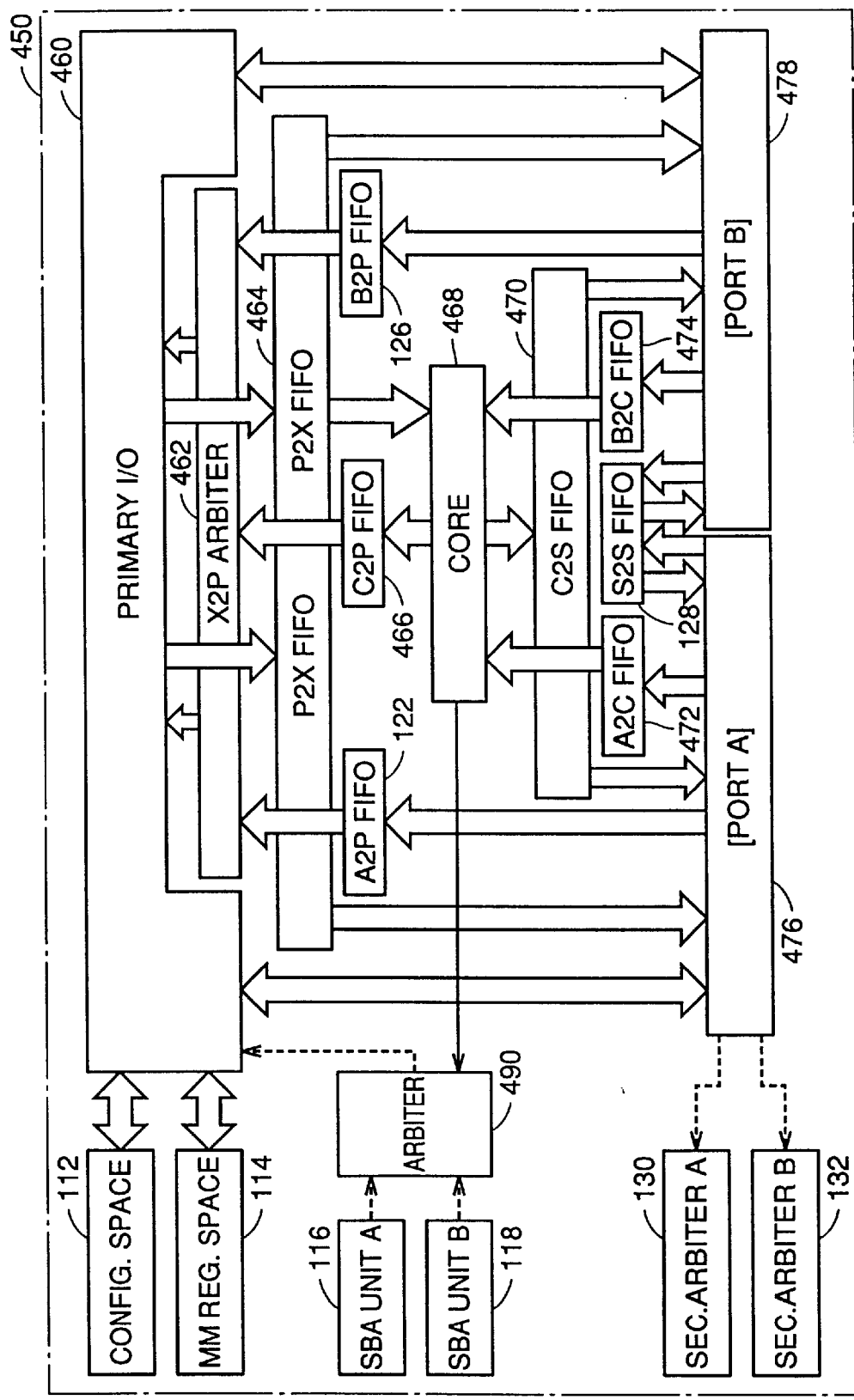
FIG. 36 is a block diagram of a bridge 450 according to a second embodiment of the present invention.

Referring to FIG. 36, a bridge 450 according to the second embodiment is different from bridge 68 shown in FIG. 4 in that it additionally includes a C2P FIFO 466, a processing core 468, a C2S FIFO 470, an A2C FIFO 472 and a B2C FIFO 474 and that it includes a Primary I/O 460, an X2P arbiter 462, a P2X FIFO 464, an SBA arbiter 490, a secondary port A 476 and a secondary port B 478 in place of Primary I/O 110, X2P arbiter 111, P2X FIFO 124, arbiter 120, port A 134 and port B 136, respectively. Corresponding elements between FIG. 4 and FIG. 36, X2P arbiter 111 and X2P arbiter 462 for example are different only in that the latter has a larger number of inputs or/and outputs associated with processing core 468 additionally provided. Newly added FIFOs 466, 470, 472 and 474 basically have the same configuration as the FIFOs according to the first embodiment described above. Therefore, the detailed description of the elements is not provided here. Similarly, in the following figures, the same parts as those described in connection with bridge 68 according to the first embodiment will be denoted by the same reference characters and represented by the same names. Their functions are also similar, and therefore the detailed description thereof is not provided either.

[Primary to Core Data Path]

Figure 37:
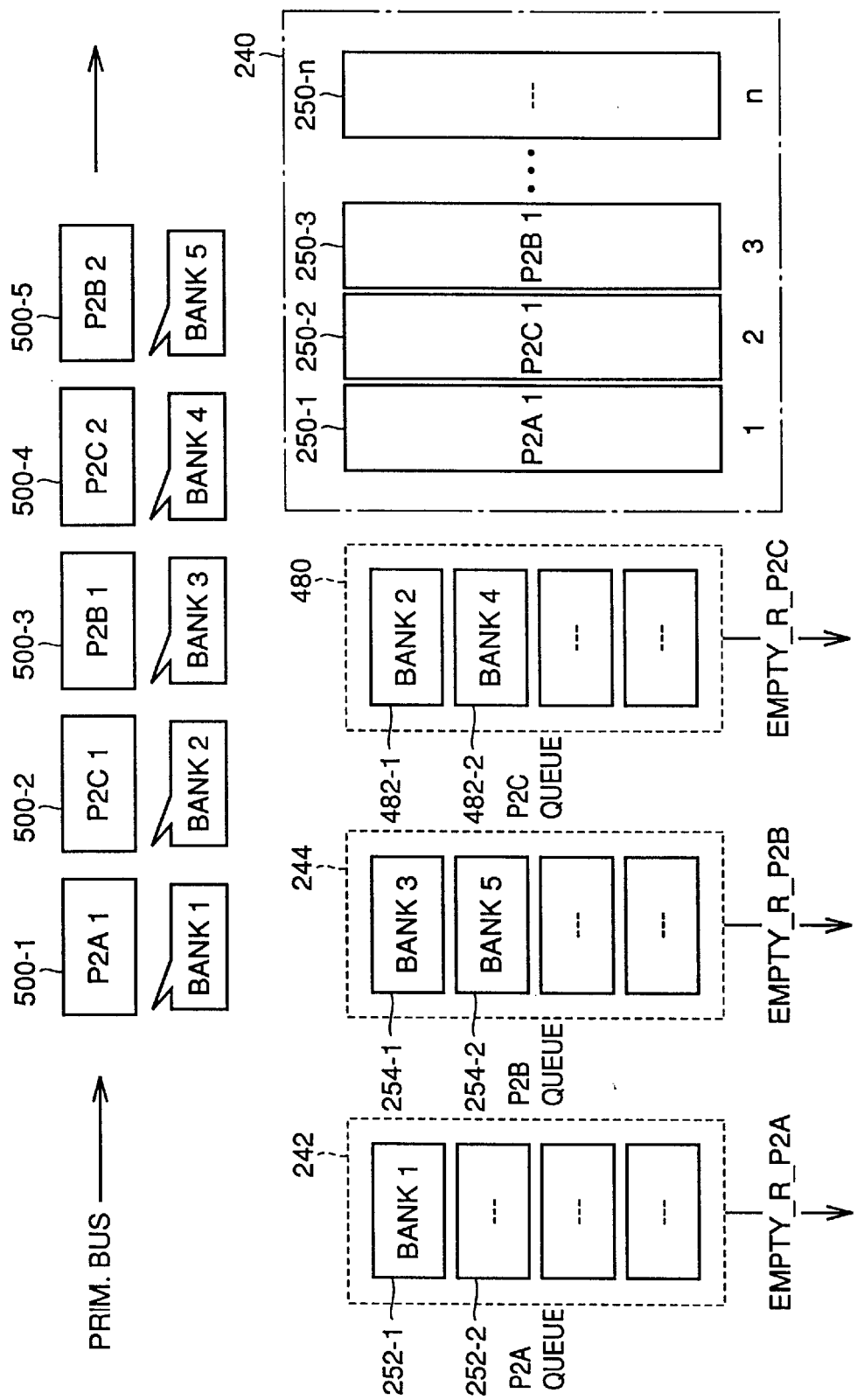
FIG. 37 is a diagram of the configuration of a P2X FIFO according to the second embodiment.

In this case, the P2X FIFO 464 can be shared by more resources and an even higher utilization rate for shared resources can be achieved. Referring to FIG. 37, P2X FIFO 464 has three destination queues, i.e., P2A Queue 242 and P2B Queue 244 as well as P2C queue 480. P2C queue 480 enqueues tags for data blocks destined for processing core 468. Also, a new Read Port has to be cloned from one of the 'P2X' read ports and be connected to the shared logic within the P2X FIFO 464. Basically, everything already shared by the P2A/P2B logic has to be expanded to a third dimension, the P2C.

Referring to FIG. 37, suppose that data blocks 500-1 to 500-5 are input from primary bus to Primary I/O 460, and then to P2X FIFO 464. These blocks are destined to P2A, P2C, P2B, P2C, and P2B FIFOs, respectively. These data blocks will be stored in Bank_1 (250-1) through Bank_5 (250-5), respectively. Then, P2A Queue 242 will store a tag 'Bank_1' in its first entry 252-1. P2B Queue 244 will store tags 'Bank_3' and 'Bank_5' in its first and second entries 254-1, 254-2. P2C queue 480 will store tags 'Bank_2' and 'Bank_4' in its first and second entries 482-1, 482-2. Respective destination FIFOs will read tags from respective queues in response to the signals Empty_R_P2A, Empty_R_P2B and Empty_R_P2C.

[Core to Primary Data Path]

Figure 38:
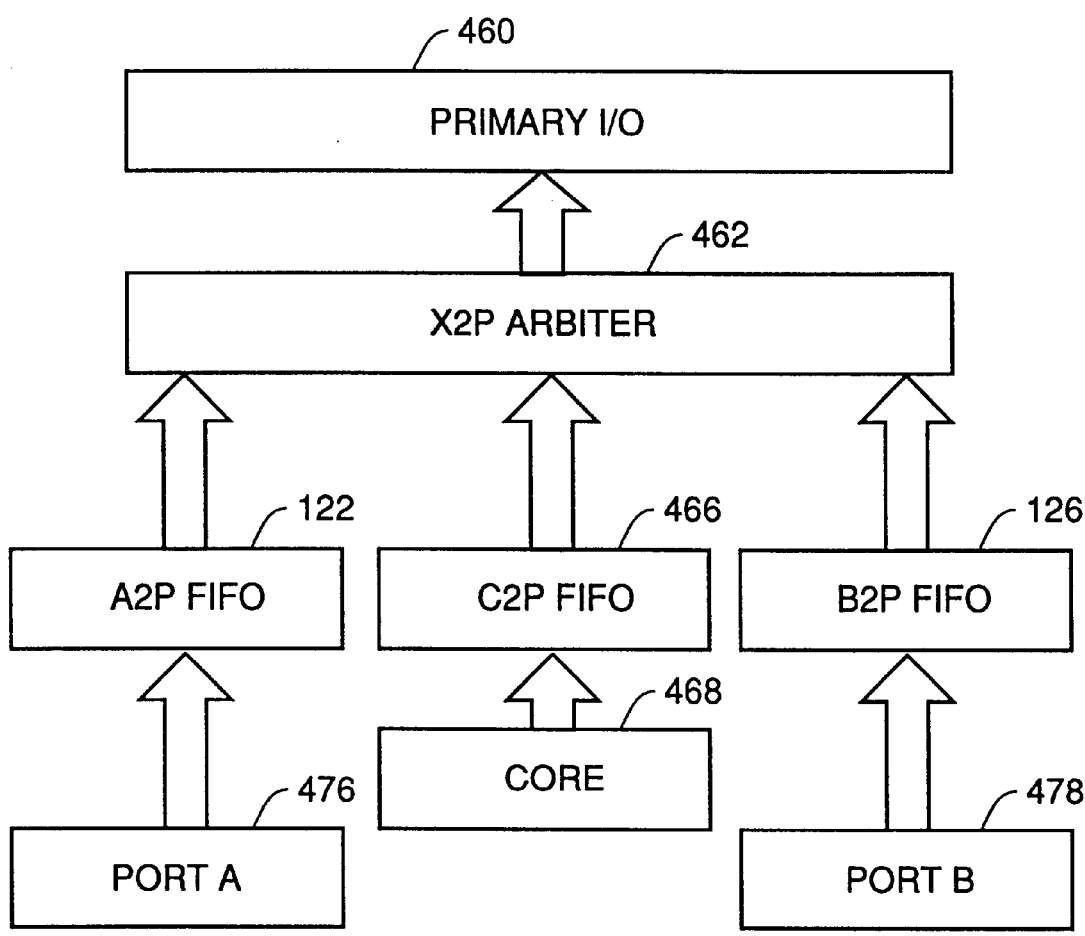
FIG. 38 is a diagram showing a data stream related to an X2P arbiter 462 according to the second embodiment.

Referring to FIG. 38, C2P FIFO 466 is a complete 'clone' of the 'X2P' FIFO (A2P FIFO 122 and B 2P FIFO 126) with identical architecture. If only AGP or only PCI transactions will be issued by processing core 468, the queue system can be removed for the C2P FIFO 466.X2P arbiter 462 is an expanded version of arbiter 120 to allow a third slot.

Figure 39:
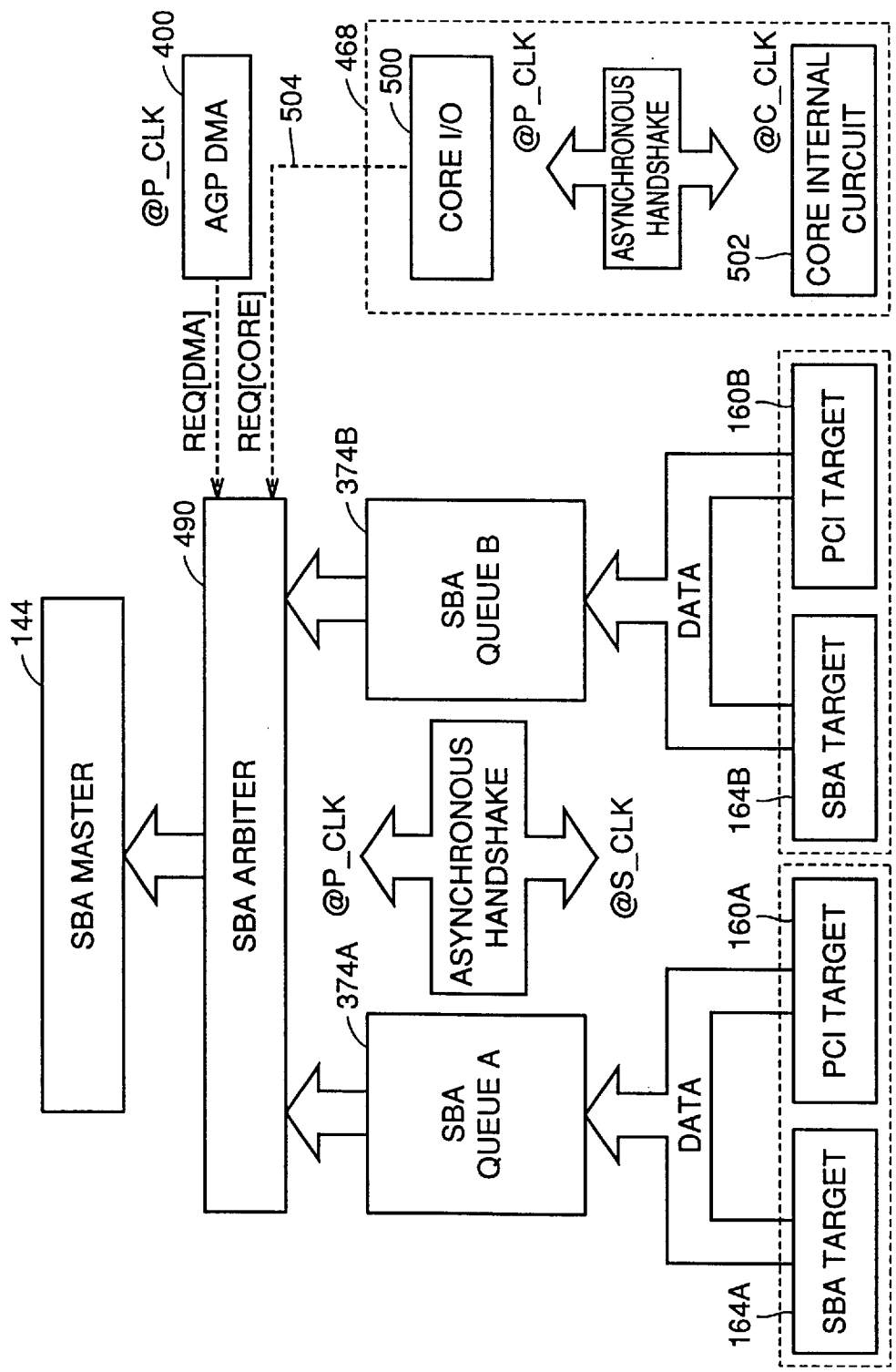
FIG. 39 is a diagram showing the operation of an SBA arbiter 490 according to the second embodiment.

Referring to FIG. 39, the SBA arbiter 490 has to be expanded to allow a 'Core' Slot ('Slot C'). Namely, SBA arbiter 490 must have a capability to handle requests 504 from core I/O 500 within processing core 468

[Core to Secondary Data Path]

Figure 40:
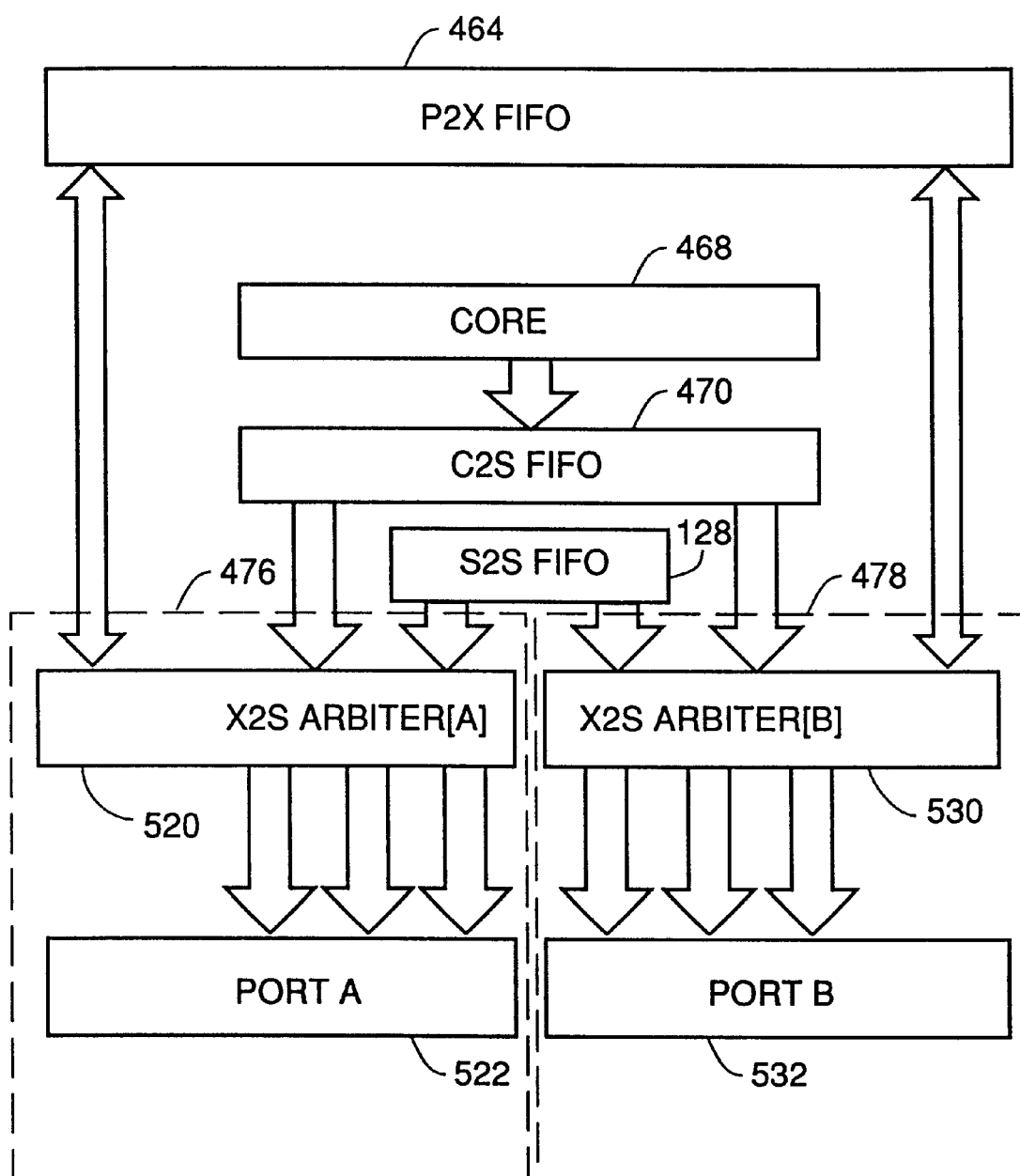
FIG. 40 is a diagram showing downstream data from processing core 468 according to the second embodiment.

Referring to FIG. 40, P2X FIFO 464 is a complete clone of P2X FIFO 124 as shown in FIG. 4. The P2A Queue 242 and P2B Queue 244 as shown in FIG. 13 are renamed into 'C2A' and 'C2B', respectively. Depending on the core requirements, the architecture can be simplified by removing unused portions. Most probably, the processing core 468 will only have a single write port (at a high frequency though). Finally, X2S arbiter 370 and X2S arbiter 380 as shown in FIG. 28 has to be expanded into X2S Arbiter 520 and X2S Arbiter 530, respectively, to allow a third slot (Slot C) to be connected to port A circuitry 522 and port B circuitry 532, respectively.

[Secondary to Core Data Path]

Figure 41:
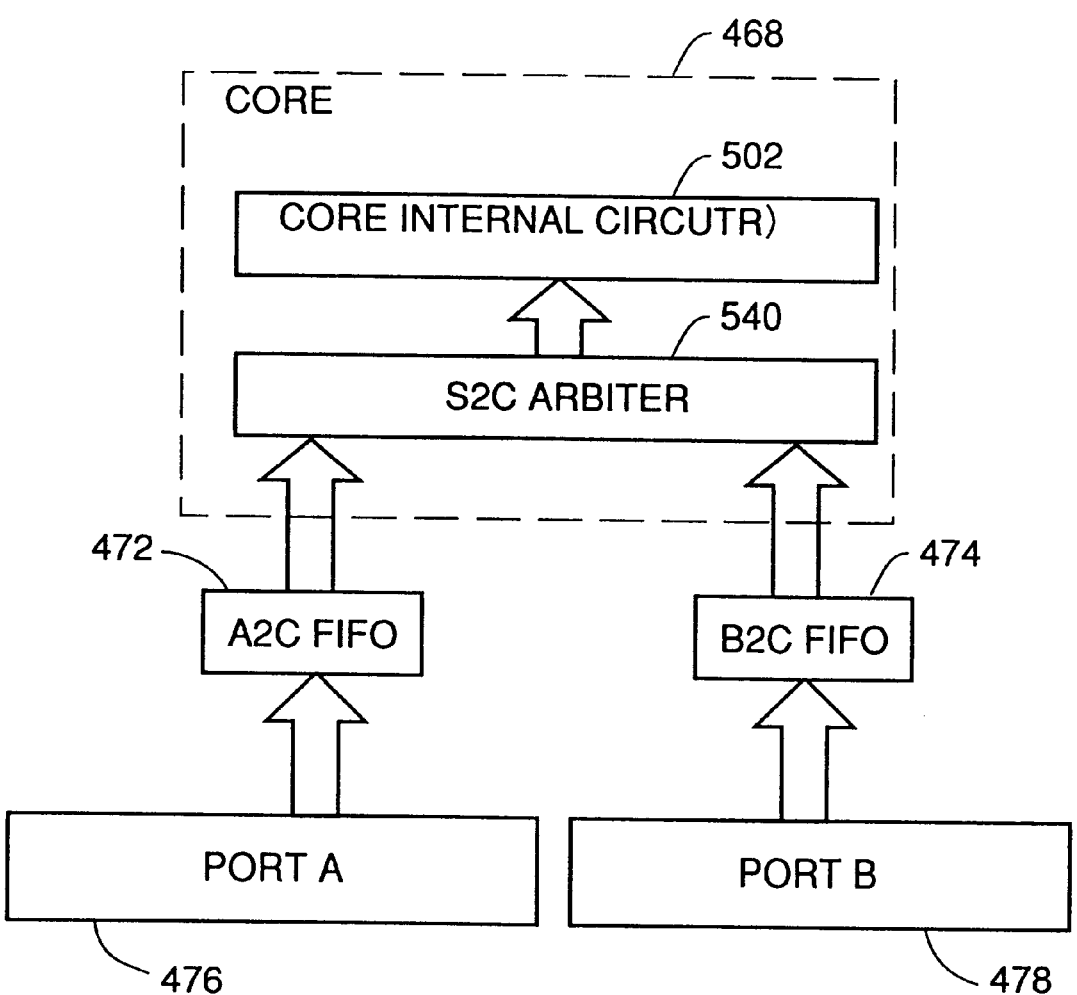
FIG. 41 is a diagram for use in illustration of the operation of A2C FIFO 472 and B2C FIFO 474, and S2C Arbiter 540 according to the second embodiment.

Referring to FIG. 41, A2C FIFO 472 and B2C FIFO 474 are complete clones of A2P FIFO 122 or B2P FIFO 126 as shown in FIG. 4. Since arbitration for the read port is controlled by the processing core 468, i.e., internally, there is no need for the two AGP/PCI queues as shown in FIG. 23. A simplified FIFO structure, for example, a simple rotation system for bank access will do, which reduces the area and complexity of the A2C FIFO 472 and B2C FIFO 474.

Also, as shown in FIG. 41, processing core 468 includes core internal circuitry 502 and S2C Arbiter 540 for arbitrating between the A2C FIFO 472 and B2C FIFO 474. S2C Arbiter 540 is a complete clone of X2P arbiter 111 as shown in FIG. 4.

[S2X Arbiters]

Figure 42:
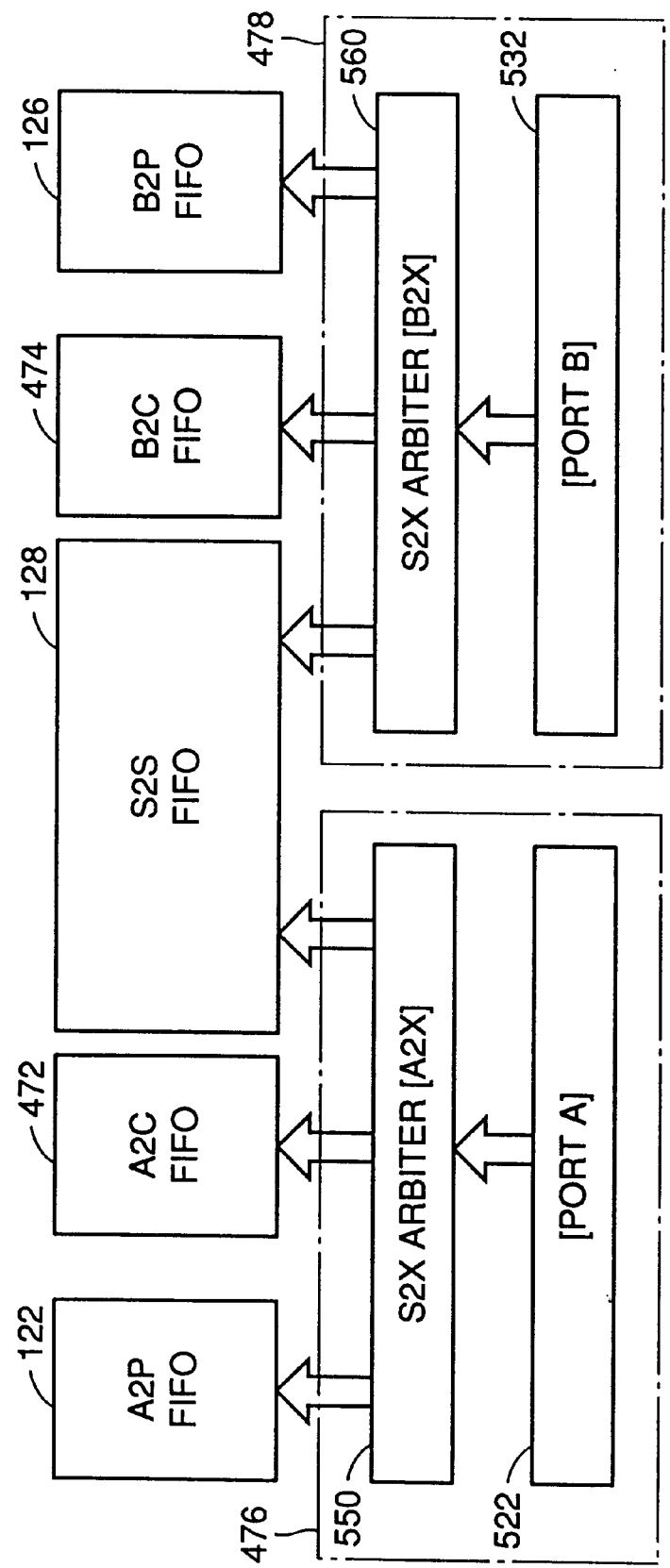
FIG. 42 is a diagram for use in illustration of the operation of S2X arbiters 550 and 560.
Figure 43:
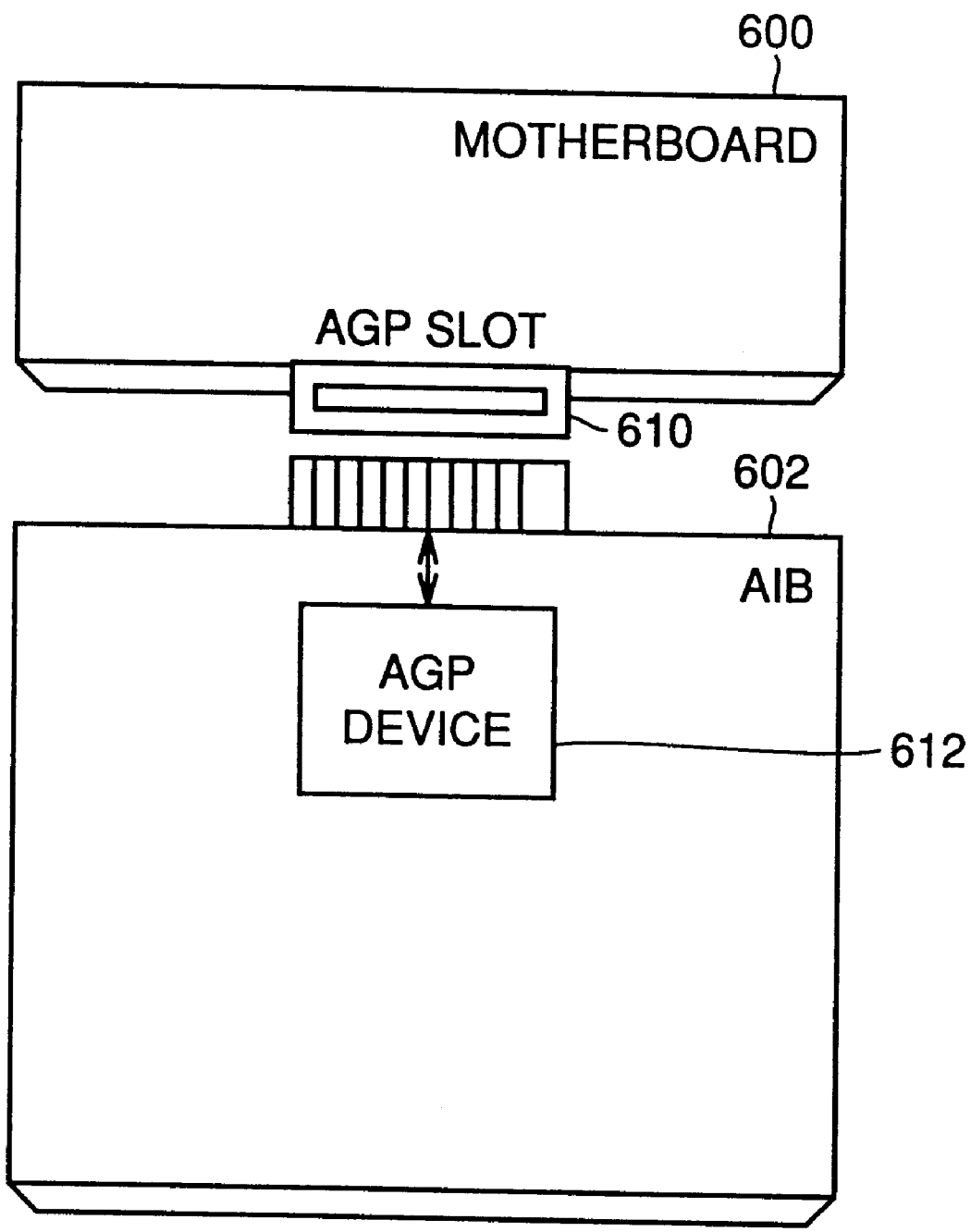
FIG. 43 is a diagram showing a first connection manner of a conventional AGP device.
Figure 44:
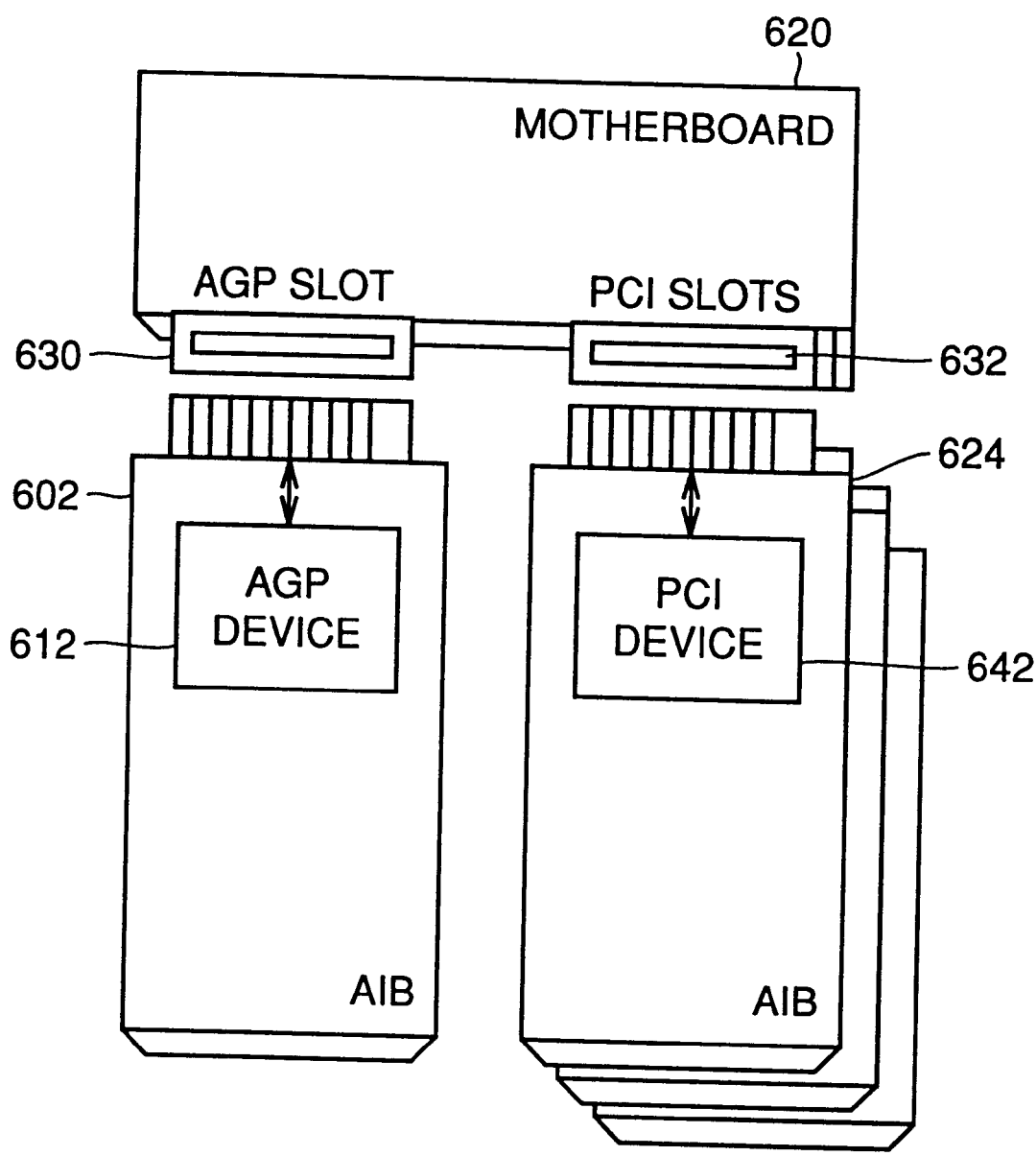
FIG. 44 is a diagram showing a second connection manner of the conventional AGP device.

Referring to FIG. 42, secondary port A 476 further includes S2X arbiter [A2X] 550 for arbitration between three slots, i.e., A2P FIFO 122 (Slot A), A2C FIFO 472 (Slot C), and S2S FIFO 128 (S2S) for the output of port A circuitry 522. Likewise, secondary port B 478 further includes S2X arbiter [B2X] 560 for arbitration between three slots, i.e., B2P FIFO 126 (Slot B ), B2C FIFO 474 (Slot C), and S2S FIFO 128.

The advantage of the 'X2P/X2S/X2X' arbiter arrangement as shown in FIG. 38 and FIG. 40 is that it makes the number of access sources transparent to the secondary/primary AGP/PCI modules. That way, the overall architecture is easily scalable and expandable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bridge device, comprising:
   first port connected to a first bus, said first port including a master module and a slave module according to a first protocol and a master module according to a second protocol, said second protocol being a point to point port protocol;
   a plurality of second ports respectively connected to a plurality of second buses, each said second ports including a master module and a slave module according to said first protocol and a slave module according to said second protocol;
   a plurality of first-in-first-out memories forming an asynchronous data paths between said first port and said plurality of second ports; and
   arbitrator for arbitrating between transactions in a contention generated in the data path formed by said first-in-first-out memories based on the protocols related to the transactions.

2. The bridge device according to claim 1, wherein
   each said module adds to a transaction request an attribute representing a protocol and a data rate related to the transaction,
   each said first-in-first-out memories includes:
      a storing circuit for storing a transaction; and
      attribute memory for storing an attribute corresponding to each transaction,
      said bridge device further comprising programmable transformation circuit for executing protocol or data rate transformation performed based on an attribute stored by said attribute memory for each of said data paths.

3. The bridge device according to claim 1, wherein
   said first protocol is a PCI protocol, said second protocol is an AGP protocol, and
   said plurality of first-in-first-out memories include a first first-in-first-out memory forming a data path from said first port to each of said plurality of second ports.

4. The bridge device according to claim 3, wherein
   said first first-in-first-out memory includes:
      a plurality of memory banks each having an input coupled to said first port and an output coupled to each of said plurality of second ports; and
      a plurality of queues provided corresponding to said plurality of second ports, said plurality of queues each holding information to specify said memory bank storing data directed to corresponding said second ports.

5. The bridge device according to claim 4, wherein
   said first first-in-first-out memory further includes a receiving circuit for receiving data broadcast from said first port to said plurality of second ports, storing duplicates in a number corresponding to that of said plurality of second ports in said memory banks, and supplying information to specify a corresponding bank storing said data to be broadcast to each of said plurality of queues for storage.

6. The bridge device according to claim 5, wherein
   said plurality of first-in-first-out memories include a second first-in-first-out memory forming a data path from said plurality of second ports to said first port.

7. The bridge device according to claim 6, further comprising an SBA unit for applying an SBA request issued as a sideband signal from said plurality of second ports to said first port,
   said second first-in-first-out memory including:
      a plurality of memory banks each having an input connected to said plurality of second ports and an output connected to said first port and for storing transaction data output from said plurality of second ports;
      an AGP queue for maintaining information to specify a memory bank storing data corresponding to an AGP request issued from said plurality of second ports within the queue; and
      a PCI queue for maintaining information to specify a memory bank storing PCI transaction data issued from said second ports within the queue, and
      said first port includes a circuit for taking data from a memory bank specified by information read out from the head of said AGP queue or said PCI queue depending upon the kind of data to be read out.

8. The bridge device according to claim 1, wherein
   said plurality of second ports include two secondary ports,
   said plurality of first-in-first-out memories include an FIFO memory forming a bi-directional data path between one of said secondary ports and the other of said secondary port.

9. The bridge device according to claim 8, wherein
said two secondary ports each include a queue having a plurality of entries to store a reading request or a writing request issued from corresponding said second port and for holding and storing the order of reading requests or writing requests,
each said entry includes type information representing the type of a request,
said bridge device further comprises output controller for controlling output of corresponding data to said first port based on type information read out from a head entry of said queue,
said output controller applies a request as is to said first port if said request is a reading request, while if said request is a writing request to said first port, said output controller masks output of said writing request to said first port until storing of corresponding data to appropriate first-in-first-out memory is complete and then unmasks the output, and if said request is a writing request to the other said second port, said output controller masks output of said writing request to said first port until storing of corresponding data to appropriate first-in-first-out memory is complete and then discards the request.

10. The bridge device according to claim 8, wherein
said two secondary ports each include:
an arbitrating circuit for arbitrating between an input from the other of said secondary port and a transaction based on said first protocol or said second protocol applied from the first port; and
a circuit for prioritizing in processing an input/output request provided from said first port to an input/output device connected to said two secondary ports over said arbitrating circuit.

11. The bridge device according to claim 7, wherein
said first port further includes a module for direct memory access, and
said SBA unit includes an arbitrating circuit for arbitrating between an SBA request from said plurality of second ports and an SBA request from said module for direct memory access and for applying either one to said first port.

12. The bridge device according to claim 11, wherein
said arbitrating circuit arbitrates between requests based on a predetermined priority among said plurality of second ports and said module for direct memory access.

13. The bridge device according to claim 1, further comprising an arbitrating circuit having an input coupled to all the data paths from said plurality of second ports to said first port and an output coupled to said first port and for arbitrating between transaction data from said plurality of second ports to said first port.

14. The bridge device according to claim 1, wherein
said first protocol is a PCI protocol,
said bridge device further comprising a circuit for toggling the ownership of a bus to which said first port is connected from one of said plurality of master modules of said first protocol to another each time a data transfer burst by said one of said plurality of master modules of said first protocol present within said first port is complete.

15. The bridge device according to claim 1, further comprising an operation core to execute a prescribed operation processing, said plurality of first-in-first-out memories form asynchronous data paths between said operation core and said first port and said plurality of second ports in addition to the asynchronous data paths between said first port and said plurality of second ports.

16. The bridge device according to claim 1, wherein
said plurality of first-in-first-out memories include a first first-in-first-out memory forming data paths from said first port to each of said plurality of second ports and said operation core,
said first first-in-first-out memory includes:
a plurality of memory banks each having an input coupled to said first port and an output coupled to each of said plurality of second ports and said operation core; and
a plurality of queues provided corresponding to said plurality of second ports and said operation core, said plurality of queues each holding information to specify said memory bank storing data directed to corresponding said second ports or said operation core.

17. The bridge device according to claim 16, wherein
said plurality of first-in-first-out memories include:
a plurality of second first-in-first-out memory provided corresponding to said plurality of second ports and each forming a data path from corresponding said second port to said first port;
a first port arbitrating circuit for arbitrating transactions applied to said first port through said plurality of second first-in-first-out storage memory;
a plurality of third first-in-first-out memory provided corresponding to said plurality of second ports and forming a data path from corresponding said second port to said operation core; and
a core arbitrating circuit for arbitrating between transactions applied to said operation core through said plurality of third first-in-first-out memory.

18. The bridge device according to claim 16, wherein
said plurality of first-in-first-out memories further include a plurality of second first-in-first-out memories forming a data path from said operation core to said plurality of second ports,
said second first-in-first-out memories each includes:
a plurality of memory banks each having an input coupled to said operation core and an output coupled to said plurality of second ports; and
a plurality of queues provided corresponding to said plurality of second ports, said plurality of queues each holding information to specify said memory bank storing data directed to corresponding said second ports.

19. A bridge device comprising:
a first port connected to a first bus;
a plurality of second ports connected to a plurality of second buses;
a plurality of first-in-first-out memories for forming asynchronous data paths between said first port and said plurality of second ports; and
an arbitrating circuit for arbitrating contentions caused on said data paths formed by said plurality of first-in-first-out memories, said arbitrating circuit arbitrating the contentions based on protocols associated with respective transactions;

said plurality of second ports each having a module which gives to a second device connected to each said second bus or receives from each said second device a command following a predetermined protocol and initiating a data transaction, said first port having a module which gives to a first device connected to said first bus or receives from said first device a command following said predetermined protocol and initiating a data transaction.

20. A bridge device according to claim 19, wherein said bridge device is formed on a single semiconductor chip.

* * * * *

UNITED STATES PATENT AND TRADEMARK OFFICE
CERTIFICATE OF CORRECTION

PATENT NO. : 6,675,251 B1
DATED : January 6, 2004
INVENTOR(S) : Robert Streitenberger et al.

It is certified that error appears in the above-identified patent and that said Letters Patent is hereby corrected as shown below:

Title page,
Item [56], References Cited, insert:
-- OTHER PUBLICATIONS
Accelerated Graphics Port Interface Specification – Revision 2.0, Intel Corporation, May 4, 1998 --

Signed and Sealed this

Twenty-eighth Day of September, 2004

JON W. DUDAS
*Director of the United States Patent and Trademark Office*